United States Patent
Sano et al.

(10) Patent No.: US 10,425,180 B2
(45) Date of Patent: *Sep. 24, 2019

(54) USER APPARATUS, BASE STATION, INTERFERENCE REDUCING METHOD AND INTERFERENCE REDUCING CONTROL INFORMATION NOTIFICATION METHOD

(71) Applicant: NTT DOCOMO, INC., Tokyo (JP)

(72) Inventors: Yousuke Sano, Tokyo (JP); Yusuke Ohwatari, Tokyo (JP); Satoshi Nagata, Tokyo (JP); Yuta Sagae, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 14/763,072

(22) PCT Filed: Nov. 13, 2013

(86) PCT No.: PCT/JP2013/080722
§ 371 (c)(1),
(2) Date: Jul. 23, 2015

(87) PCT Pub. No.: WO2014/119087
PCT Pub. Date: Aug. 7, 2014

(65) Prior Publication Data
US 2015/0372777 A1 Dec. 24, 2015

(30) Foreign Application Priority Data
Jan. 31, 2013 (JP) ................................ 2013-017715

(51) Int. Cl.
*H04J 11/00* (2006.01)
*H04B 15/00* (2006.01)
(Continued)

(52) U.S. Cl.
CPC ............ *H04J 11/004* (2013.01); *H04B 15/00* (2013.01); *H04J 11/0056* (2013.01);
(Continued)

(58) Field of Classification Search
CPC .. H04J 11/004; H04J 11/0059; H04J 11/0056; H04W 48/16; H04W 84/042; H04B 15/00
See application file for complete search history.

(56) References Cited

U.S. PATENT DOCUMENTS

2010/0309861 A1* 12/2010 Gorokhov ............ H04B 1/7103
370/329
2011/0199986 A1* 8/2011 Fong ..................... H04L 5/0035
370/329

(Continued)

FOREIGN PATENT DOCUMENTS

CA 2 826 790 A1 8/2012
EP 2 280 492 A1 2/2011
(Continued)

OTHER PUBLICATIONS

Extended European Search Report in counterpart European Application No. 13 87 3352.2 dated Dec. 3, 2015 (7 pages).
(Continued)

*Primary Examiner* — Ivan O Latorre
(74) *Attorney, Agent, or Firm* — Osha Liang LLP

(57) ABSTRACT

A user apparatus in a radio communication system including a plurality of base stations, including a reception unit that receives, from a connecting base station, control information to be used for reducing a signal of a control channel, that causes interference, sent from an interference base station for the user apparatus, and an interference reducing unit that reduces the signal of the control channel that causes the interference by using the control information to obtain a desired signal sent from the connecting base station.

10 Claims, 51 Drawing Sheets

(51) Int. Cl.
  *H04W 48/16* (2009.01)
  *H04W 84/04* (2009.01)
(52) U.S. Cl.
  CPC ......... *H04J 11/0059* (2013.01); *H04W 48/16* (2013.01); *H04W 84/042* (2013.01)

(56) References Cited

U.S. PATENT DOCUMENTS

| | | | | |
|---|---|---|---|---|
| 2011/0205982 | A1* | 8/2011 | Yoo | H04L 1/0038 370/329 |
| 2012/0082022 | A1* | 4/2012 | Damnjanovic | H04J 11/005 370/201 |
| 2012/0155411 | A1 | 6/2012 | Ancora et al. | |
| 2012/0190391 | A1* | 7/2012 | Yoo | H04J 11/005 455/501 |
| 2012/0201162 | A1* | 8/2012 | Kim | H04B 17/345 370/252 |
| 2012/0202541 | A1* | 8/2012 | Koo | H04L 1/20 455/501 |
| 2013/0033998 | A1* | 2/2013 | Seo | H04W 24/00 370/252 |
| 2013/0089040 | A1* | 4/2013 | Tabet | H04L 5/0073 370/329 |
| 2013/0114517 | A1* | 5/2013 | Blankenship | H04L 5/0053 370/329 |
| 2013/0196701 | A1* | 8/2013 | Tiirola | H04J 11/0026 455/501 |
| 2013/0230013 | A1* | 9/2013 | Seo | H04L 27/2602 370/329 |
| 2013/0242885 | A1* | 9/2013 | Zhu | H04W 52/243 370/329 |
| 2013/0279361 | A1* | 10/2013 | Seo | H04J 11/0053 370/252 |
| 2013/0301542 | A1* | 11/2013 | Krishnamurthy | H04W 52/50 370/329 |
| 2013/0315191 | A1* | 11/2013 | Yoshimoto | H04J 11/0056 370/329 |
| 2014/0029584 | A1* | 1/2014 | Qu | H04W 72/042 370/336 |
| 2014/0036747 | A1* | 2/2014 | Nory | H04W 72/0406 370/311 |
| 2014/0153499 | A1* | 6/2014 | Wang | H04W 24/02 370/329 |
| 2014/0204853 | A1* | 7/2014 | Ko | H04L 5/0048 370/329 |
| 2015/0146679 | A1* | 5/2015 | Lindoff | H04B 1/7103 370/330 |
| 2015/0256302 | A1* | 9/2015 | Song | H04L 5/0053 370/329 |
| 2015/0295695 | A1* | 10/2015 | Davydov | H04W 72/12 370/329 |

FOREIGN PATENT DOCUMENTS

| | | | | |
|---|---|---|---|---|
| JP | WO 2012/108349 | * | 8/2012 | ............ H04W 28/06 |
| WO | 2010/074444 A2 | | 7/2010 | |
| WO | 2012/018611 A1 | | 2/2012 | |
| WO | WO 2012/070914 | * | 5/2012 | ............ H04W 16/02 |
| WO | 2014/103445 A1 | | 7/2014 | |

OTHER PUBLICATIONS

International Search Report issued in PCT/JP2013/080722 dated Dec. 10, 2013 (2 pages).
Written Opinion of the International Searching Authority issued in PCT/JP2013/080722 dated Dec. 10, 2013 (4 pages).
Axnas, J. et al.; "Successive Interference Cancellation Techniques for LTE Downlink"; IEEE 22nd International Symposium on Personal, Indoor and Mobile Radio Communications, 2011, pp. 1793-1797 (5 pages).
Hoeher, P. et al.; "Two-dimensional pilot-symbol-aided channel estimation by Wiener filtering"; IEEE International Conference on Acoustics, Speech, and Signal Processing (ICASSP), Munich, Germany, Apr. 1997, pp. 1845-1848 (5 pages).
3GPP TS 36.211 V11.1.0; "3rd Generation Partnership Project; Technical Specification Group Radio Access Network; Evolved Universal Terrestrial Radio Access (E-UTRA); Physical Channels and Modulation (Release 11)"; Dec. 2012 (108 pages).
3GPP TS 36.213 V11.1.0; "3rd Generation Partnership Project; Technical Specification Group Radio Access Network; Evolved Universal Terrestrial Radio Access (E-UTRA); Physical layer procedures (Release 11)"; Dec. 2012 (160 pages).
Renesas Mobile Europe Ltd.; "Remaining details of EPDCCH resource mapping"; 3GPP TSG-RAN WG1 Meeting #70bis, R1-124396; San Diego, USA; Oct. 8-12, 2012 (4 pages).
RAN1; "LS on RRC parameters needed for EPDCCH"; 3GPP TSG-RAN1 Meeting #70bis, R1-124594; San Diego, USA; Oct. 8-12, 2012 (1 page).
3GPP TS 36.211 V11.3.0; "3rd Generation Partnership Project; Technical Specification Group Radio Access Network; Evolved Universal Terrestrial Radio Access (E-UTRA); Physical Channels and Modulation (Release 11)"; Jun. 2013 (108 pages).
3GPP TS 36.212 V11.3.0; "3rd Generation Partnership Project; Technical Specification Group Radio Access Network; Evolved Universal Terrestrial Radio Access (E-UTRA); Multiplexing and channel coding (Release 11)"; Jun. 2013 (84 pages).
3GPP TS 36.213 V11.3.0; "3rd Generation Partnership Project; Technical Specification Group Radio Access Network; Evolved Universal Terrestrial Radio Access (E-UTRA); Physical layer procedures (Release 11)"; Jun. 2013 (176 pages).
Office Action issued in the counterpart Japanese Patent Application No. 2013-017715, dated Mar. 14, 2017 (6 pages).

* cited by examiner

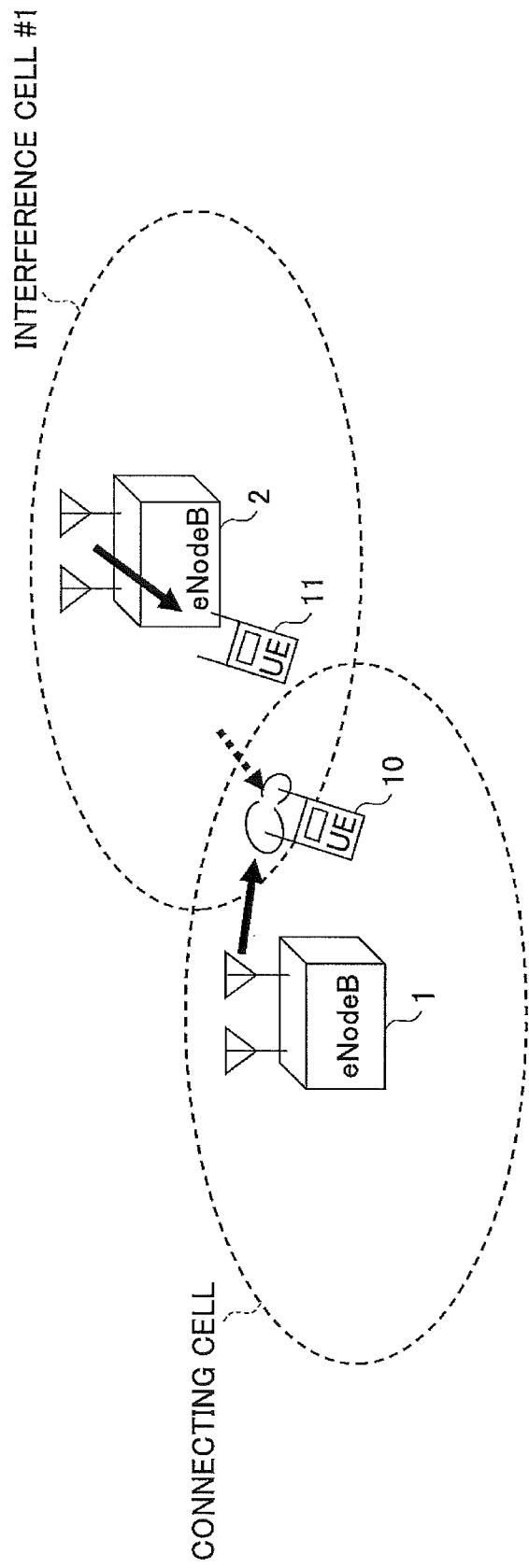

- TYPE 1: IN A CASE WHERE CHANNEL OF INTERFERENCE SIGNAL CAN BE ESTIMATED $$W_{IRC} = \frac{P_{00}}{N_{Stream,00}} \hat{G}_{00}^H(k,l) \left( \sum_{i=0}^{N_{cell}-1} \sum_{j=0}^{N_{user}-1} \frac{P_{ij}}{N_{Stream,ij}} \hat{G}_{ij}(k,l) \hat{G}_{ij}^H(k,l) + \sigma_N^2 I \right)^{-1}$$

→ COVARIANCE MATRIX FORMED BY CHANNEL MATRIX OF INTERFERENCE CELL

- TYPE 2: IN A CASE WHERE CHANNEL OF INTERFERENCE SIGNAL CANNOT BE ESTIMATED $$W_{IRC} = \frac{P_{00}}{N_{Stream,00}} \hat{G}_{00}^H(k,l) \left( \hat{G}_{00}(k,l) \hat{G}_{00}^H(k,l) + \hat{R}_{I+N} \right)^{-1}$$

→ COVARIANCE MATRIX (STATISTICAL VALUE) OF NOISE INTERFERENCE COMPONENT ESTIMATED FROM REFERENCE SIGNAL FROM CONNECTING CELL

INTERFERENCE SUPPRESSION ABILITY IS HIGHER IN TYPE 1

$G_{ij}$ : CHANNEL MATRIX AFTER MULTIPLICATION OF TRANSMISSION WEIGHT MATRIX OF $j$-TH UE ON THE SAME RESOURCE IN $i$-TH CELL (THE NUMBER OF ANTENNAS × THE NUMBER OF TRANSMISSION STREAMs)

$\hat{G}_{ij}$ : THE CHANNEL MATRIX ESTIMATION VALUE BY REFERENCE SIGNAL $P_{ij}$ : TRANSMISSION POWER OF $j$-TH UE IN $i$-TH CELL $N_{Stream,ij}$ : THE NUMBER OF TRANSMISSION STREAMs OF $j$-TH UE IN $i$-TH CELL $\sigma_N^2$ : NOISE POWER $k$ : SUBCARRIER INDEX $l$ : OFDM SYMBOL INDEX

KNOWN INFORMATION IN THE CURRENT
CONTROL SIGNAL CONFIGURATION
(CAN BE ESTIMATED BY PSS/SSS)
→ PCID (Physical Cell ID), SLOT NUMBER, $N_{CP}$ (NORMAL OR EXTENDED CP→1 or 0)
→ OTHER INFORMATION IS DIFFICULT TO ESTIMATE
→ SYSTEM BANDWIDTH, NUMBER OF ANTENNA PORTs ・CALCULATION OF CRS
 SEQUENCE INITIAL VALUE
・CALCULATION OF CRS
 MAPPING POSITION
・CRS POWER BOOSTING INFORMATION (e.g. POWER RATIO BETWEEN REFERENCE SIGNAL AND DATA SIGNAL)
・MBSFN CONFIG.

FIG.22

| PARAMETER | SUMMARY |
|---|---|
| PRB PAIR CONFIGURATION FOR AN ePDCCH SET | SET OF CANDIDATEs OF PRB ON WHICH ePDCCH MAY BE TRANSMITTED |
| TYPE OF THE EPDCCH SET | LOCALIZED OR DISTRIBUTED |
| THE DMRS SCRAMBLING SEQUENCE INITIALIZATION PARAMETER FOR AN ePDCCH SET | DM-RS SCRAMBLING INITIAL SEQUENCE VALUE $n_{ID,i}^{EPDCCH}$ |
| QUASI-COLOCATION CONFIGURATION FOR ePDCCH DMRS FOR AN ePDCCH SET (QUASICOLOCATION-CSI-RS-INDEX) | QCL INFORMATION FORT ePDCCH |
| SUBFRAME CONFIGURATION WHERE UE MONITORs UE-SPECIFIC SEARCH SPACE ON ePDCCH | ON WHICH SUBFRAME TO MONITOR ePDCCH? |
| THE STARTING OFDM SYMBOL FOR ePDCCH | STARTING SYMBOL OF ePDCCH (WHEN THIS IS NOT REPORTED, SYMBOL NEXT TO CFI IS USED AS START SYMBOL) |

FIG.24

| TARGET | NECESSARY INFORMATION FOR SUPPRESSION BY IRC TYPE1 | ADDITIONAL INFORMATION FOR SIC |
|---|---|---|
| PCFICH | • MAPPED REG INFORMATION<br>↑ PCID, SYSTEM BANDWIDTH<br>• PCFICH POWER BOOSTING INFORMATION | • CALCULATION OF SCRAMBLING SEQUENCE INITIAL VALUE<br>↑ (PCID), SLOT NUMBER(ns) |
| PHICH | • REG INFORMATION ON WHICH PHICH IS MAPPED<br>↑ CPID, CP LENGTH, PHICH GROUP NUMBER, PHICH DURATION<br>— FOR EXTENDED DURATION, FRAME STRUCTURE TYPE AND INFORMATION ON WHETHER IT IS MBSFN SUBFRAME ARE NECESSARY<br>• PHICH POWER BOOSTING INFORMATION | • (CP LENGTH)<br>• SCRAMBLING SEQUENCE INITIAL VALUE<br>↑ (PCID), SLOT NUMBER(ns)<br>• ORTHOGONAL SEQUENCE OF ALL ASSIGNED UEs<br>↑ PHICH SEQUENCE NUMBER |
| PDCCH | • CFI<br>• UE-IF OF ALL ASSIGNED UEs<br>• COMMON SEARCH SPACE INFORMATION<br>• UE-SPECIFIC SEARCH SPACE INFORMATION OF ALL ASSIGNED UEs<br>↑ ABSOLUTE SUBFRAME NUMBER | NOT NECESSARY |
| ePDCCH | • INFORMATION SIMILAR TO THAT OF PDCCH<br>• INFORMATION FOR CHANNEL ESTIMATION BY DM-RS<br>↑ $n_{ID,i}^{EPDCCH}$, $(n_{SCID}^{EPDCCH})$, CP LENGHTH, SLOT NUMBER<br>• NUMBER OF ANTENNA PORTs, NUMBER OF RBs ON WHICH ePDCCH IS ASSIGNED, DM-RS POWER BOOSTING INFORMATION<br>• FOR SPECIFYING SUBFRAME AND PRB PAIR BY WHICH ePDCCH IS TRANSMITTED<br>↑ RRC SIGNALING INFORMATION SHOWN IN THE TABLE OF FIG.22 | NOT NECESSARY |

FIG.25
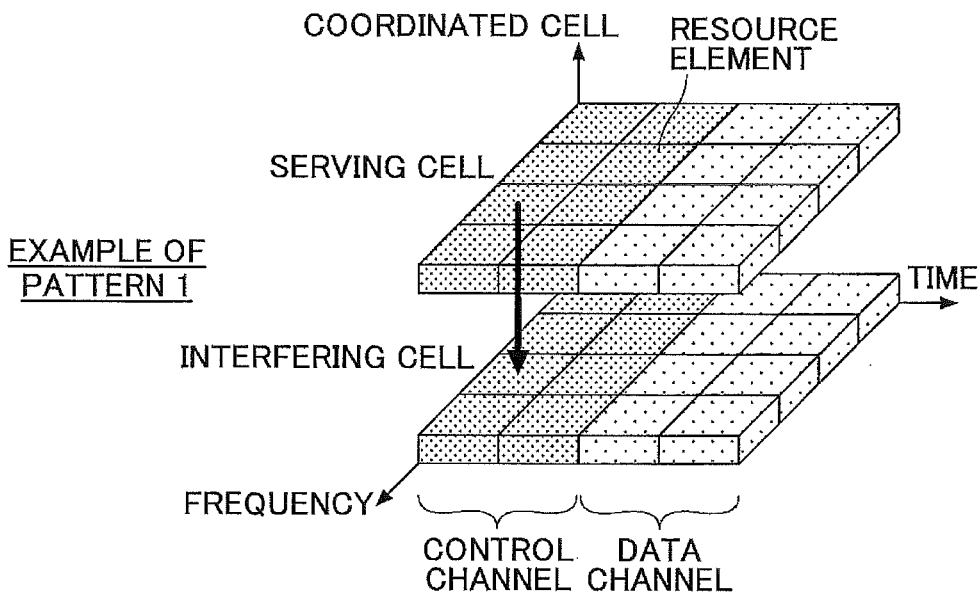
EXAMPLE OF PATTERN 1
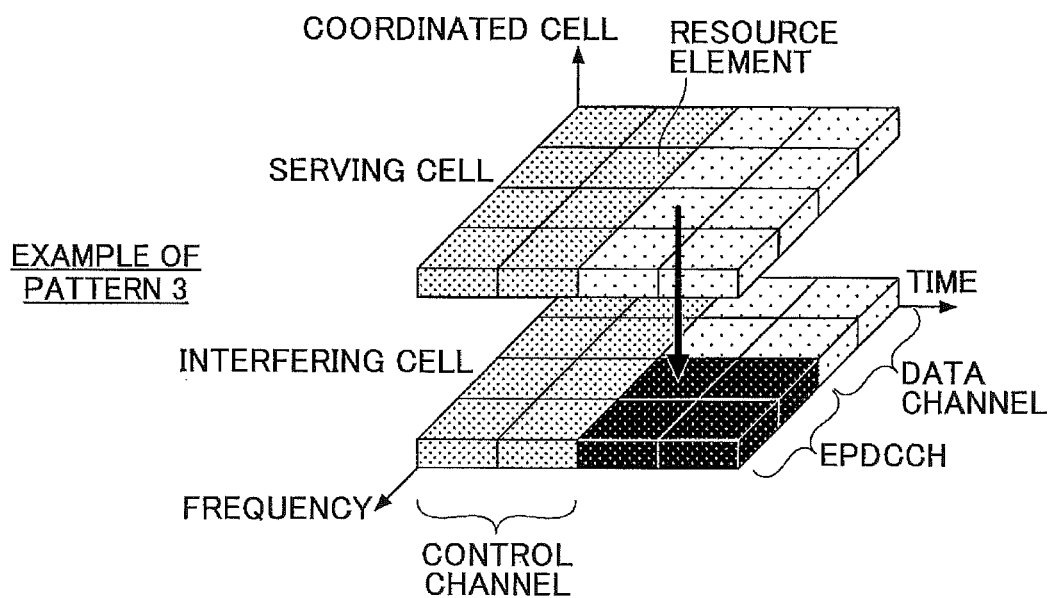
EXAMPLE OF PATTERN 3

FIG.26
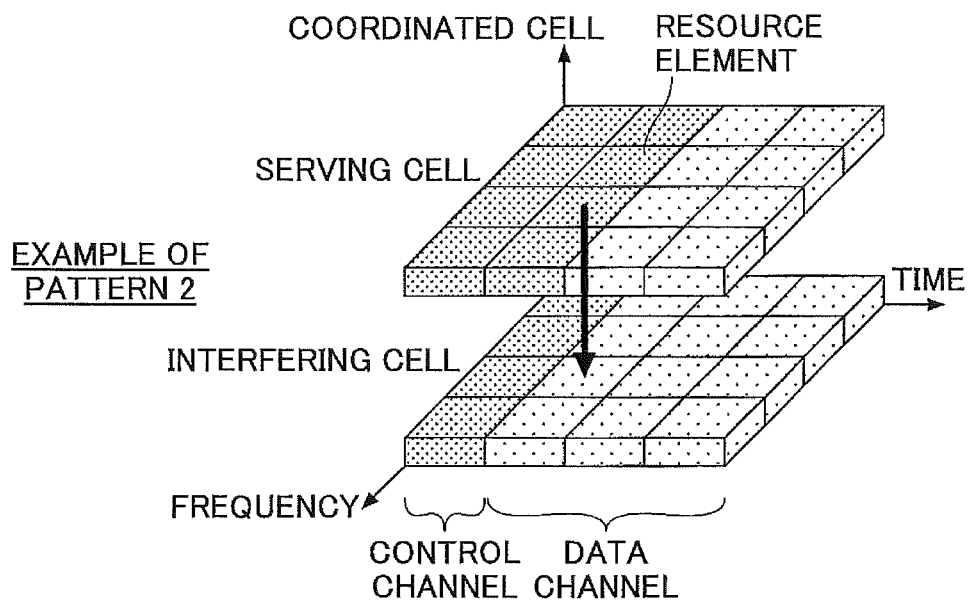
EXAMPLE OF PATTERN 2
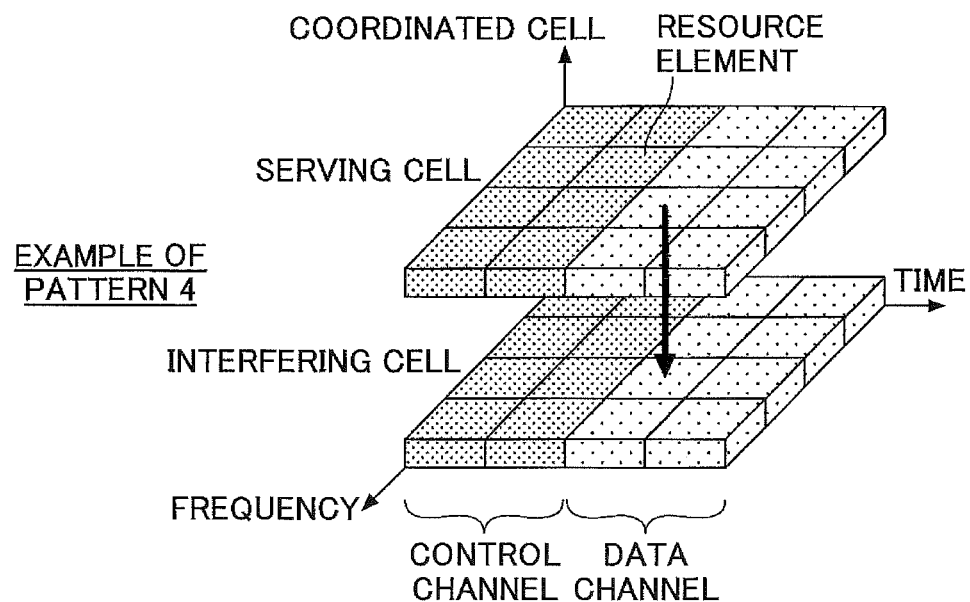
EXAMPLE OF PATTERN 4

FIG.30

| INFORMATION ELEMENT |
| --- |
| PCID |
| $N_{CP}$ |
| SYSTEM BANDWIDTH |
| NUMBER OF CRS ANTENNA PORTs |
| CRS POWER BOOSTING INFORMATION |
| MBSFN CONFIG. |
| CFI |
| PCFICH POWER BOOSTING INFORMATION |
| PHICH GROUP |
| PHICH DURATION |
| PHICH POWER BOOSTING INFORMATION |
| UE-ID OF ALL UEs |
| COMMON SEARCH SPACE INFORMATION |
| ABSOLUTE SUBFRAME NUMBER |

FIG.32

| | INFORMATION ELEMENT | ESSENTIAL OR ARBITRARY |
|---|---|---|
| CHANNEL ESTIMATION BASED ON CRS | PCID | ESSENTIAL |
| | SLOT NUMBER | ARBITRARY (CAN BE ESTIMATED BY CURRENT PSS/SSS) |
| | $N_{CP}$ | ARBITRARY (EXAMPLE: UNNECESSARY WHEN UNIFIED IN THE WHOLE SYSTEM) |
| | NUMBER OF CRS ANTENNA PORTs | ESSENTIAL |
| | MBSFN CONFIG. | ESSENTIAL |
| | SYSTEM BANDWIDTH | ESSENTIAL |
| | CRS POWER BOOSTING INFORMATION | ESSENTIAL |
| CHANNEL ESTIMATION BASED ON DM-RS (ePDCCH) | $n_{ID,i}^{EPDCCH}$ | ALREADY NOTIFIED BY THE FOLLOWING RRC SIGNALING FOR ePDCCH |
| | $n_{SCID}^{EPDCCH}$ | ARBITRARY (CONSTANT NUMBER) |
| | NUMBER OF DM-RS ANTENNA PORTs | ESSENTIAL |
| | NUMBER OF ASSIGNED RBs | ALREADY NOTIFIED BY THE FOLLOWING RRC SIGNALING FOR ePDCCH |
| | DM-RS POWER BOOSTING INFORMATION | ESSENTIAL (ONLY WHEN POWER BOOSTED) |
| | CFI | ARBITRARY (NOT NECESSARY WHEN STARTING OFDM SYMBOL FOR ePDCCH HAS BEEN SENT BY THE FOLLOWING RRC SIGNALING FOR ePDCCH. ALSO, IF NECESSARY, RECEIVER CAN ESTIMATE) |
| | UE-ID OF ALL UEs | ESSENTIAL |
| ePDCCH SUPPRESSION | RRC SIGNALING FOR ePDCCH | ESSENTIAL (DESCRIBED IN TABLE OF FIG.22) |
| | COMMON SEARCH SPACE INFORMATION | ARBITRARY |
| | UE-SPECIFIC SEARCH SPACE INFORMATION | (EXAMPLE: SEARCH FOR ALL SORTs IS POSSIBLE) |

FIG.33

| | INFORMATION ELEMENT | ESSENTIAL OR ARBITRARY |
|---|---|---|
| PFICH SUPPRESSION | PFICH POWER BOOSTING INFORMATION | ESSENTIAL |
| PHICH SUPPRESSION | PHICH GROUP | ESSENTIAL |
| | PHICH DURATION | ESSENTIAL |
| | FRAME STRUCTURE TYPE | ARBITRARY (NORMAL DURATION, AND, UNNECESSARY WHEN UNIFIED IN THE SYSTEM) |
| | PHICH POWER BOOSTING INFORMATION | ESSENTIAL |
| PDCCH SUPPRESSION | CFI | ARBITRARY (MAY BE ESTIMATED IN RECEIVER SIDE) |
| | UE-ID OF ALL UEs | ESSENTIAL |
| | COMMON SEARCH SPACE INFORMATION | ARBITRARY (EXAMPLE: SEARCH FOR ALL SORTs IS POSSIBLE) |
| | ABSOLUTE SUBFRAME NUMBER (OR RELATIVE VALUE WITH RESPECT TO OWN CELL SUBFRAME NUMBER) | |

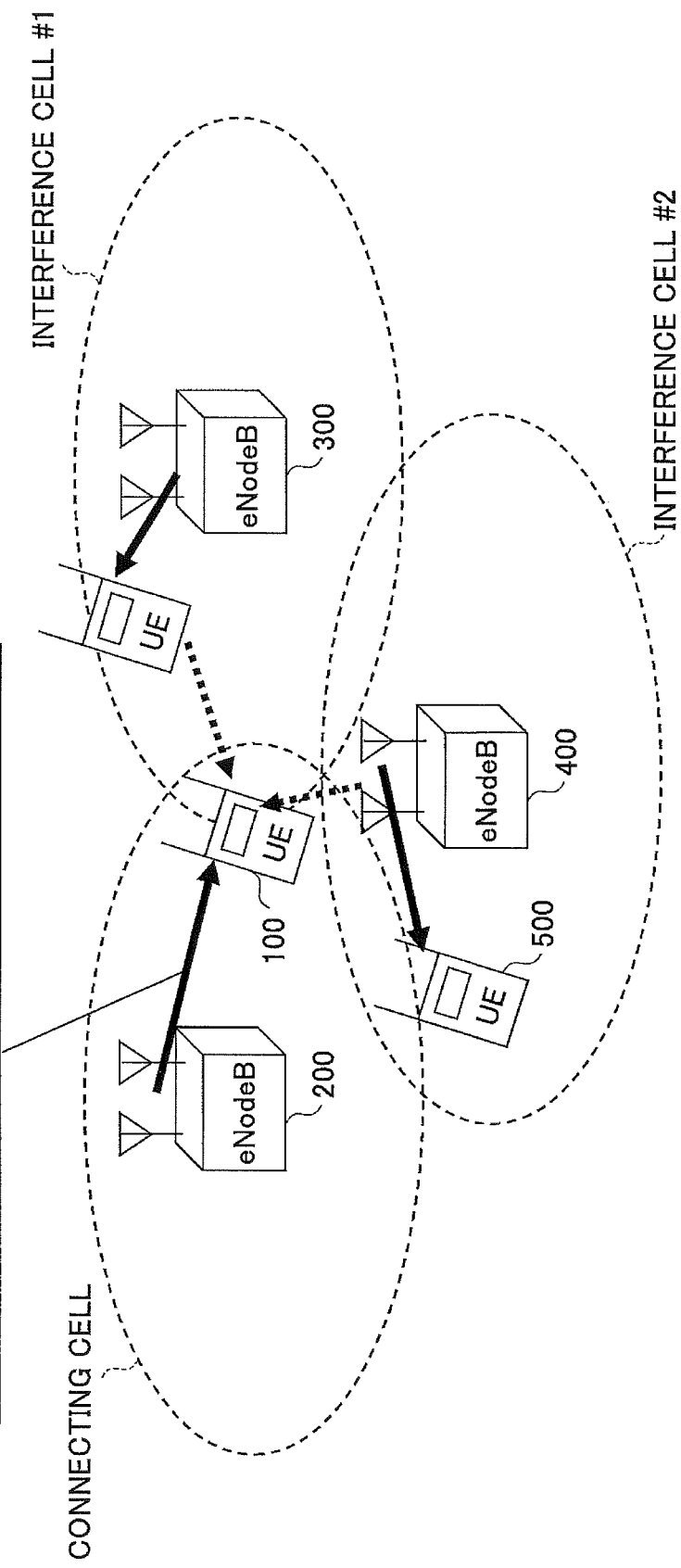

| TARGET | NECESSARY INFORMATION FOR SUPPRESSION BY IRC TYPE1 | ADDITIONAL INFORMATION FOR SIC |
|---|---|---|
| PCFICH | • MAPPED REG INFORMATION<br>↑ PCID, SYSTEM BANDWIDTH<br>• PCFICH POWER BOOSTING INFORMATION | • CALCULATION OF SCRAMBLING SEQUENCE INITIAL VALUE<br>↑ (PCID), SLOT NUMBER(ns) |
| PHICH | • REG INFORMATION ON WHICH PHICH IS MAPPED<br>↑ CPID, CP LENGTH, PHICH GROUP NUMBER, PHICH DURATION<br>- FOR EXTENDED DURATION, FRAME STRUCTURE TYPE AND INFORMATION ON WHETHER IT IS MBSFN SUBFRAME ARE NECESSARY<br>• PHICH POWER BOOSTING INFORMATION | • (CP LENGTH)<br>• SCRAMBLING SEQUENCE INITIAL VALUE<br>↑ (PCID), SLOT NUMBER(ns)<br>• ORTHOGONAL SEQUENCE OF ALL ASSIGNED UEs<br>↑ PHICH SEQUENCE NUMBER |
| PDCCH | • CFI<br>• UE-ID OF ALL ASSIGNED UEs<br>• COMMON SEARCH SPACE INFORMATION<br>• UE-SPECIFIC SEARCH SPACE INFORMATION OF ALL ASSIGNED UEs<br>↑ ABSOLUTE SUBFRAME NUMBER | NOT NECESSARY |
| ePDCCH | • INFORMATION SIMILAR TO THAT OF PDCCH INFORMATION FOR CHANNEL ESTIMATION BY DM-RS<br>↑ $n_{ID,i}^{EPDCCH}$, $(n_{SCID}^{EPDCCH})$, CP LENGTH, SLOT NUMBER<br>NUMBER OF ANTENNA PORTs, NUMBER OF RBs ON WHICH ePDCCH IS ASSIGNED, DM-RS POWER BOOSTING INFORMATION<br>• FOR SPECIFYING SUBFRAME AND PRB PAIR BY WHICH ePDCCH IS TRANSMITTED<br>↑ RRC SIGNALING INFORMATION SHOWN IN THE TABLE OF FIG.22 | NOT NECESSARY |

INFORMATION THAT NEEDS TO BE ADDED IS ONLY PHICH SEQUENCE

FIG.44

USER APPARATUS, BASE STATION, INTERFERENCE REDUCING METHOD AND INTERFERENCE REDUCING CONTROL INFORMATION NOTIFICATION METHOD

CROSS-REFERENCE TO RELATED APPLICATIONS

This application is a national stage application of PCT/JP2013/080722 filed Nov. 13, 2013, which claims priority to Japanese Priority Application No. 2013-017715 filed on Jan. 31, 2013, the entire contents of which are hereby incorporated by reference.

TECHNICAL FIELD

The present invention relates to a base station and a user apparatus in a radio communication system.

RELATED ART

In LTE (Long Term Evolution) Advanced and the like in 3GPP (Third Generation Partnership Project), as to downlink communication, various techniques are considered for reducing (example: suppressing, removing), at the user apparatus, interference of an interference radio beam from an interference base station against a desired radio beam from a connecting base station, and interference of signals to other users at the connecting base station.

In the technique for reducing such interferences, for example, as shown in FIG. 1, in a case where a user apparatus 10 resides near a border of a connecting cell (cell of a connecting base station 1, serving cell), so the user apparatus 10 strongly receives an interference radio beam from another base station 2 (interference base station) adjacent to the desired base station 1, the user apparatus 10 can improve reception quality of the desired signal carried on a desired radio beam by performing interference reduction processing. In FIG. 1, a beam generated by the interference base station 2, that is, a part of beams for a downlink channel to other user apparatus (user apparatus 11, for example) becomes an interference signal for the user apparatus 10. FIG. 1 especially shows interference from an interference cell.

RELATED ART DOCUMENT

Non-Patent Document

Non-Patent Document 1: Axnas J. et. al., "Successive Interference Cancellation Techniques for LTE Downlink," PIMRC 2011.
Non-Patent Document 2: P. Hoeher et. al., "Two-dimensional pilot-symbol-aided channel estimation by Wiener filtering," Proc. ICASSP '97, 1997
Non-Patent Document 3: 3GPP, TS36.211
Non-Patent Document 4: 3GPP, TS36.213 9.1.2
Non-Patent Document 5: 3GPP, Renesas, R1-124396
Non-Patent Document 6: 3GPP, R1-124594

SUMMARY

There is a prior application (JP2012-288896) related to the present application. An embodiment of the prior application (JP2012-288896) mainly discloses a technique for reducing a signal of a data channel. On the other hand, in an after-mentioned embodiment of the present application mainly discloses a technique for reducing a signal of q control channel that causes interference. In either of the techniques, the purpose is to improve reception quality of a control signal and a data signal in a connecting cell.

In the following, outlines of techniques for interference reduction such as interference suppression and removing (cancelling) and the like in a conventional technique are described.

<Interference Rejection Combining Reception>

There is a technique called Interference Rejection Combining as one of techniques for separating a desired signal from a received signal that includes an interference signal and the desired signal to obtain the desired signal. The interference rejection combining (IRC) is a technique for weighting (reception weights) signals that are obtained by each reception antenna in the user apparatus so as to suppress, in the user apparatus, interference of the interference radio beam from the interference base station against the desired radio beam from the connecting base station, and the interference by signals for other users at the connecting base station in the downlink communication.

As shown in FIG. 2, in the IRC reception technique, there are two types (Type 1, Type 2) of methods for calculating reception weights, which are a type for a case where the channel of the interference signal can be estimated, and a type for a case where the estimation of the channel of the interference signal is impossible. By the way, each of the equations shown in FIG. 2 is an equation derived from an MMSE (Minimum Mean. Squared Error) algorithm. Also, the technique for calculating reception weights using these equations is an existing technique in itself.

As shown in FIG. 2, in the equation of Type 1 for the case where channel estimation of the interference signal is possible, the underlined part is a covariance matrix formed by a channel matrix of the interference cell. Also, in the equation of Type 2 for the case where channel estimation of the interference signal is impossible, the underlined part is a covariance matrix (statistical amount) of noise interference components estimated by a received signal from the connecting cell (cell formed by the connecting base station, a serving cell). An after-mentioned embodiment of the present invention is targeted for Type 1 in IRC Type 1 and Type 2. In the following, "IRC" means IRC Type 1.

<Successive Interference Cancellation>

In addition to IRC, there is a technique of successive interference cancellation (SIC) as a technique for separating a desired signal from a received signal including an interference signal and the desired signal.

The successive interference cancellation is a technique for generating a replica signal by performing hard decision or soft decision for the interference signal from the received signal, and successively subtracting (removing) the replica signal from the received signal so as to extract a desired signal. A functional configuration example (example of hard decision) is shown in FIG. 3 when the user apparatus performs the successive interference cancellation. As shown in FIG. 3, for each of a plurality of interference signals, the user apparatus performs channel estimation of the interference signal, demodulates the interference signal based on the channel estimation, generates a replica of the interference signal, and successively subtracts the replica from the received signal.

The configuration of the successive interference cancellation itself is an existing technique. As configurations for the successive interference cancellation, there are various configurations other than one shown in FIG. 3. For example, as shown in FIG. 4, there is a configuration for performing successive interference cancellation using turbo equalization. The configuration shown in FIG. 4 is a configuration described in the non-patent document 1. Also, the configuration shown in FIG. 4 is an example of a configuration using the turbo equalization. The present invention can be applied to any successive interference canceller, irrespective of the scheme, as long as it includes a function for performing channel estimation of the interference cell and performing demodulation of the interference signal.

<Summary of Information Necessary for IRC/SIC>

As described before, in the present application, mainly, methods that can reduce control channels (PDCCH, etc.) of interference signals are described.

For performing IRC, a channel estimation value (CRS or DM-RS based) of an interference signal, and information (or Null information) of a control channel that causes interference are necessary. Also, as to SIC, in addition to the information necessary for IRC, information for obtaining hard/soft decision replica signal (demodulation signal) is necessary. That is, as exemplified in FIG. 5, the information on the control channel that causes interference is necessary for each resource element.

The control channel is different from the data channel in that RABK is fixed to RANK1, there is no multi-level modulation (QAM) (only QPSK or BPSK), there is no TM (Transmission Mode) (transmitted by closed loop type transmission diversity (SFBC) in any TM), it is demodulated by CRS (however, ePDCCH is demodulated also by DM-RS as described later).

<About Downlink Control Channel>

Before describing information necessary for IRC/SIC in detail, explanation on downlink control channels (simply to be referred to as control channel hereinafter) is given.

First, types of control channels and information to be transmitted are described. As control channels defined in LTE-Advanced, there are PCFICH (Physical Control Format Indicator Channel), PHICH (Physical Hybrid-ARQ Indicator Channel), PDCCH (Physical Downlink Control Channel), and ePDCCH (enhanced PDCCH).

PCFICH transmits CFI (Control Format Indicator) that is information (1~3, 2 bits) indicating the number of OFDM symbols from the head on which control signals are mapped. PHICH transmits HI (HARQ Indicator) that is Ack/Nack (1 or 0, 1 bit) used when receiving an uplink data channel (PUSCH).

PDCCH and ePDCCH (enhanced PDCCH) transmit DCI (Downlink Control Information). DCI is control information (resource assignment information, modulation scheme, etc.) necessary for data channel transmission in DL and UL, in which the number of bits is different according to DCI formats to be used.

Next, mapping of downlink control channels is described. As exemplified in FIG. 6, PCFICH, PHICH and PDCCH are mapped on several OFDM symbols from the head of each subframe. The number of OFDM symbols for mapping is 1-3, which is reported by CFI. The ePDCCH is mapped on the data channel (PDSCH) (details are described later).

Resource assignment for PCFICH, PHICH and PDCCH are performed in units of RGE, as the smallest unit, formed by 4 resource elements. Resource assignment for ePDCCH is performed in units of eRGE, as the smallest unit. Details are described later.

FIG. 7 shows an example of REGs in a case (CFI=3) where 2 Tx (transmission antenna) and 3 OFDM symbols are assigned to control channels.

In the following, details of each control channel, and necessary information for suppression/canceling of each control channel of an interference signal using IRC Type 1/SIC are described in detail.

<Information Necessary for IRC Type 1>

For generating IRC reception weight in IRC Type 1, a channel matrix for the interference signal is necessary, and the channel matrix is obtained by performing channel estimation using a reference signal from an interference cell.

In LTE-Advanced and the like, as reference signals that can be used for channel estimation, there are CRS (Cell-specific Reference Signal), CSI-RS (CSI Reference Signal), DM-RS (DeModulation Reference Signal or UE specific Reference Signal). In the present application, CRS is used for PCFICH, PHICH and PDCCH, and DM-RS is used for ePDCCH.

Here, an outline of channel estimation processing in the user apparatus is described with reference to the flowchart of FIG. 8.

In step 101, calculation of a sequence initial value for the transmitted reference signal is performed. When the reference signal is CRS, PCID (Physical Cell ID), slot number, $N_{CP}$, and MBSFN configuration are necessary for calculating the sequence initial value. $N_{CP}$ is a value indicating whether CP (Cyclic Prefix) length is Normal or Extended, and is 0 or 1.

In step 102, a scrambling sequence is calculated from the sequence initial value calculated in step 101. By steps 101 and 102, the reference signal sequence that is transmitted is specified.

In step 103, a resource on which the reference signal is mapped is specified. In this step, when the reference signal is CRS, system bandwidth, number of antenna ports, and MBSFN configuration become necessary.

Mapping of the reference signal is defined according to the above-mentioned information such as the system bandwidth and the number antenna ports. Thus, the above-mentioned information is necessary. FIG. 9 shows a mapping example of CRS when the layer number is 1.

Returning to FIG. 8, in step 104, channel estimation for the reference signal is performed. Here, for any of the reference signals, when power boosting is applied, it is necessary to correct it. Thus, power boosting information is necessary. The power boosting information is a power ratio between a reference signal and a data signal, for example.

In step 105, channel estimation for the whole resources is performed based on the estimation result obtained in step 104. In this step, for example, a two-dimensional MMSE channel estimation filter described in the non-patent document 2 is used.

FIG. 10 shows a summary of necessary information for performing channel estimation using CRS. As shown in FIG. 10, in pieces of necessary information for performing channel estimation using CRS, pieces of information other than PCID and slot number are difficult for the user apparatus to estimate. By the way, necessary information for channel estimation by DM-RS in ePDCCH is described in explanation of necessary information for ePDCCH suppression.

For generating IRC reception weight, user assignment information in the interference signal is necessary in addition to the channel estimation value. The reason is as follows.

For a user apparatus in a connecting cell, when a control channel is assigned in an interference cell, the signal of the control channel becomes an interference signal. Therefore, a user apparatus performing IRC calculates IRC weights so as to direct null only to resources where the control channel is assigned.

That is, a signal from the interference cell at a resource the same as a resource assigned to the user apparatus for data or control channel reception in the connecting cell becomes an interference signal. Thus, in order to suppress the interference signal, resource assignment information for the interference signal is necessary. In the following, necessary information for control channel suppression in IRC Type 1 is described for each control channel.

(1) Necessary Information for PCFICH Suppression

As described before, PCFICH is a channel for transmitting CFI indicating the number of OFDM symbols starting from the head on which control signals are mapped. As shown in FIG. 11, PCFICH is always transmitted by being multiplexed on the head OFDM symbol of each subframe. The number of REGs to be used is four, and the REGs are mapped substantially at equal intervals over the whole system bandwidth.

For PCFICH suppression, information for specifying REG (non-patent document 3) (PCID, system bandwidth), PCFICH power boosting information, and channel estimation value in PCFICH (CRS based) are necessary. Information shown in FIG. 10 is necessary for obtaining the channel estimation value.

(2) Information Necessary for PHICH Suppression

PHICH is a channel for transmitting Ack/Nack, and is multiplexed only on the head OFDM symbol (normal duration) (FIG. 12), or multiplexed over 2-3 OFDM symbols (extended duration) (FIG. 13) for transmission. In the following, the method for resource assuagement of PHICH is described in more detail.

There is a concept of PHICH group in PHICH. As shown in FIG. 14, one PHICH group is formed by 3 REGs and is mapped at equal intervals over the whole system bandwidth for obtaining frequency diversity gain.

Also, as shown in FIG. 15, 8 PHICHes are multiplexed at the maximum (4 multiplexes for I phase and Q phase respectively) by using orthogonal sequence (Walsh Hadamard sequence) for one PHICH group. Which orthogonal sequence is used is determined by the PHICH sequence.

Also, the PHICH group and the PHICH sequence to be used by each user apparatus are uniquely determined, basically, by the smallest number of RB numbers in resource blocks (RBs) on which the uplink data channel (PUSCH) is mapped (non-patent document 4). However, it is possible to change the group and the sequence intentionally by the cyclic shift amount used for the uplink reference signal such that resources are not concentrated to a part of PHICH groups.

Similarly to PCFICH, for suppressing PHICH, information for specifying REG on which PHICH is mapped (non-patent document 3), PHICH power boosting information and a channel estimation value in PHICH are necessary. In order to specify REG on which PHICH is mapped, PCID, CP length ($N_{CP}$), PHICH group, PHICH duration (1 for normal, 2 or 3 for extended) are necessary. Also, as for extended duration, frame structure type (1=FDD or 2=TDD) and information indicating whether the subframe is an MBSFN subframe are necessary.

For obtaining the channel estimation value in PHICH, information shown in FIG. 10 is necessary.

(3) Necessary Information for PDCCH Suppression

PDCCH is mapped on a resource other than PCFICH and PHICH in several OFDM symbols (specified by CFI) of the head of each subframe. For assignment of PDCCH, REGs other than PCFICH and PHICH are numbered, and the smallest unit for assigning PDCCH is consecutive nine REGs (this is referred to as CCE (Control Channel Element)). FIG. 16 shows an example of REG numbering when CFI=2. REGs 0-8 form one CCE.

The number of CCEs to which one DCI is assigned is determined by an aggregation level. There are four types of aggregation levels which are 1, 2, 4 and 8 each of which value corresponds to the number of CCEs for assignment. Also, the aggregation level is set for each user apparatus based on CQI fed-back from connected user apparatuses such that the level becomes low when the reception quality is good and that the level becomes high when the reception quality is bad. As shown in FIG. 17, when the aggregation level is n, the resource is assigned using only a CCE index that is a multiple of n as a starting position of the resource. This is due to the restriction (tree-based structure) of the assignment method for reducing the number of times of blind search of the user apparatus (UE). The blind search is described later.

Further, a search area which is called search space is set for reducing the number of times of blind search of the user apparatus. As to the search space, there are common search space and UE-specific search space.

The common search space is an area that every user apparatus (UE) commonly searches. Assigned CCEs are a section of 16 CCEs of 0-15. Also, the aggregation level is limited to 4 and 8.

The UE-specific search space is an area that each user apparatus (UE) specifically searches, and the range of CCEs to be assigned is uniquely determined for each UE based on subframe number, and UE-ID (identification information of user apparatus). The aggregation level can take 1, 2, 4 and 8, and there is no limitation. FIG. 8 shows an example of assignment of Common search space and UE-specific search space.

Next, a decoding method (Blind decoding) of PDCCH is described.

Each user apparatus (UE) does not know assigned CCEs, aggregation level and DCI format selected for PDCCH of the own user apparatus. Thus, each user apparatus performs blind decoding for all candidates. CRC is added to DCI transmitted by PDCCH so that error detection is performed. Since UE-ID of each user apparatus (UE) is masked on CRC bits, each user apparatus can detect (decode) only PDCCH addressed to the own user apparatus. It is not possible to decode PDCCH addressed to other UEs masked by UE-ID other than the own UE-ID.

More specifically, for blind decoding in the common search space, all CCEs that may be assigned in the common search space are searched. That is, decoding is tried for ("2 types of aggregation levels=4, 8"×"all of assumed DCI formats").

For decoding in the UE-specific search space, each user apparatus (UE) calculates the own UE-specific search space, and performs decoding for possible PDCCH candidates in the UE-specific search space. That is, decoding is tried for ("4 types of aggregation levels=1, 2, 4, 8"×"all of assumed DCI formats").

For suppressing PDCCH having the above-mentioned characteristics, CFI indicating the range of control channels, information for specifying (blind search) CCE to which UE is assigned in PDCCH, and a channel estimation value in PDCCH are necessary.

For specifying CCE to which UE is assigned in PDCCH, UE-ID of all assigned UEs, information of common search space, and information of UE-specific search space of all assigned UEs are necessary. For calculating UE-specific search space of all UEs, absolute subframe number is necessary. But, it may be a difference between the interference cell and the own cell as for a synchronized network. UE-assigned CCE in PDCCH can be specified by blindly detecting all assignment in PDCCH of the interference signal based on UE-ID of all of assigned UEs.

Information shown in FIG. 10 is necessary for obtaining the channel estimation value in PDCCH.

(4) Information Necessary for ePDCCH Suppression

The ePDCCH (enhanced PDCCH) is a channel defined as an extension of PDCCH, after release 11 of 3GPP, in consideration of effects of capacity of PDCCH exerted on throughput characteristics of MU-MIMO.

In ePDCCH of release 11, two mapping methods are supported, which are localized mapping (FIG. 19) and distributed mapping (FIG. 20).

In the localized mapping, DCI is mapped to one ePDCCH resource (1 PRB pair) or to a part of the one ePDCCH resource In the localized mapping, frequency scheduling gain is obtained by using CQI. In the distributed mapping, DCI is mapped to a plurality of (or all of) ePDCCH resources. Accordingly, frequency diversity is obtained.

Also, in ePDCCH, eREG (enhanced Resource Element Group) and eCCE (enhanced Control Channel Element) are defined (non-patent document 5).

It is defined that 16 eREGs are included in one PRB pair (12 subcarriers×14 OFDM symbols). Also, it is defined that, in one PRB pair, one eCCE is formed by 4 or 8 eREGs, and the total number of eCCEs are determined by the number of PRBs assigned for ePDCCH.

The case where one eCCE is formed by 4 eREGs corresponds to normal subframe (normal CP) or special subframe configs 3, 4, 8 (normal CP). The case where one eCCE is formed by 8 eREGs corresponds to special subframe configs 1, 2, 6, 7, 9 (normal CP), normal subframe (extended CP) and special subframe configs 1, 2, 3, 5, 6 (extended CP). FIG. 21 shows an example in which eCCE is formed by 4 eREGs. As for assignment of DCI to eCCE, the assignment method of PDCCH is reused by regarding eCCE as CCE.

As described before, ePDCCH is a UE-specific control signal, in which data demodulation is performed by DM-RS. Following information is necessary as information necessary for channel estimation by DM-RS in ePDCCH.

That is, DM-RS scrambling initial sequence value
$n_{ID,i}^{EPDCCH}$
and
$n_{SCID}^{EPDCCH}$
are necessary for calculation of the sequence initial value. As mapping information, CP length, slot number, the number of antenna ports p∈{107, 108, 109, 110}, and the number of RBs to which ePDCCH is assigned are necessary.

Information shown in FIG. 22 is transmitted to the user apparatus (UE) by RRC for specifying subframe and PRB pair to which ePDCCH is assigned. Accordingly, the DM-RS scrambling initial sequence value is transmitted to UE (non-patent document 6). FIG. 22 shows necessary information for interference signal suppression of control channels in transmitted information. Also,
$n_{SCID}^{EPDCCH}$
is a constant (=2), and is known.

For suppressing ePDCCH having the above-mentioned characteristics, information for specifying subframe and PRB pair to which ePDCCH is assigned, information for specifying eCCE to which user apparatus (UE) is assigned in ePDCCH, and channel estimation value (DM-RS based) in ePDCCH are necessary.

More specifically, for specifying subframe and PRB pair to which ePDCCH is assigned, RRC signaling information (a part of it is not necessary) shown in FIG. 22 is necessary. Also, for specifying eCCE to which user apparatus (UE) is assigned in ePDCCH, UE-ID of all of assigned UEs, common search space information (ePDCCH is defined only in UE-specific search space currently), and UE-specific search space information of all of assigned UEs are necessary. Although subframe number is necessary, it may be a difference between the interference cell and the own cell as for a synchronized network. All assignments (eCCE) of ePDCCH of the interference signal are blindly detected based on UE-ID of all of assigned UEs.

Necessary information for channel estimation based on DM-RS in ePDCCH is as described before. FIG. 23 shows a summary of the information.

<Information Necessary for SIC>

As mentioned above, in order to perform successive interference cancellation, it is necessary to generate a replica signal for every interference signal. For achieving this, first, information for performing channel estimation for each interference signal is necessary. This information is the same as the information necessary for the before-mentioned IRC Type 1. As for SIC, in addition to the necessary information for IRC Type 1, additional information is further necessary for demodulation of the interference signal. This additional information is described for each control channel.

(1) Information Necessary for Canceling PCFICH

In addition to the information for suppressing, the scrambling sequence initial value is necessary for demodulation. For obtaining this, PCID, and slot number (ns) are necessary. However, since these pieces of information are included in the information necessary for IRC Type 1 as described before, additional information is not necessary. By the way, the modulation scheme is QPSK fixed.

(2) Information Necessary for Canceling PHICH

In addition to the information necessary for suppressing, it is necessary to specify the scrambling sequence initial value for demodulation, and the orthogonal sequence used by each assigned UE. For obtaining the scrambling sequence initial value, PCID, and slot number (ns) are necessary. However, since these pieces of information are included in the information necessary for IRC Type 1 as described before, additional information is not necessary. For specifying the orthogonal sequence used by each UE, PHICH sequence of assigned UE is necessary. By the way, the modulation scheme is BPSK fixed.

(3) Information Necessary for Canceling PDCCH

It is necessary to specify CCE to which UE is assigned in PDCCH and to decode transmission data. However, since these are blindly decoded, necessary information is the same as the information for the case of suppression. By the way, the modulation scheme is QPSK fixed.

(4) Information Necessary for Canceling ePDCCH

It is necessary to specify CCE to which UE is assigned in ePDCCH and to decode transmission data. However, since these are blindly decoded, necessary information is the same as the information for the case of suppression. By the way, the modulation scheme is QPSK fixed.

<Summary of Necessary Information for Reducing Control Channels>

As described so far, as the information necessary for reducing control channels, there are information necessary for channel estimation and information on assignment. The information necessary for channel estimation is as shown in FIG. 10 (Section 6.10 and the like in non-patent document 3) and FIG. 23. A summary of information on assignment is shown in FIG. 24.

In these pieces of information necessary for reducing control channels, only PCID and slot number are known information (that can be estimated by PSS/SSS), and other pieces of information are difficult to estimate.

As mentioned above, in the present control signal configuration of the LTE-Advanced, there is a shortage of information in the user apparatus for performing IRC Type 1 and SIC by which interference reduction ability is high. Thus, it is difficult for the user apparatus to perform IRC Type 1 and SIC.

The present invention is contrived in view of the above-mentioned points, and an object of the present invention is to enable the user apparatus to have high interference reduction ability for a signal of a control channel that causes interference.

One or more embodiments of the present invention is configured as a user apparatus in a radio communication system including a plurality of base stations, including:

reception means that receives, from a connecting base station, control information to be used for reducing a signal of a control channel, that causes interference, sent from an interference base station for the user apparatus; and interference reducing means that reduces the signal of the control channel that causes the interference by using the control information to obtain a desired signal sent from the connecting base station.

The reception means receives the control information as downlink control information that is transmitted by a downlink physical channel from the connecting base station, or, receives the control information by RRC signaling from the connecting base station.

In a case where the reception means receives the control information by RRC signaling from the connecting base station, with respect to a control channel, in control channels that cause the interference, that is detected by searching resources specific for each user apparatus to perform blind-decoding, the reception means may receive identification information of a user apparatus connected to the interference base station by a downlink physical channel as a part of information for reducing the signal of the control channel.

The user apparatus may include estimation means that estimates a part of the control information necessary for reducing the signal of the control channel that causes the interference by using control information received from the connecting base station.

The interference reducing means is means that performs interference rejection combining reception based on channel estimation of an interference signal, or, means that performs successive interference cancellation.

Also, the present invention may be configured as a base station connecting with a user apparatus in a radio communication system, including:

reception means that receives, from an interference base station, control information to be used by the user apparatus for reducing a signal of a control channel, that causes interference, sent from the interference base station for the user apparatus; and transmission means that transmits the control information to the user apparatus as downlink control information by a downlink physical channel, or, transmits the control information to the user apparatus by RRC signaling.

In a case where the transmission means transmits the control information to the user apparatus by RRC signaling, with respect to a control channel, in control channels that cause the interference, that is detected by searching resources specific for each user apparatus to perform blind-decoding, the transmission means my transmit identification information of a user apparatus connected to the interference base station by a downlink physical channel as a part of information for reducing the signal of the control channel.

Also, the present invention may be configured as an interference reducing method executed in the user apparatus, and an interference reducing control information notification method executed by the base station.

According to one or more embodiments of the present invention, it is possible to provide a technique to enable the user apparatus to have high interference reduction ability for a signal of a control channel that causes interference.

BRIEF DESCRIPTION OF THE DRAWINGS

FIG. 1 is a diagram for explaining reduction of interference from an interference cell;

FIG. 2 is a diagram for explaining interference rejection combining (IRC) reception;

FIG. 10 is a diagram showing necessary information for performing channel estimation by using CRS;

FIG. 22 is a diagram showing necessary information for specifying subframe and PRB pair to which ePDCCH is assigned for interference signal suppression;

FIG. 24 is a diagram showing necessary information for reducing control channels;

FIG. 25 is a diagram showing an example of pattern 1 and an example of pattern 3;

FIG. 26 is a diagram showing an example of pattern 2 and an example of pattern 4;

FIG. 30 is a diagram of showing a DCI format example in an example 1-1;

FIG. 32 is a diagram (1/2) showing information that should be included in DCI, and information for which inclusion in DCI may not be necessary (arbitrary);

FIG. 33 is a diagram (2/2) showing information that should be included in DCI, and information for which inclusion in DCI may not be necessary (arbitrary);

FIG. 34 is a diagram for explaining processing in the example 1-2;

FIG. 44 is a diagram for explaining information necessary for enabling the UR to perform SIC in the third embodiment;

DETAILED DESCRIPTION

Figure 3:
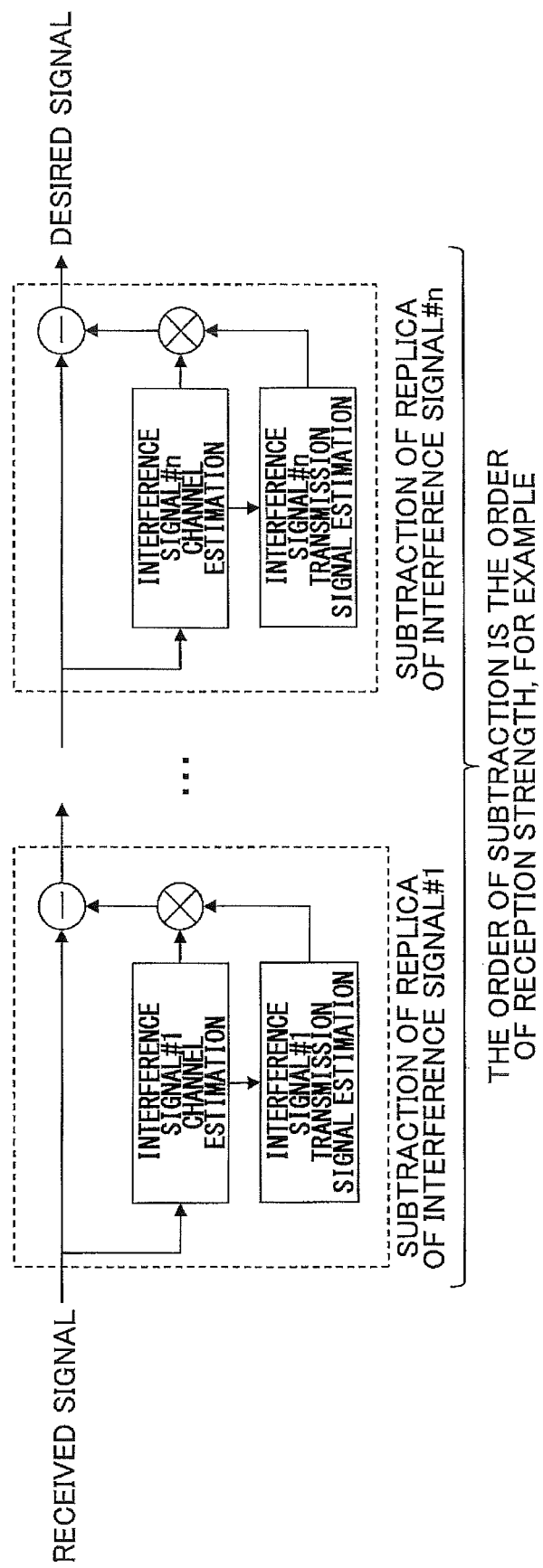
FIG. 3 is a block diagram showing a functional configuration example of a user apparatus that performs SIC.
Figure 4:
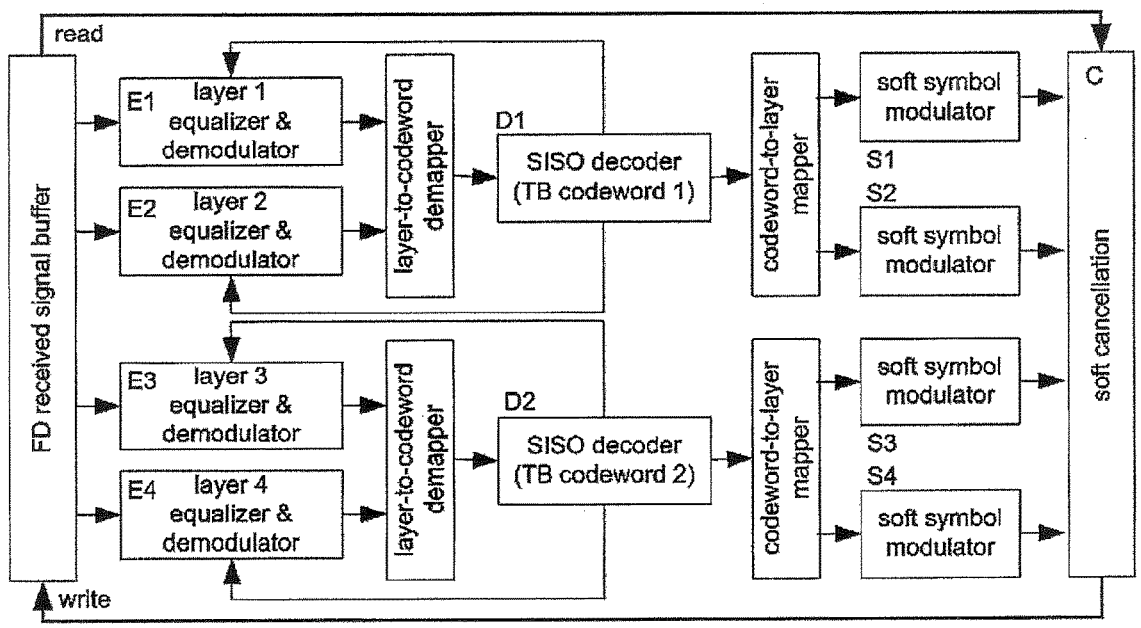
FIG. 4 is a block diagram showing a functional configuration example of SIC using turbo equalization.
Figure 5:
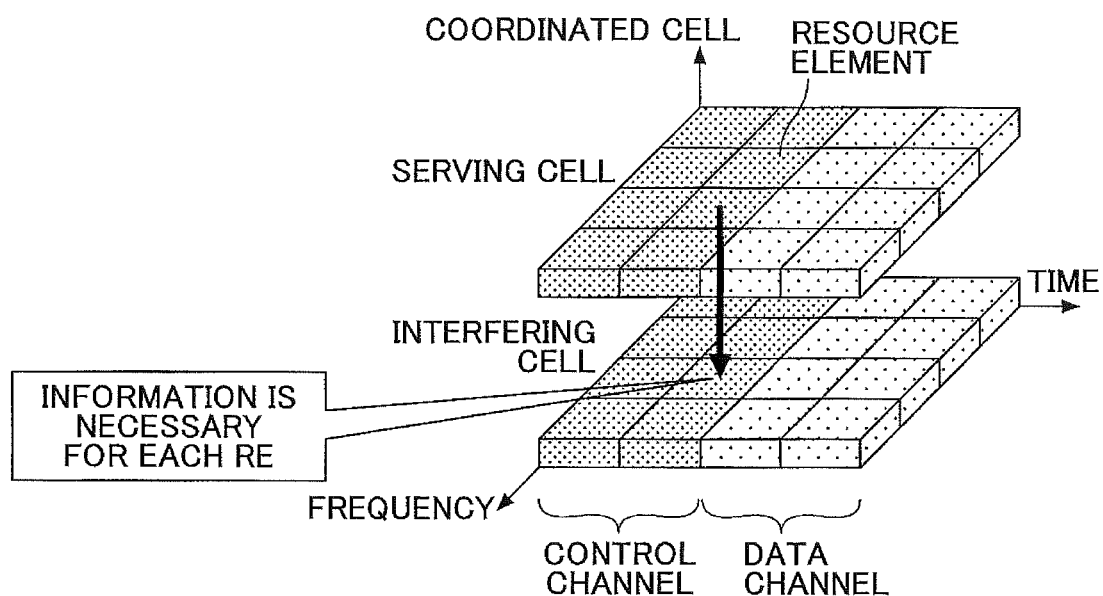
FIG. 5 is a diagram for explaining a summary of necessary information for IRC/SIC.
Figure 6:
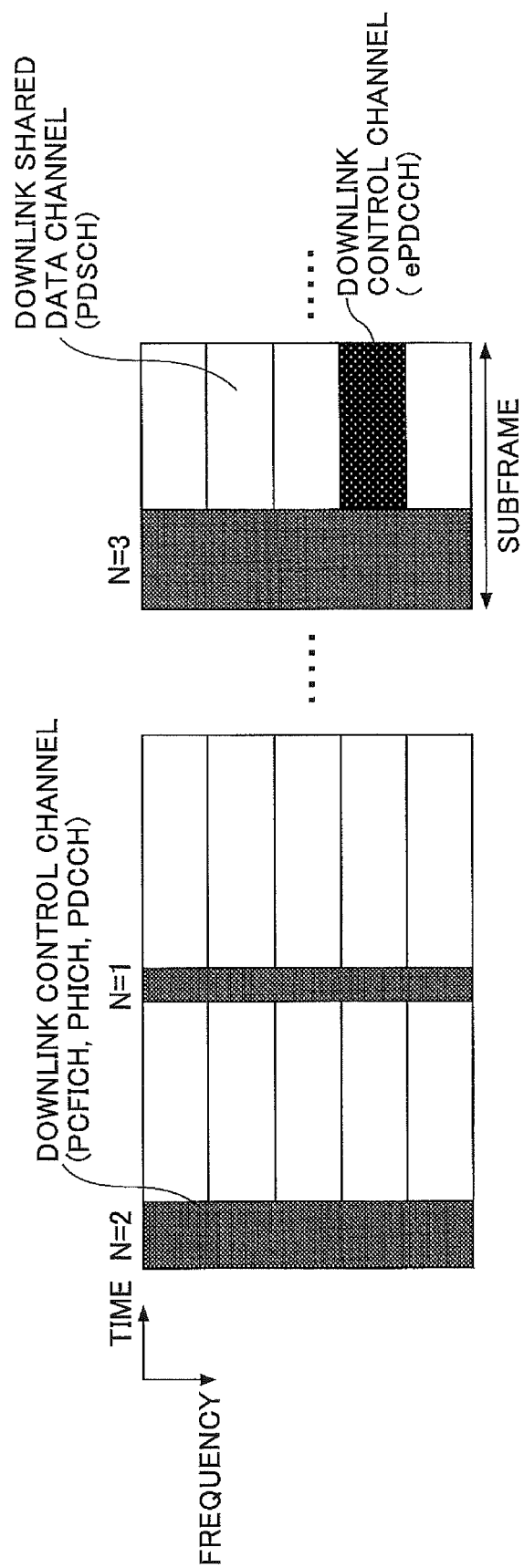
FIG. 6 is a diagram showing a summary of mapping of downlink control channels.
Figure 7:
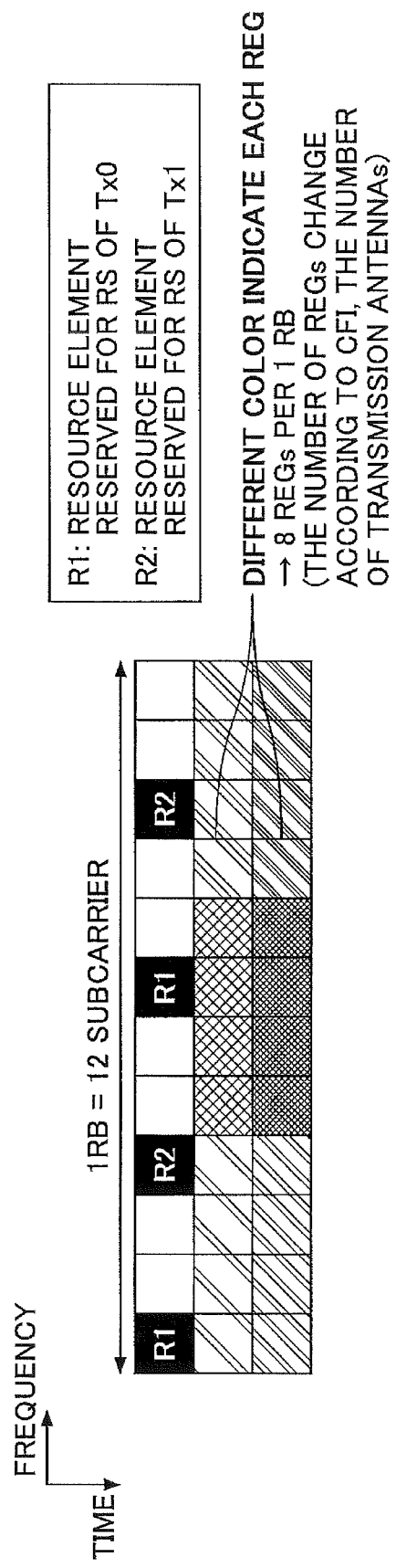
FIG. 7 is a diagram showing an example of REG.
Figure 8:
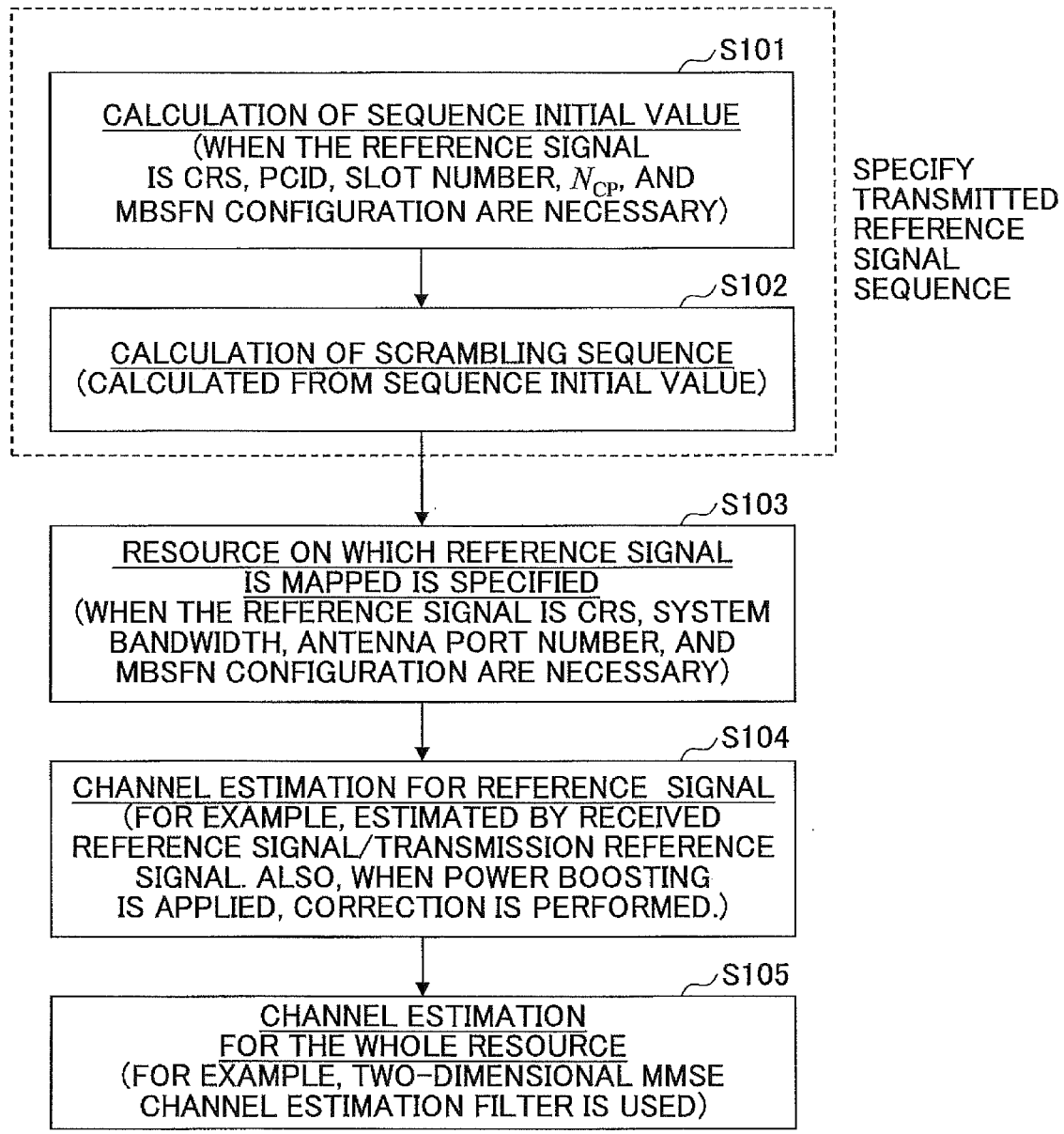
FIG. 8 is a flowchart for explaining an outline of channel estimation processing.
Figure 9:
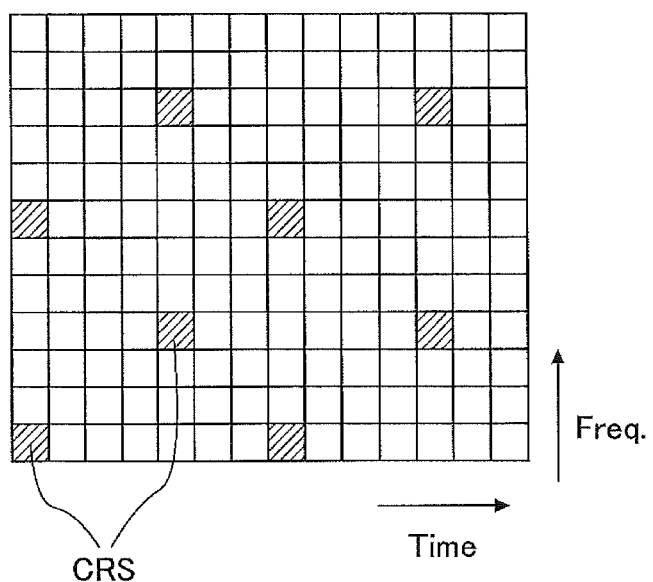
FIG. 9 is a diagram showing a mapping example of CRS.
Figure 11:
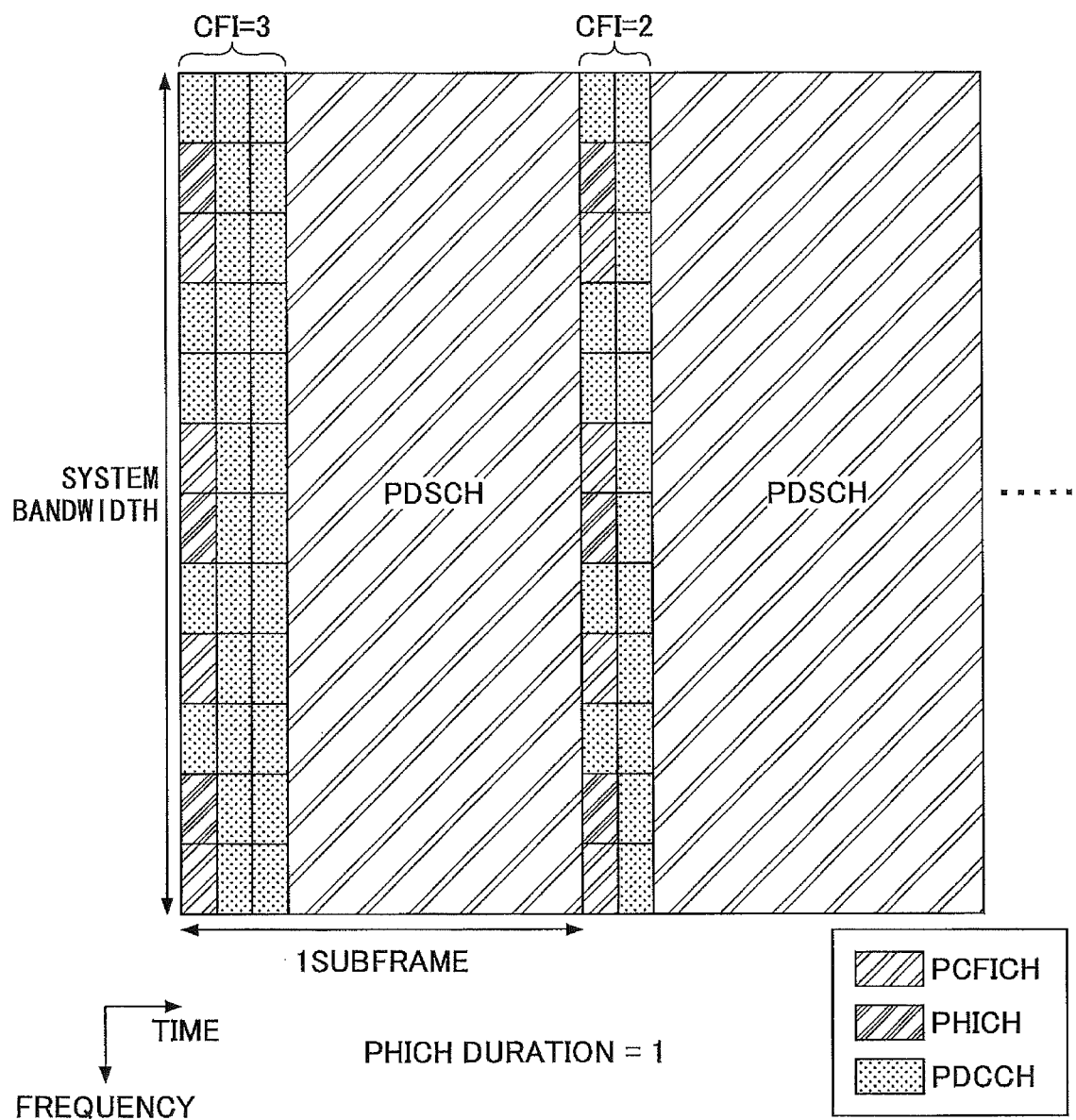
FIG. 11 is a diagram showing assignment of control channels.
Figure 12:
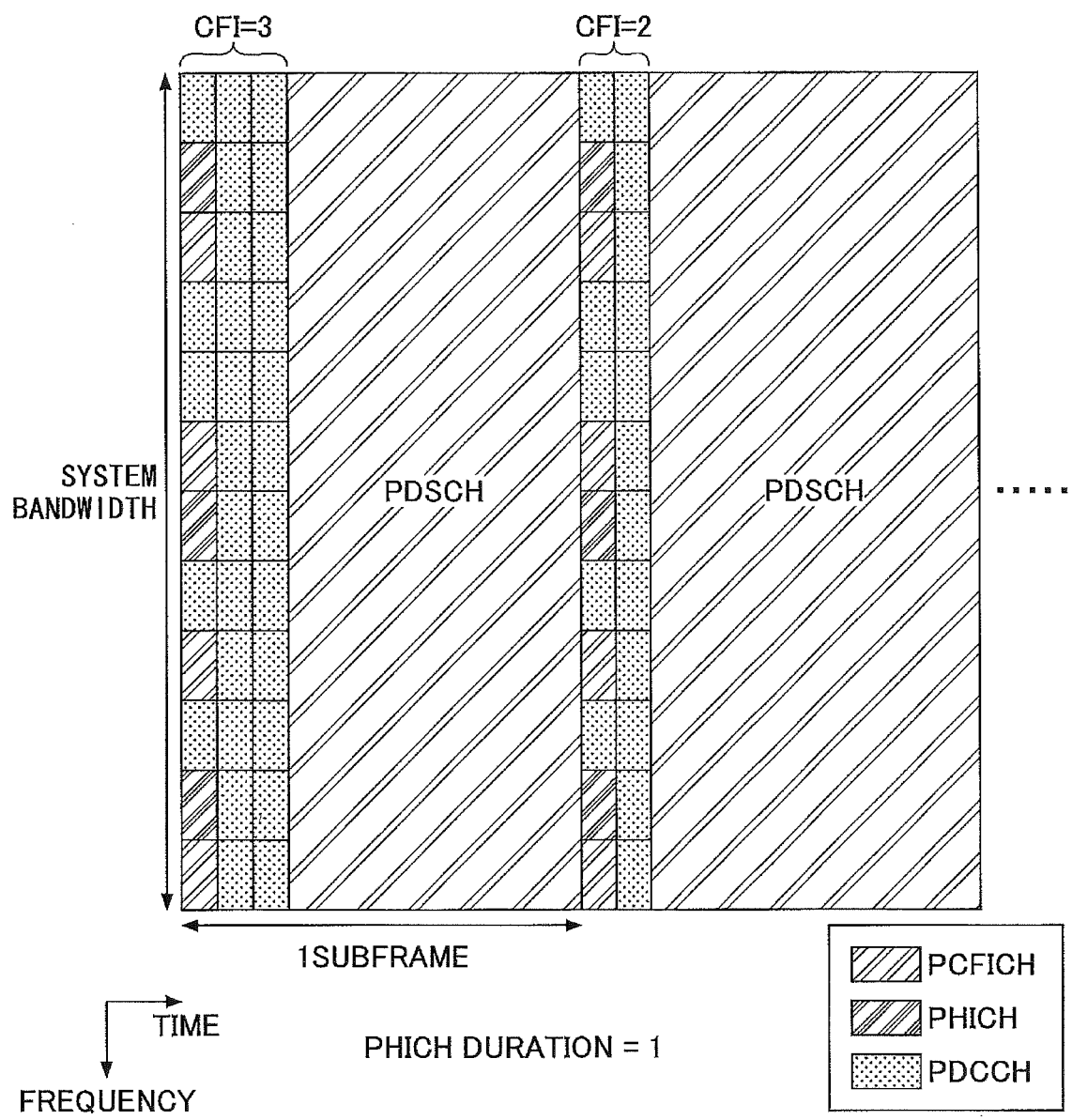
FIG. 12 is a diagram showing an example in which PHICH is assigned to only the head OFDM symbol.
Figure 13:
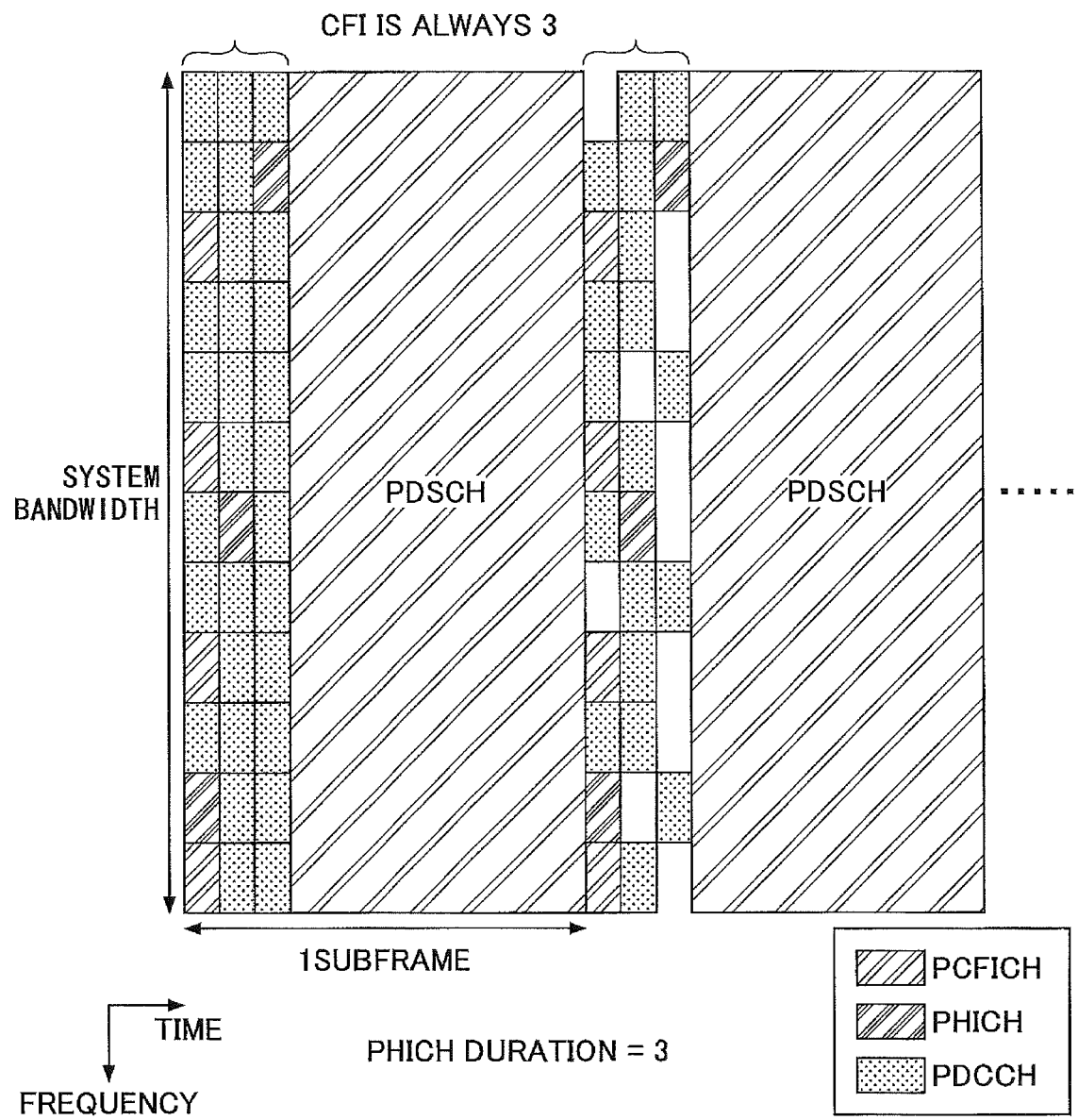
FIG. 13 is a diagram showing an example in which PHICH is assigned to 2-3 OFDM symbols.
Figure 14:
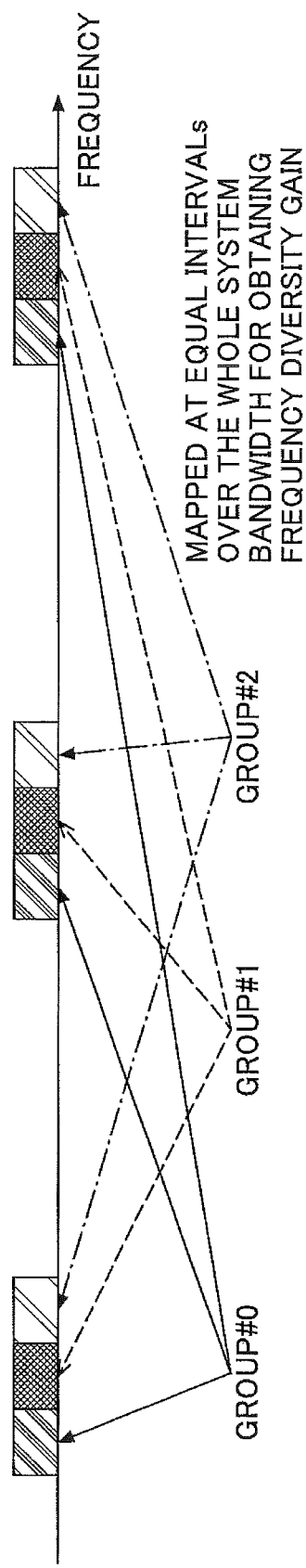
FIG. 14 is a diagram showing PHICH group.
Figure 15:
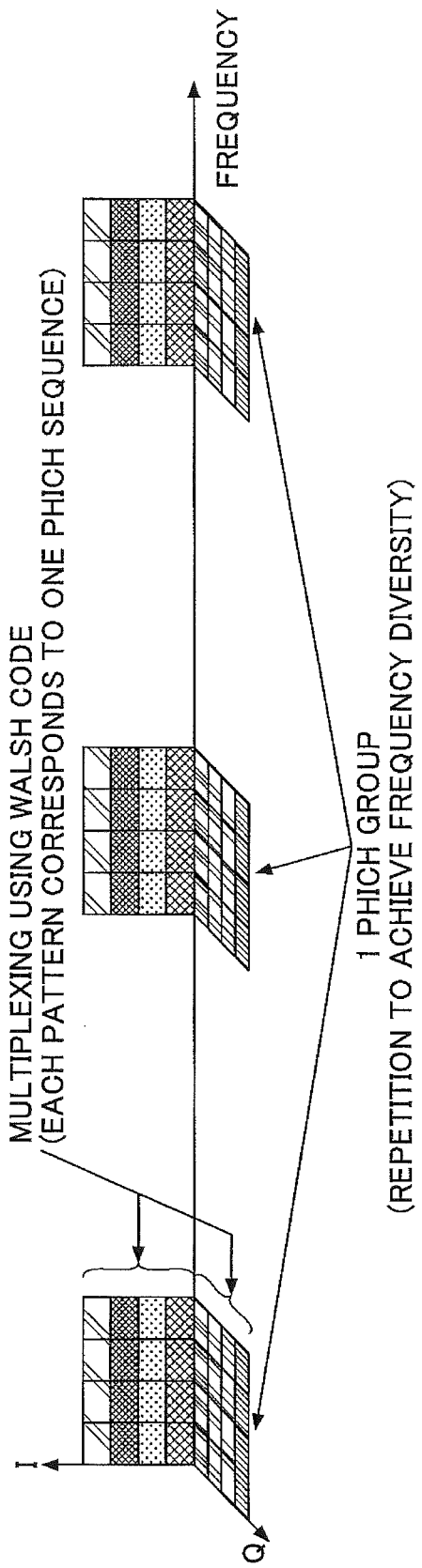
FIG. 15 is a diagram showing PHICH group in normal CP.
Figure 16:
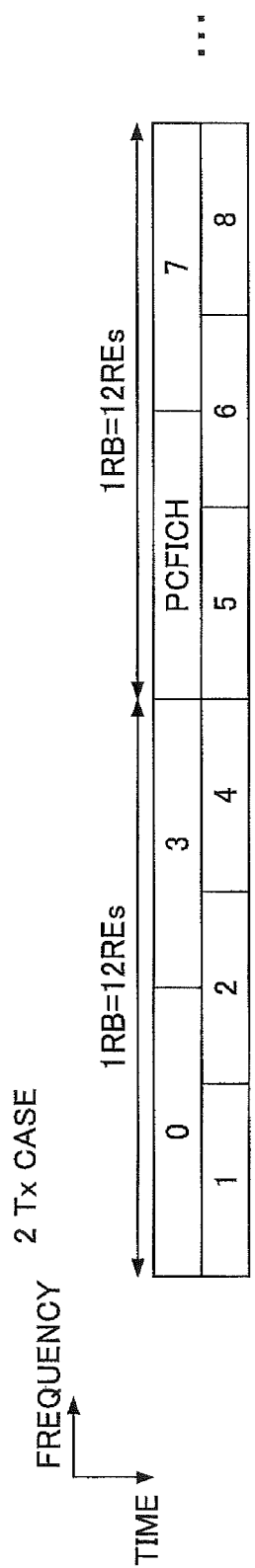
FIG. 16 is a diagram showing an example of numbering of REGs when CFI=2.
Figure 17:
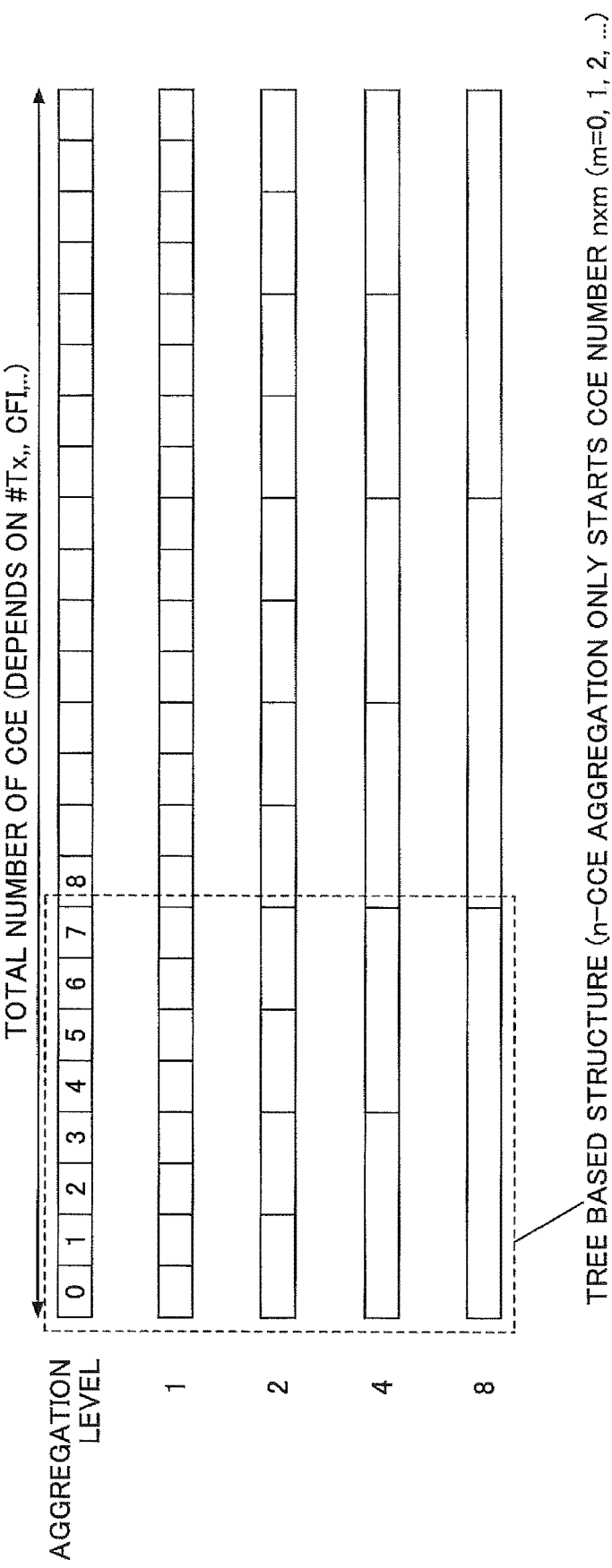
FIG. 17 is a diagram showing an example of Aggregation level.
Figure 18:
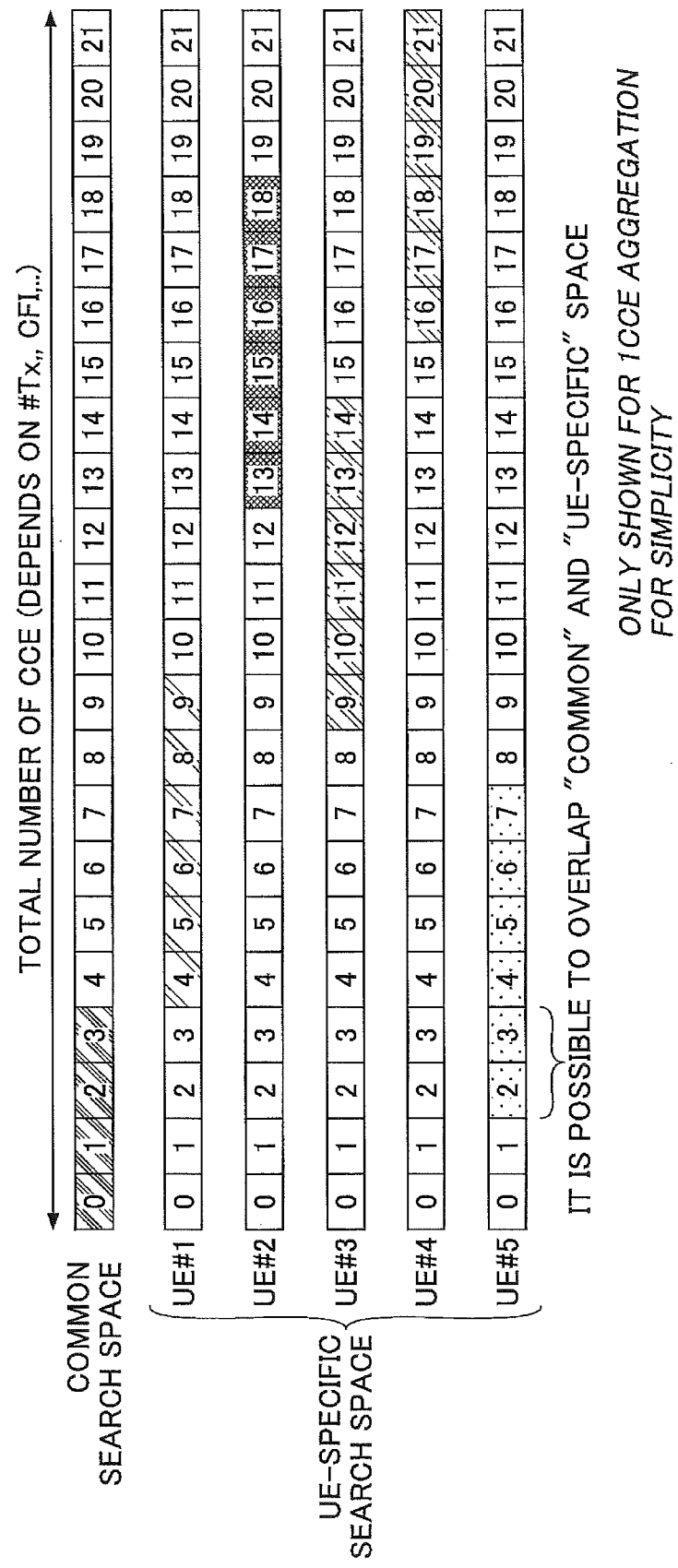
FIG. 18 is a diagram showing an example of search space of PDCCH.
Figure 19:
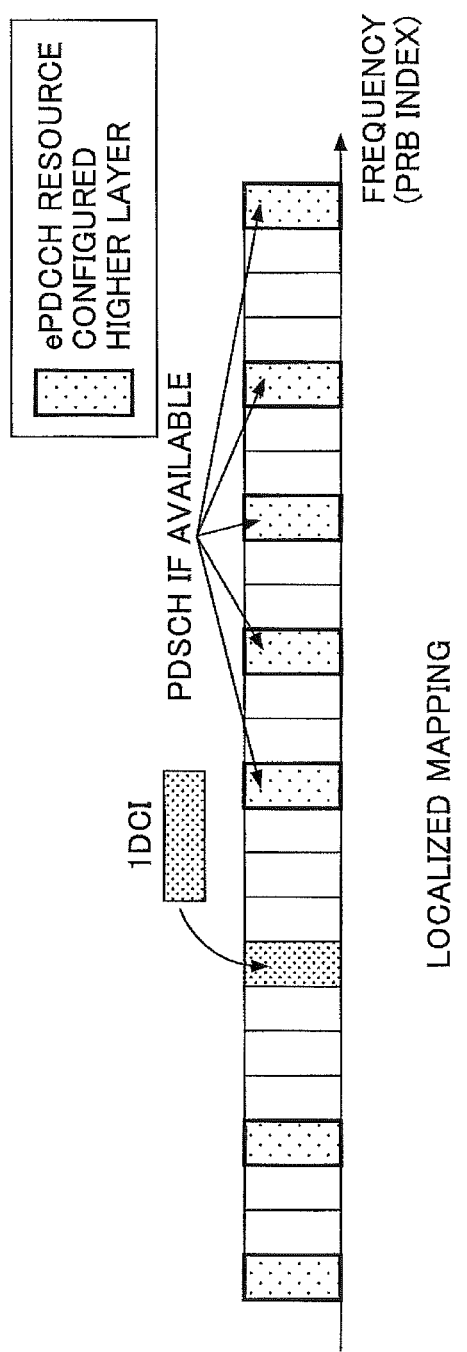
FIG. 19 is a diagram showing an example of Localized mapping in ePDCCH.
Figure 20:
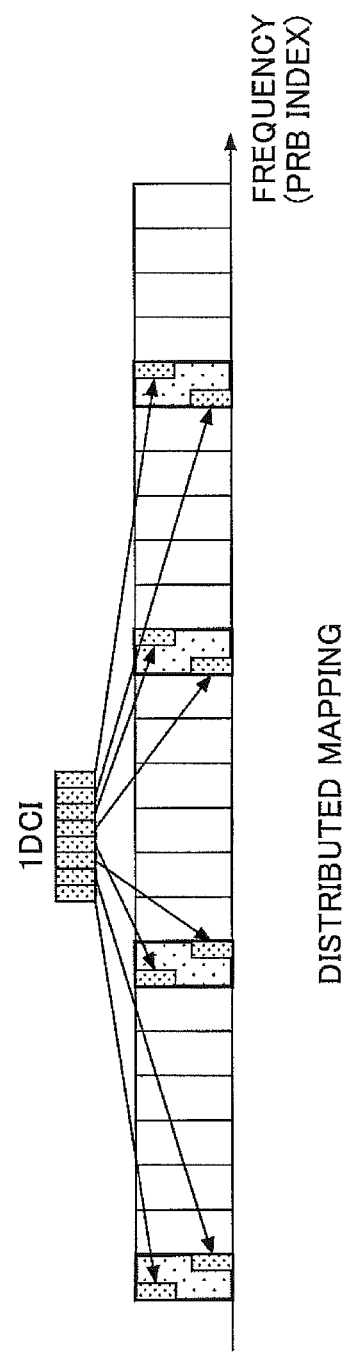
FIG. 20 is a diagram showing an example of Distributed mapping in ePDCCH.
Figure 21:
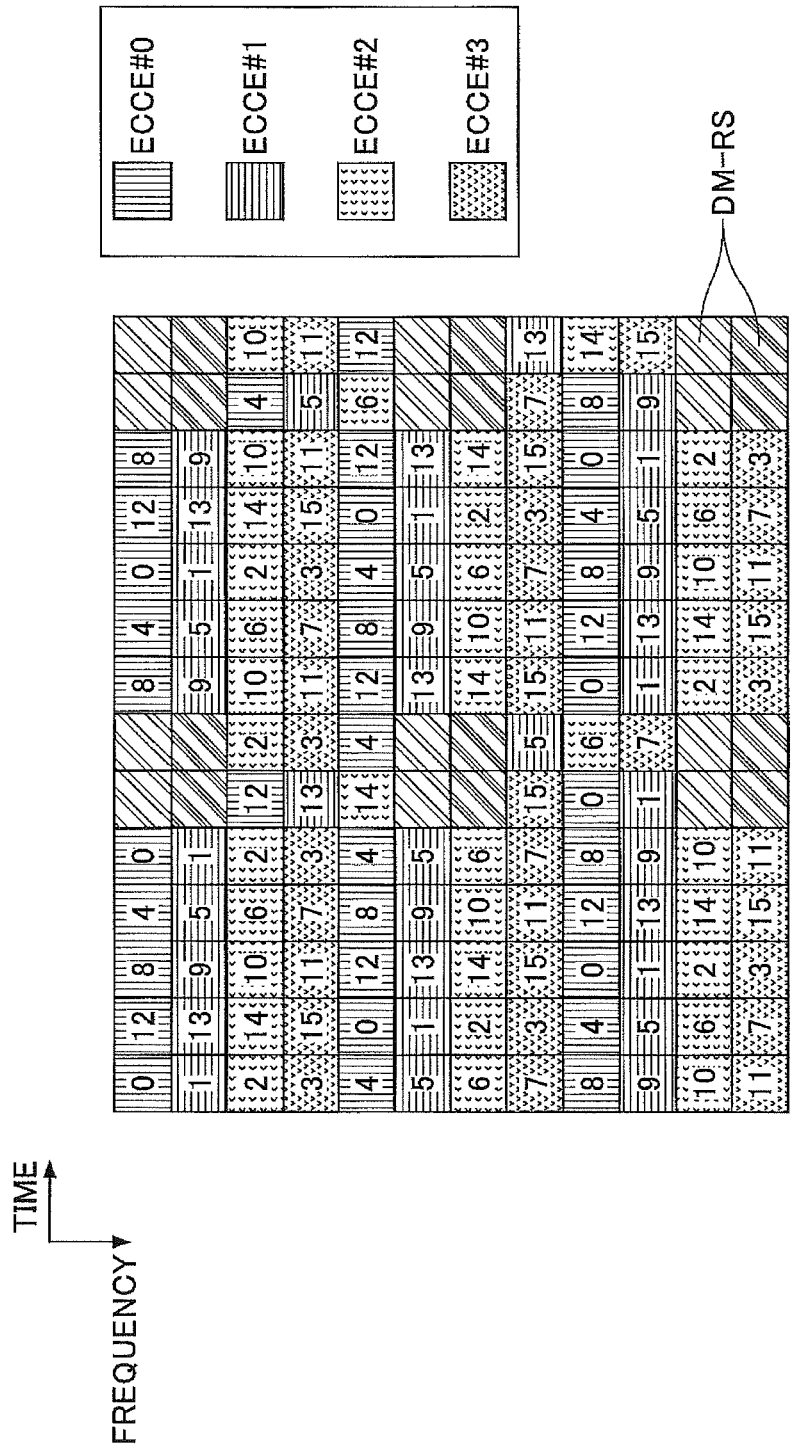
FIG. 21 is a diagram showing a case where 1eCCE is formed by 4 eREGs.

In the following, embodiments of the present invention are described with reference to figures. The embodiments described below are merely examples, and the embodiments to which the present invention is applied are not limited to the embodiments below.

(Application Range of Embodiments)

Interference reduction is performed for improvement of reception quality of control signals (including ePDCCH) of the own cell (connecting cell), and for improvement of reception quality of data signals (PDSCH) of the own cell. Then, there are four patterns, which are a pattern 1 for reducing control channels (including ePDCCH) that cause interference for improving reception quality of the own control signals (including ePDCCH), a pattern 2 for reducing data signals (PDSCH) that cause interference for improving reception quality of the own control signals (including ePDCCH), a pattern 3 for reducing control channels (including ePDCCH) that cause interference for improving reception quality of the own data signals (PDSCH), and a pattern 4 for reducing data signals (PDSCH) that cause interference for improving reception quality of the own data signals (PDSCH).

FIG. 25 shows an example of the pattern 1 and the example of the pattern 3, and FIG. 26 shows an example of the pattern 2 and an example of the pattern 4.

Targets of embodiments of this application are the pattern 1 and the pattern 3 (FIG. 25). But, the present invention is not limited to these patterns. Also, embodiments of the prior application (JP2012-288896) are targeted for the patter 2 and the pattern 4 (FIG. 26). But, the invention of the prior application is not limited to these patterns.

Outline of Embodiment

As mentioned above, in the present control signal configuration of the LTE-Advanced and the like, there is a shortage of information in the user apparatus for performing IRC Type 1 and SIC, for control signals that cause interference, by which interference reduction ability is high. Thus, it is difficult for the user apparatus to perform IRC Type 1 and SIC.

As techniques for solving the above-mentioned problem, first, an embodiment is described as a first embodiment in which, basically, in order to perform IRC type 1, information necessary in the user apparatus is dynamically sent from the NW side. Next, an embodiment is described as a second embodiment in which, basically, in order to perform IRC type 1, information necessary in the user apparatus is semi-statically sent from the NW side.

Also, an embodiment is described as a third embodiment in which, basically, necessary information for enabling operation of SIC is sent from the NW side.

First Embodiment

Figure 27:
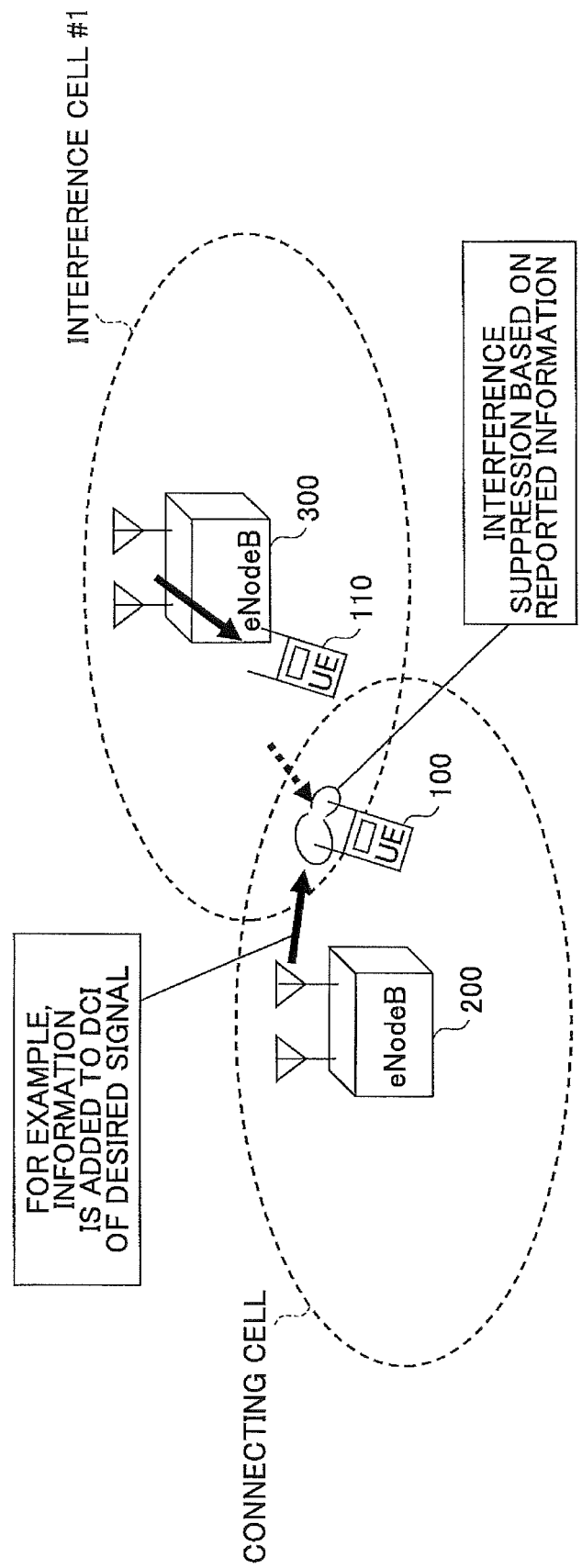
FIG. 27 is a schematic block diagram of a radio communication system of an embodiment of the present invention.

FIG. 27 shows a schematic block diagram of a radio communication system of the present embodiment. The system of the present embodiment is a radio communication system of the LTE-Advanced scheme, for example, in which a base station 200 (eNodeB) (connecting base station) forms a connecting cell, and a user apparatus 100 (UE) in the cell performs communication with the connecting base station 200 by a desired signal. The radio communication system of the present embodiment includes at least functions defined in the LTE-Advanced. But, the present invention is not limited to the scheme of the LTE-Advanced, and the present invention can be applied also to schemes other than LTE-Advanced.

Normally, the radio communication system is provided with many base stations. However, FIG. 27 only shows the connecting base station 200 and the base station 300 adjacent to the connecting base station 200. This adjacent base station 300 also forms a cell to perform signal transmission and reception with a user apparatus 110 for which the base station 300 is a connecting base station. A signal of a control channel transmitted from the adjacent base station 300 to the user apparatus 110 for which the base station 300 is a connecting base station becomes an interference signal for the user apparatus 100. Therefore, in the present embodiment, the adjacent base station 300 is called an interference base station. Also, a cell of the interference base station 300 is called an interference cell. Although, in general, there are a plurality of interference base stations for a connecting base station, FIG. 27 shows only one interference base station.

Figure 23:
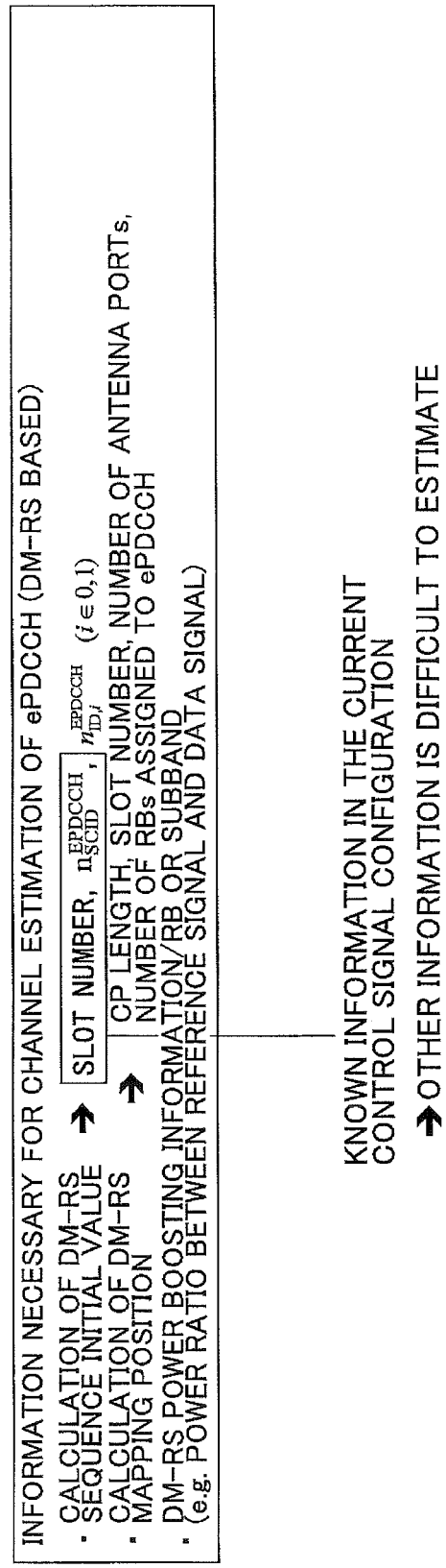
FIG. 23 is a diagram showing necessary information for DM-RS based channel estimation in ePDCCH.

In the first embodiment, as shown in FIG. 27, basically, the connecting base station 200 dynamically sends, to the user apparatus 100, information necessary for performing IRC type 1 by using a control channel for transmitting a physical layer control signal or a data channel (these channels can be collectively referred to as downlink physical channel). The channel for transmitting the physical layer control signal is PDCCH (physical downlink control channel) or PDSCH (physical downlink shared channel, data channel), for example. The control signal transmitted by the channel is downlink control information (DCI). The information necessary for IRC Type 1 is information described with reference to FIGS. 10, 23 and 24, and the like, that is, information necessary for channel estimation of the interference signal and assignment information of the interference signal. In the following, there is a case in which the information necessary for executing the IRC Type 1 is called IRC Type 1 necessary information.

Figure 28:
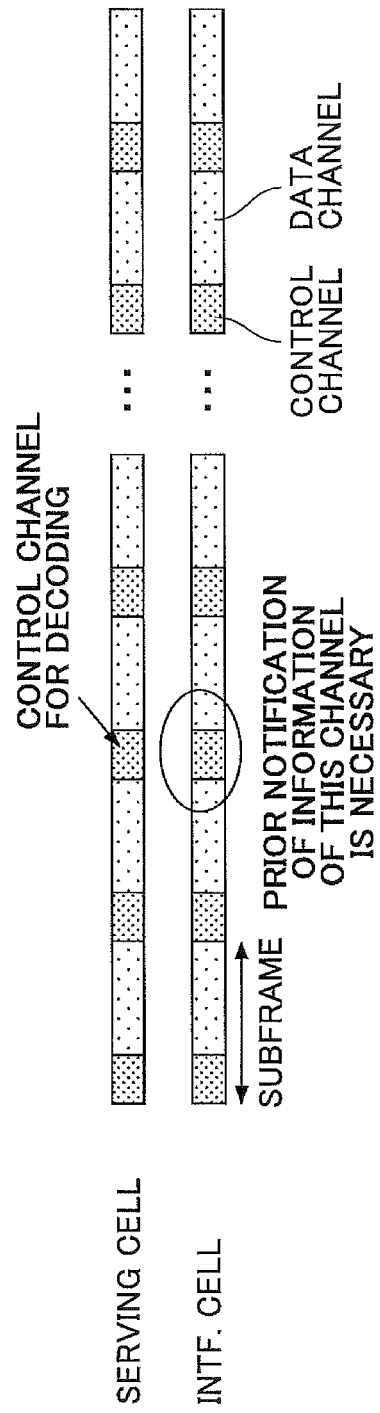
FIG. 28 is a diagram showing that it is necessary to report in advance necessary information for suppressing control channels in the interference cell.

Also, as shown in FIG. 28, in the present embodiment, there is a case where control channels of the connecting cell and the interference cell overlap with each other, it is necessary to transmit information necessary for suppressing the signal of the control channel of the interference cell beforehand.

Figure 29:
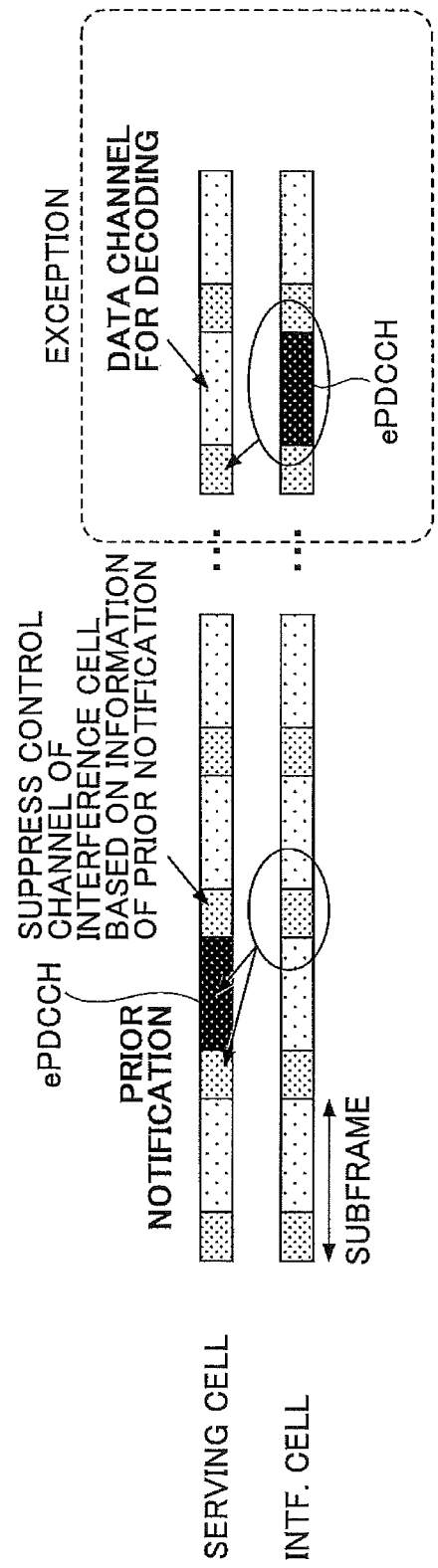
FIG. 29 is a diagram showing reporting in advance necessary information for suppressing control channels in the interference cell.

Therefore, in the present embodiment, as shown in FIG. 29, IRC Type 1 necessary information is transmitted in advance by a control channel (PDCCH or ePDCCH, or the like) or a data channel of a past subframe. However, in a case where the target for suppression is only the signal of ePDCCH, the prior notification is unnecessary for a synchronized network in which CFI of connecting cell is the same as CFI of the interference cell. This is because the IRC Type 1 necessary information can be received by a control channel before receiving ePDCCH that is the target for suppression.

In the following, the first embodiment is described using more concrete examples. Apparatus configurations (functional block) and operation based on the configurations are described after explaining each example.

Example 1-1

In the example 1-1, basically, the connecting base station 200 sends, to the user apparatus 100, all pieces of information necessary for executing IRC Type 1 by a control channel (PDCCH, ePDCCH and the like) or by a data channel. That is, the connecting base station 200 describes IRC Type 1 necessary information in a format of DCI (Downlink Control Information), and sends the DCI to the user apparatus 100.

The method for the connecting base station 200 to determine interference cells for the user apparatus 100 is not limited to a particular method in the present invention. For example, the interference cell may be specified by received quality information from the user apparatus 100, or the interference cell may be specified by exchanging assignment information and the like between base stations.

Figure 31:
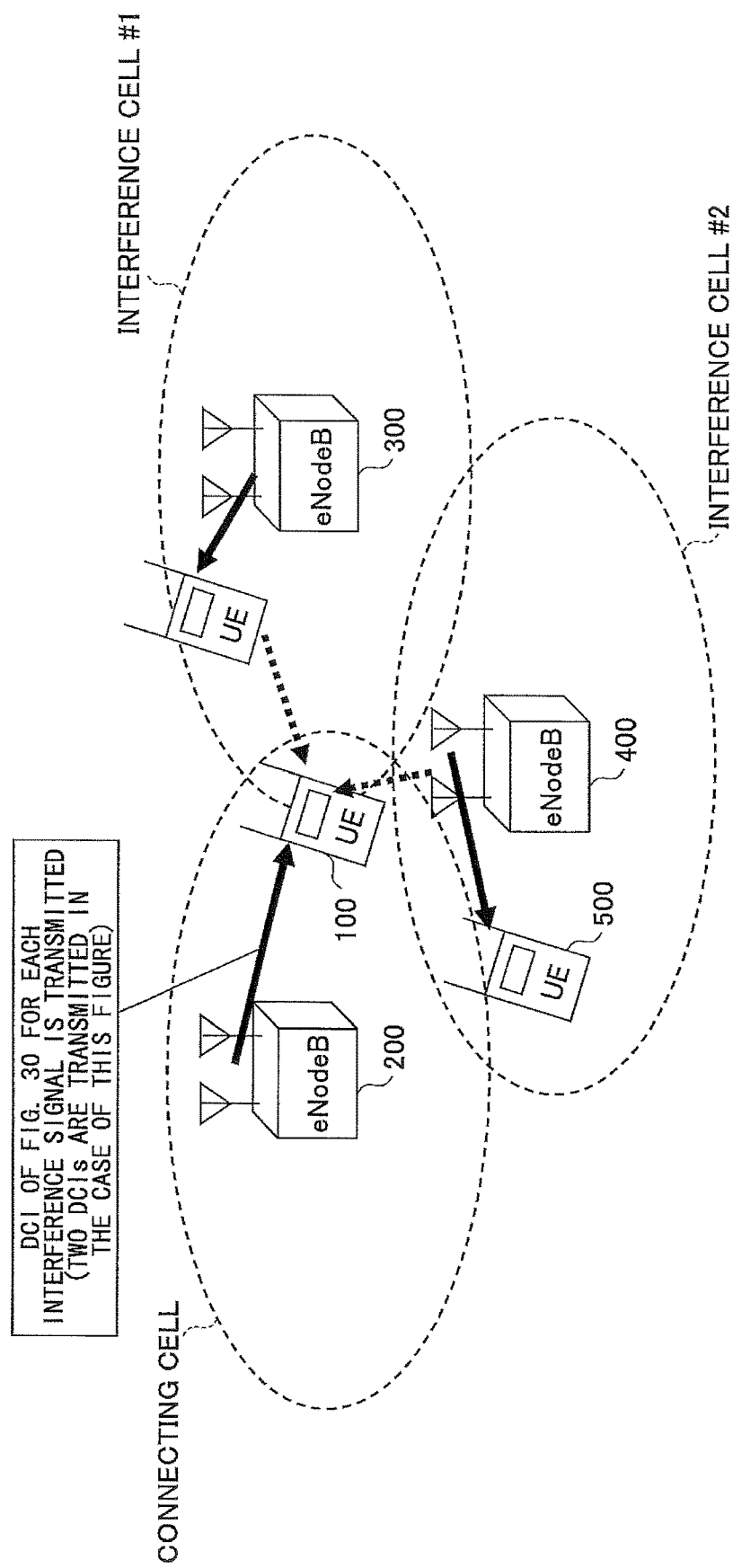
FIG. 31 is a diagram for explaining processing in the example 1-1.

In the example 1-1, a case for suppressing PFICH, PHICH and PDCCH is described with reference to FIGS. 30 and 31. In this example, as shown in FIG. 30, DCI in which IRC Type 1 necessary information is described is sent from the connecting base station 200 to the user apparatus 100 as shown in FIG. 31. As shown in FIG. 31, in this example, there are two interference cells (interference cell #1 and interference cell #2) for the user apparatus 100. Thus, two pieces of IRC Type 1 necessary information are sent to the user apparatus 100. In the case where the connecting base station 200 sends two pieces of IRC Type 1 necessary information to the user apparatus 100, two pieces of information for the two interference cells may be described in the DCI format shown in FIG. 30 for each information element, or, IRC Type 1 necessary information for one interference cell is described in the DCI format shown in FIG. 30, and DCI of the same format as the DCI shown in FIG. 30 may be added, next to the last information, as IRC Type 1 necessary information of the second interference cell.

FIGS. 30 and 31 show the case for suppressing PFICH, PHICH and PDCCH. Also as to ePDCCH, the IRC Type 1 necessary information can be sent in the same way as PFICH, PHICH and PDCCH except for change of the content of information for suppressing ePDCCH.

In the example 1-1, instead of sending by the control channel or the data channel all pieces of information necessary for executing IRC Type 1 by describing the information in DCI, a part of pieces of information necessary for executing IRC Type 1 may be sent by the control channel or the data channel by describing the part of the information in DCI. The reason is that, as to predetermined information in the IRC Type 1 necessary information described in FIGS. 10, 23, 24 and the like, IRC Type 1 can be performed without sending the predetermined information.

FIGS. 32 and 33 show information that should be included in DCI and information that may not be included (may be arbitrarily included) in the example 1-1. As to the arbitrary information, even though these pieces of information are not included, IRC Type 1 can be executed. The content shown in FIGS. 32 and 33 can apply to other embodiment.

Example 1-2

In the example 1-2, a part of all pieces of IRC Type1 necessary information is transmitted by the method explained in the example 1-1, and other pieces of information (lacking information) are estimated by the user apparatus 100. As shown in FIG. 34, in this example, the user apparatus 100 can calculate mapping of PCFICH of the interference cell by using control information received from the connecting base station. Thus, the user apparatus 100 estimates CFI from the signal of PCFICH of the interference cell. That is, the user apparatus demodulates the signal of PCFICH of the interference cell to read CFI from the signal of PCFICH. Therefore, in this example, it is not necessary to transmit CFI in the IRC Type 1 necessary information by the method explained in the example 1-1. Information to be estimated by the user apparatus 100 is not limited to CFI. Any information may be estimated as long as it can be estimated.

<Configuration of Apparatus>

Figure 35:
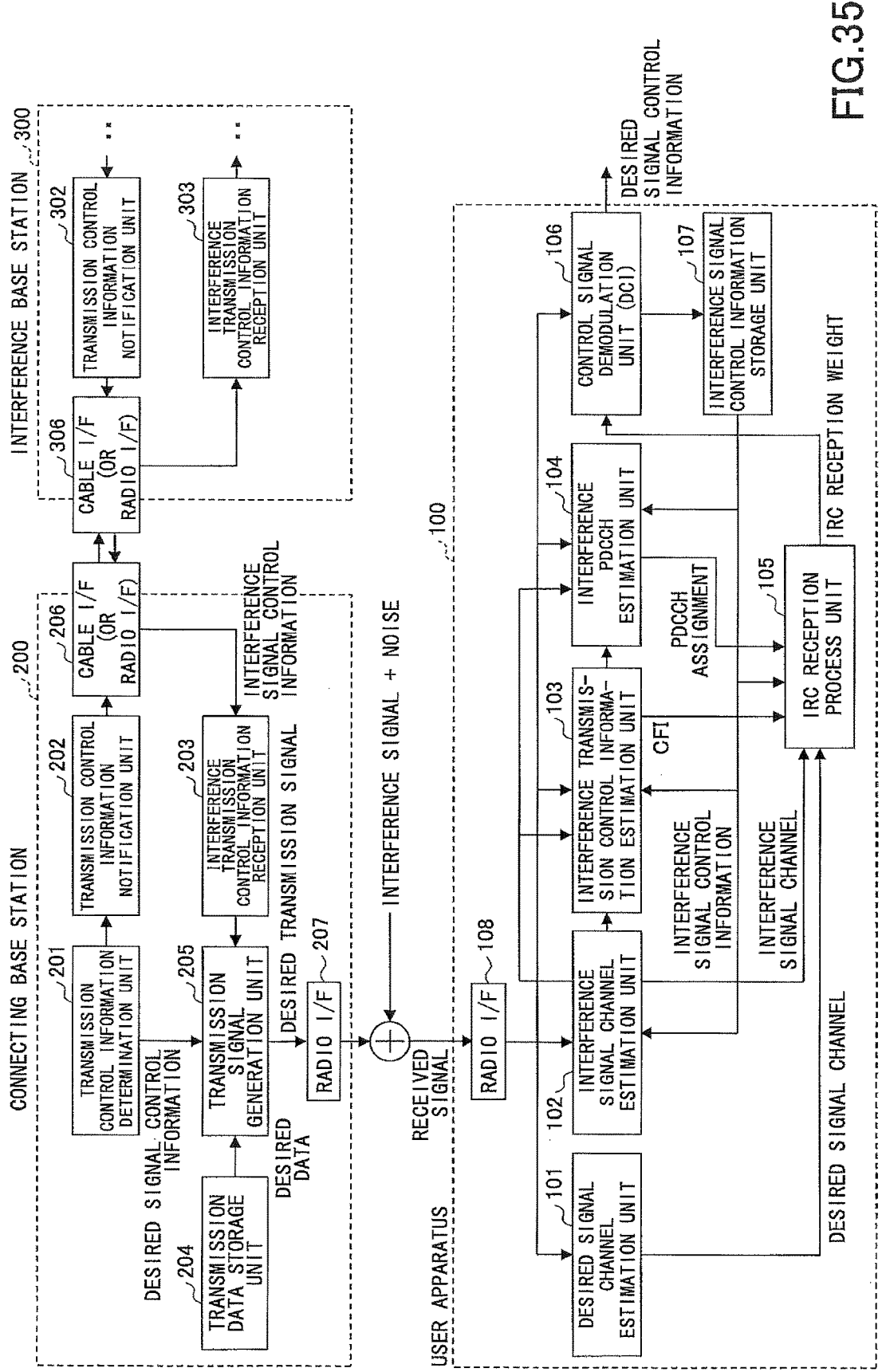
FIG. 35 shows a system block diagram in the first embodiment.

FIG. 35 shows a functional block diagram showing a functional configuration of a communication system of the present embodiment. FIG. 35 shows, as components of the communication system, a connecting base station 200, an interference base station 300, and a user apparatus 100. FIG. 35 is an example for suppressing PFICH, PHICH and PDCCH.

As shown in FIG. 35, the connecting base station 200 includes a transmission control information determination unit 201, a transmission control information notification unit 202, an interference transmission control information reception unit 203, a transmission data storage unit 204, a transmission signal generation unit 205, a cable I/F 206 (or radio I/F 206), and a radio I/F 207. Each base station has the same configuration, thus, the interference base station 300 has the same configuration as that of the connecting base station 200. However, for convenience sake, only a transmission control information notification unit 302, an interference transmission control information reception unit 303 and a cable I/F 306 (or radio I/F 306) are shown for the interference base station 300.

The transmission control information determination unit 201 determines transmission control information of a desired signal. The transmission control information notification unit 202 sends, to another base station, transmission control information of a desired signal necessary for IRC Type1 reception processing. The transmission control information of a desired signal necessary for IRC Type1 reception processing is IRC Type 1 necessary information described with reference to FIGS. 10, 23, 24 and the like.

The interference transmission control information reception unit 203 receives transmission control information of another base station necessary for IRC Type1 reception processing. The transmission control information received here becomes transmission control information of an interference signal that the connecting base station 200 sends to the user apparatus 100.

The transmission data storage unit 204 is a memory for storing transmission data. The transmission signal generation unit 205 generates, based on the transmission control information of the desired signal, a desired transmission signal including the transmission control information of the desired signal, the transmission control information of the interference signal, and desired transmission data. The cable I/F 206 (or radio I/F 206) is a functional unit for performing transmission and reception of information by a cable between the connecting base station 200 and another base station. The radio I/F 207 is a functional unit for performing transmission and reception of signals by radio between the connecting base station 200 and the user apparatus 100.

Next, the user apparatus 100 is described. As shown in FIG. 35, the user apparatus 100 includes a desired signal channel estimation unit 101, an interference signal channel estimation unit 102, an interference transmission control information estimation unit 103, an interference PDCCH estimation unit 104, an IRC reception process unit 105, a control signal demodulation unit (DCI) 106, an interference signal control information storage unit 107, and a radio I/F 108.

The desired signal channel estimation unit 101 estimates a channel for a desired signal from a received signal. The interference signal channel estimation unit 102 estimates a channel for an interference signal based on transmission control information of the interference signal obtained from the interference signal information storage unit 107. The interference transmission control information estimation unit 103 estimates lacking information (such as CFI) based on control information of the interference signal obtained from the interference signal control information storage unit 107. The interference transmission control information estimation unit 103 may not be provided when estimation of lacking information (such as CFI) is not performed.

The interference PDCCH estimation unit 104 blindly decodes assignment of interference PDCCH based on UE-ID and common/UE-specific search space information of the interference base station 300. The IRC reception process unit 105 specifies a control channel that causes interference based on control information of an interference signal received from the interference signal control information storage unit 107, the interference PDCCH estimation unit 104, and the interference transmission control information estimation unit 103, so as to generate an IRC reception weight. The control signal demodulation unit (DCI) 106 demodulates transmitted control information based on the generated IRC reception weight. The interference signal control information storage unit 107 is a memory for storing control information of the interference signal in the control information demodulated by the control signal demodulation unit (DCI) 106.

FIG. 35 mainly shows a configuration for suppressing a signal of a control channel that causes interference.

<Operation of the Apparatus>

Figure 36:
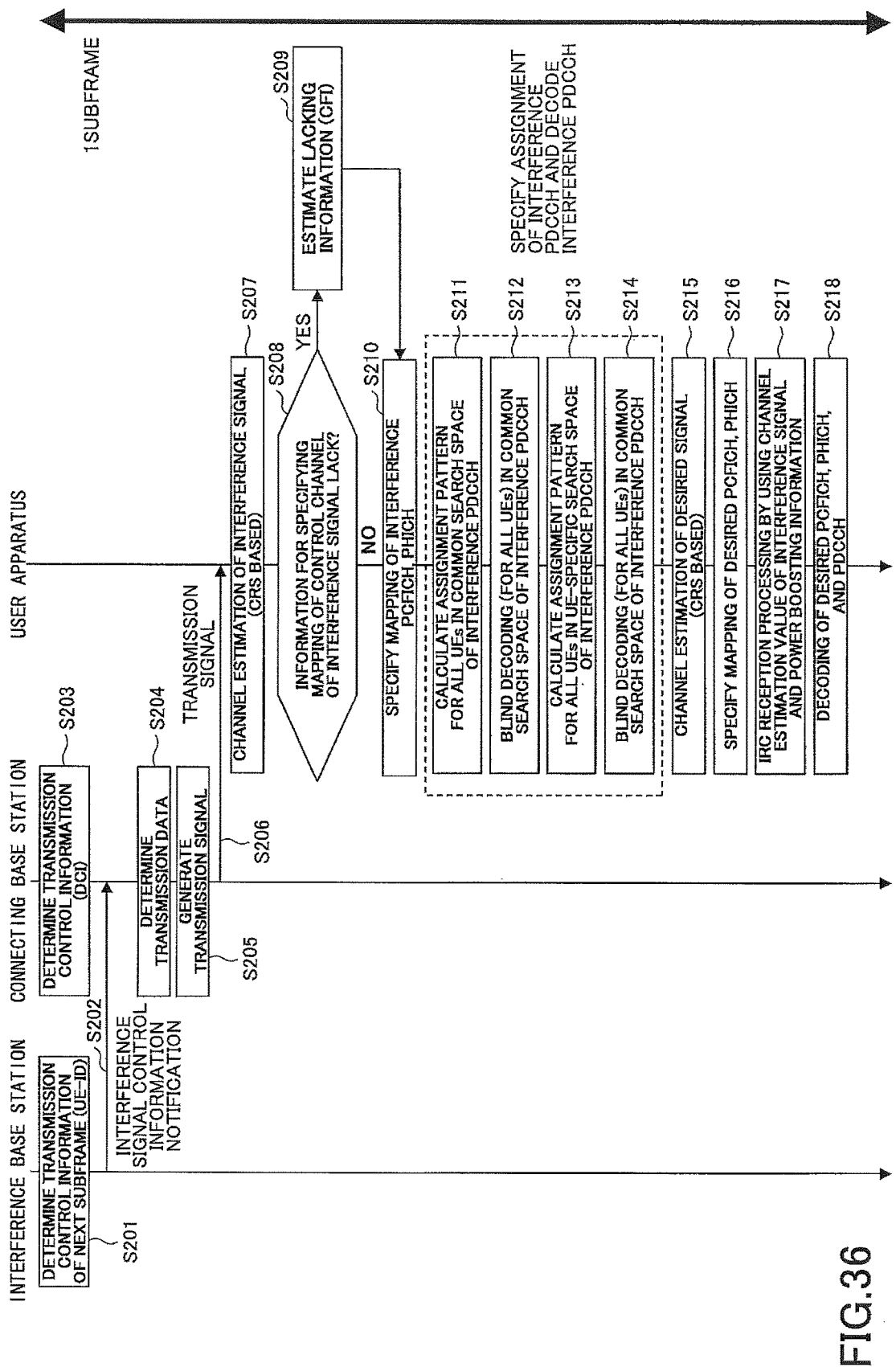
FIG. 36 is a diagram for explaining operation of the system in the first embodiment.

Next, operation of the communication system having the configuration shown in FIG. 35 is described with reference to the sequence diagram shown in FIG. 36.

The transmission control information determination unit of the interference base station 300 determines transmission control information of a desired signal at the interference base station (interference signal for the user apparatus 100) (step 201). The transmission control information determined here is transmission control information of a next subframe of a target subframe for which interference is suppressed in the user apparatus explained after step 207.

The transmission control information notification unit 302 of the interference base station 300 transmits the transmission control information to the connecting base station 200 (step 202).

On the other hand, in the connecting base station 200, the transmission control information determination unit 201 determines transmission control information of the desired signal at the connecting base station 200 (step 203). Also, the interference transmission control information reception unit 203 receives the transmission control information transmitted from the interference base station 300 in step 202 as transmission control information of an interference signal.

The transmission signal generation unit 205 of the connecting base station 200 determines transmission data and obtains it from the transmission data storage unit 204 (step 204) to generate a transmission signal with transmission control information (step 205) and transmit the transmission signal to the user apparatus 100 (step 206).

In the user apparatus 100 that receives the transmission signal, the interference signal channel estimation unit 102 performs channel estimation based on CRS for the interference signal. Then, if there is a shortage of information for specifying mapping of a control channel of an interference signal (Yes in step 208), the interference transmission control information estimation unit 103 estimates the lacking information (CFI in this example) (step 209). For an example in which lack of information for channel estimation of the interference signal is not assumed like the example 1-1, steps 208 and 209 are unnecessary.

The interference signal channel estimation unit 102 (it may be the interference PDCCH estimation unit 104) specifies mapping of interference PCFICH and PHICH (step 210). Then, the interference PDCCH estimation unit 104 calculates assignment patterns of all UEs within the common search space of the interference PDCCH (step 211), and performs blind decoding for all UEs within the common search space of the interference PDCCH (step 212). Further, the interference PDCCG estimation unit 104 calculates UE-specific search space of the interference PDCCH, and assignment patters of all UEs (step 213), and performs blind decoding for all UEs within the UE-specific search space of the interference PDCCH (step 214).

On the other hand, the desired signal channel estimation unit 101 performs channel estimation of the desired signal by CRS (step 215), and specifies mapping of desired PCFICH and PHICH (step 216). Then, the IRC reception processing unit 105 performs IRC reception processing using channel estimation value of the interference signal and power boosting information and the like (step 217). Then, the control signal demodulation unit 106 decodes desired PCFICH, PHICH, and PDCCH (step 218). By this decoding, control information of the interference signal of the next subframe can be obtained.

According to the technique of the first embodiment, it becomes possible that the user apparatus can perform IRC Type 1 that has high interference reduction ability, so that interference reduction ability improves in the user apparatus.

Second Embodiment

In the first embodiment, basically, IRC Type 1 necessary information is dynamically transmitted to the user apparatus 100 by a control channel or a data channel. But, the present invention is not limited to this, and the IRC Type1 necessary information may be semi-statically sent to the user apparatus 100. In the second embodiment, an embodiment is described in which the IRC Type1 necessary information is semi-statically sent to the user apparatus.

The configuration of the whole system in the second embodiment is the same as that in the first embodiment. That is, the system is configured to include the connecting base station 200, the user apparatus 100 and the interference base station 300.

Figure 37:
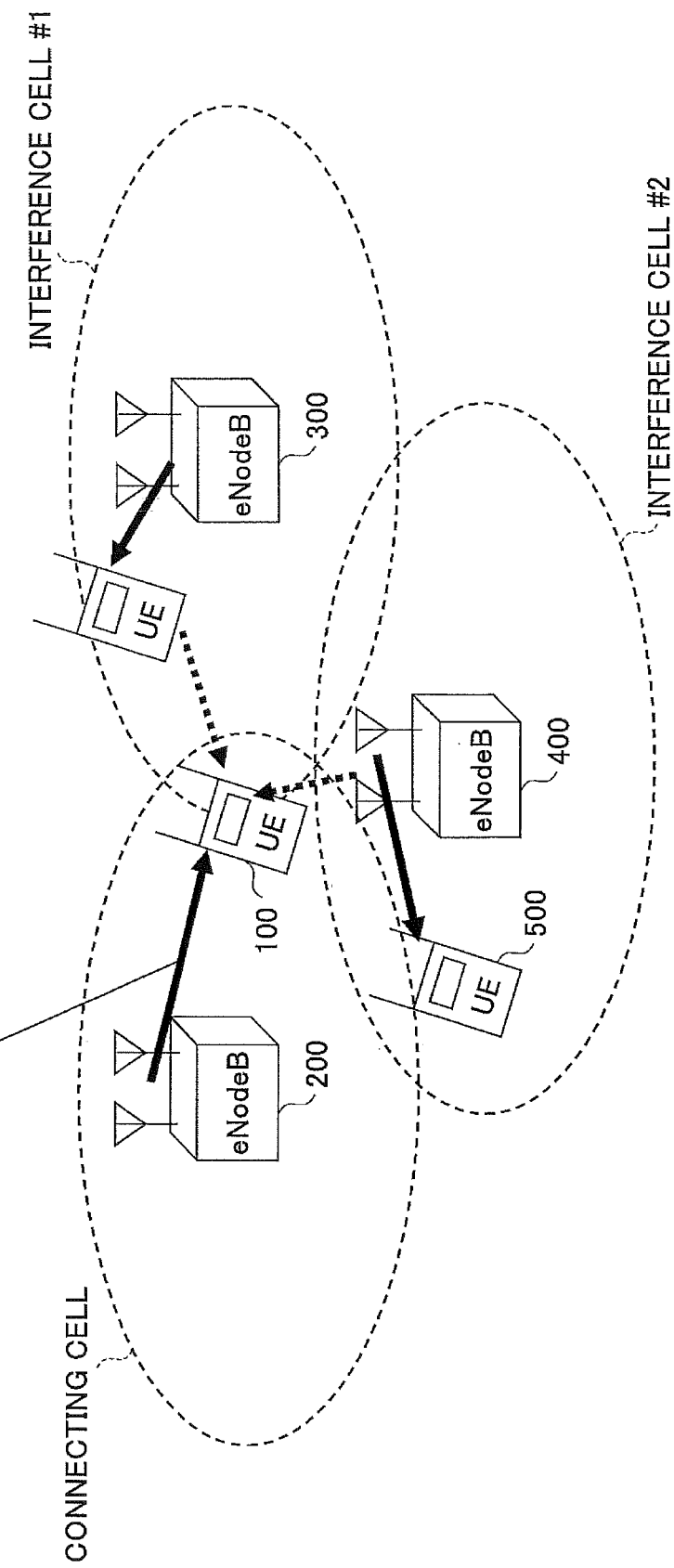
FIG. 37 is a diagram showing an outline of the second embodiment.

As shown in FIG. 37, in the second embodiment, basically, the IRC Type1 necessary information is sent from the connecting base station 200 to the user apparatus 100 using RRC signaling. Since the RRC signaling is performed semi-statically, the second embodiment in which IRC Type1 necessary information is sent using RRC signaling is an embodiment in which IRC Type1 necessary information is sent semi-statically.

Example 2-1

For suppressing PDCCH/ePDCCH, UE-IDs of all UEs connecting to the interference cell are necessary. However, since scheduling is performed dynamically for each subframe, there is a possibility that RRC signaling cannot follow change of UE-IDs that should be reported, so that the characteristics may be deteriorated. This is explained with reference to FIG. 38.

Figure 38:
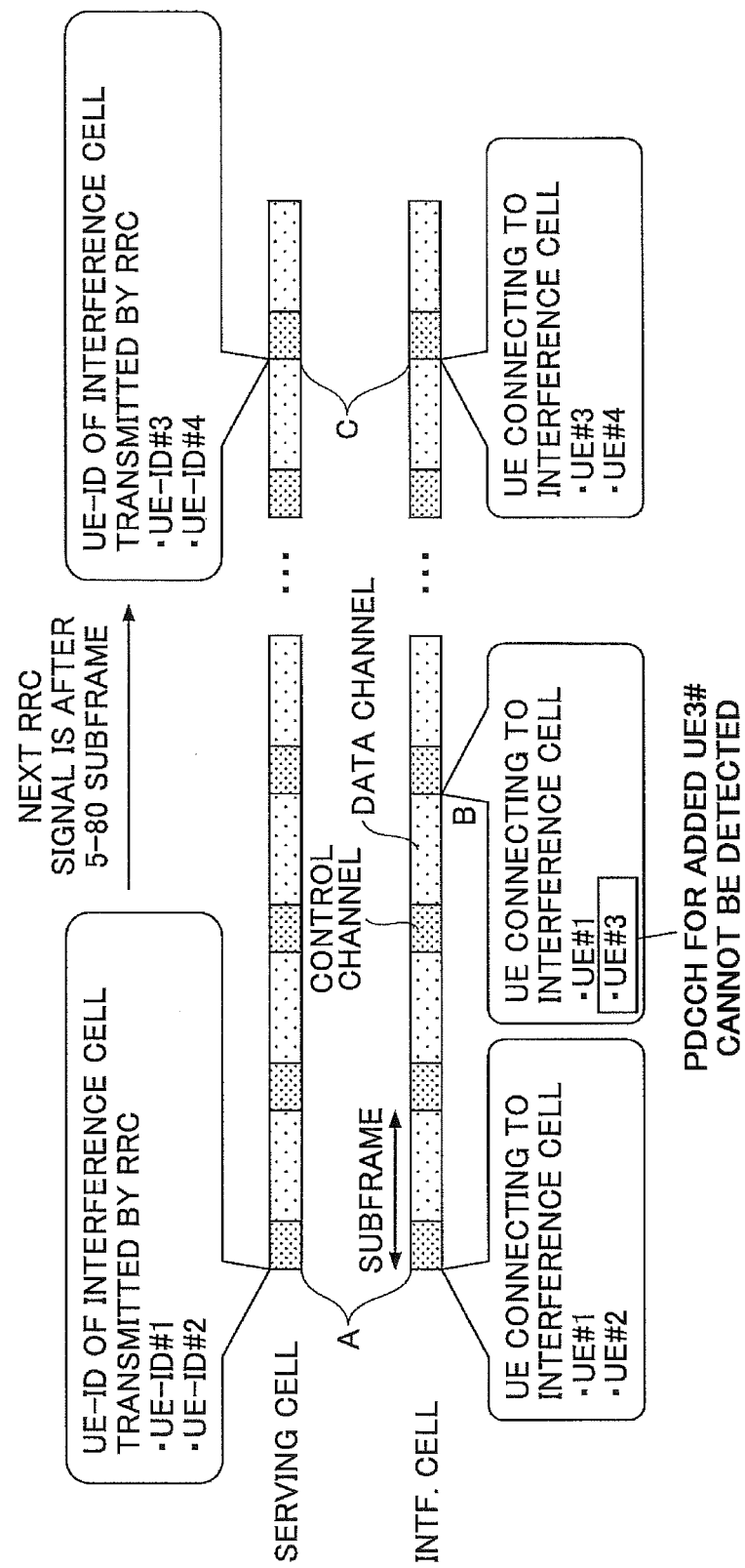
FIG. 38 is a diagram showing a problem in RRC signaling.

At the time point A shown in FIG. 38, UEs connecting to the interference cell are UE#1 and UE#2. At this time point, there is an RRC signaling, and the information is transmitted to the user apparatus in the connecting cell. At the time point of B, although UEs connecting to the interference cell become UE#1 and UE#3, the timing of RRC signaling has not yet come at this time point. Thus, this information is not transmitted to the connecting cell. After that, at the time point of C, UEs connecting to the interference cell become UE#3 and UE#4, and this information is transmitted to the connecting cell by RRC signaling. Accordingly, since information of UE#3 of the interference cell increased at the time point of B is not transmitted in the connecting cell, PDCCH for UE#3 becomes undetectable in the connecting cell.

In order to solve the above-mentioned problem, in the present embodiment, two methods of method 1 and method 2 can be adopted.

The method 1 is a method for dynamically transmitting all UE-IDs, which method corresponds to adopting the first embodiment only for UE-ID.

Figure 39:
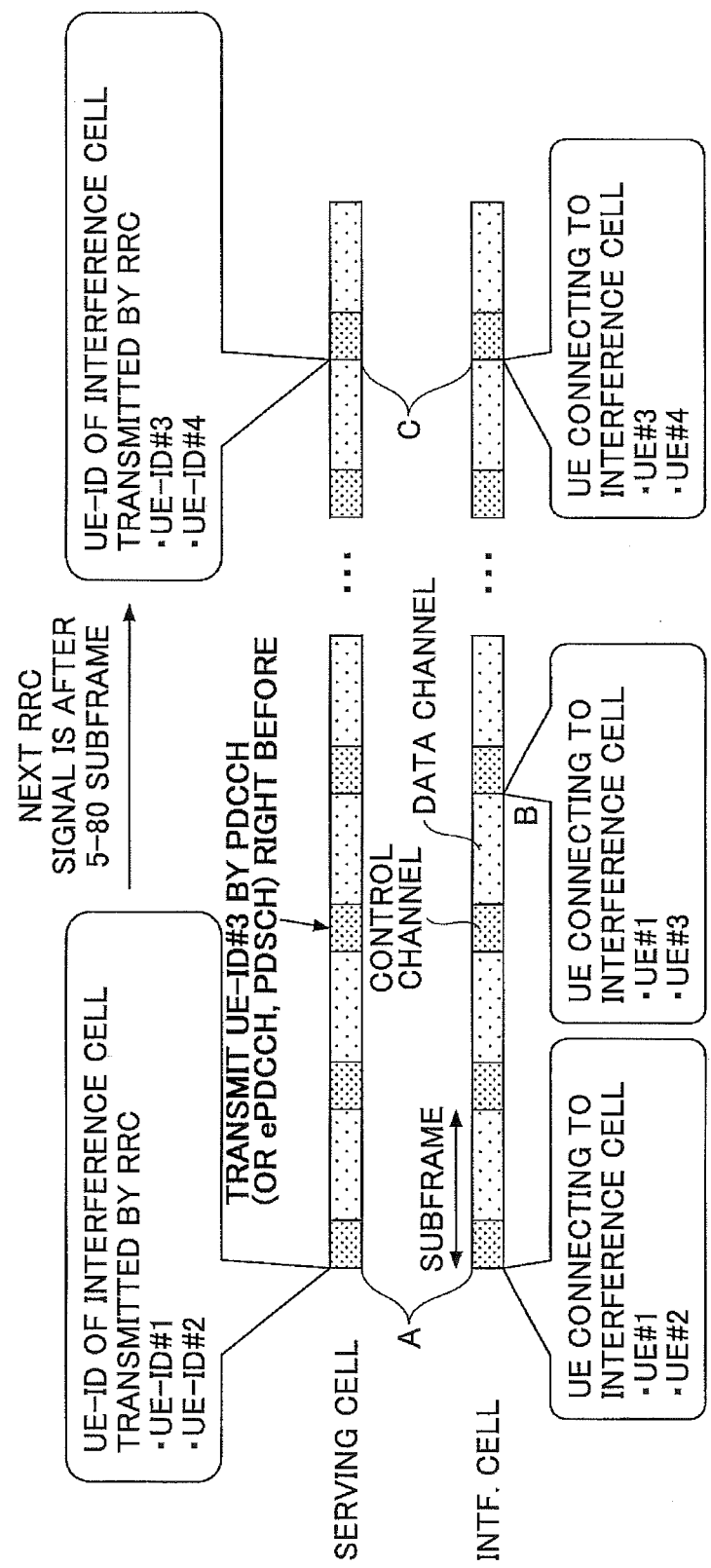
FIG. 39 is a diagram for explaining a method of dynamically transmitting only additional UE-ID.

The method 2 is a method for dynamically transmitting only the added UE-ID from the notification information of RRC. That is, as shown in FIG. 39 that shows a situation the same as that of FIG. 38, only UE#3 that is increased at the time point B is dynamically transmitted by the advance PDCCH (or ePDCCH, PDSCH). For decreased UEs, notification is not necessary because PDCCH cannot be merely detected. The method 2 is advantageous compared to the method 1 in that the overhead can be decreased.

Although UE-ID is dynamically transmitted by a downlink physical channel in the example 2-1, other information in control information necessary for IRC may be dynamically transmitted by the downlink physical channel.

Example 2-2

Figure 40:
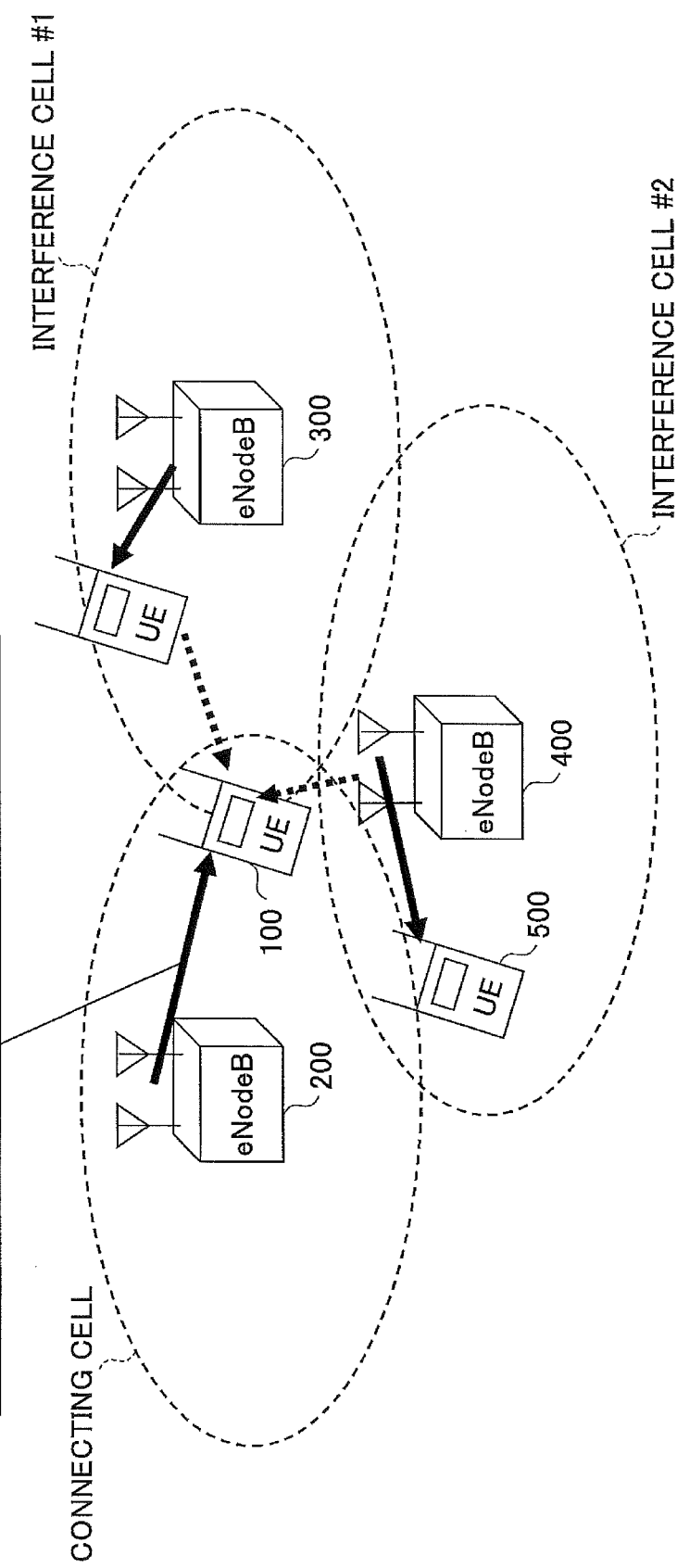
FIG. 40 is a diagram for explaining processing in the example 2-2.

In the example 2-2, a part of all pieces of IRC Type1 necessary information is transmitted by the method explained in the example 2-1 (or, by the basic form of the present embodiment using only RRC), and other pieces of information (lacking information) are estimated by the user apparatus 100. As shown in FIG. 40, in this example, since mapping of PCFICH of the interference cell can be calculated, CFI is estimated from the signal of PCFICH of the interference cell in the user apparatus 100 in the same way as the example 1-2. Therefore, in this example, it is not necessary to transmit CFI in the IRC Type 1 necessary information by the method explained in then example 2-1 and the like. Information to be estimated by the user apparatus 100 is not limited to CFI. Any information may be estimated as long as it can be estimated.

<Configuration of Apparatus>

Figure 41:
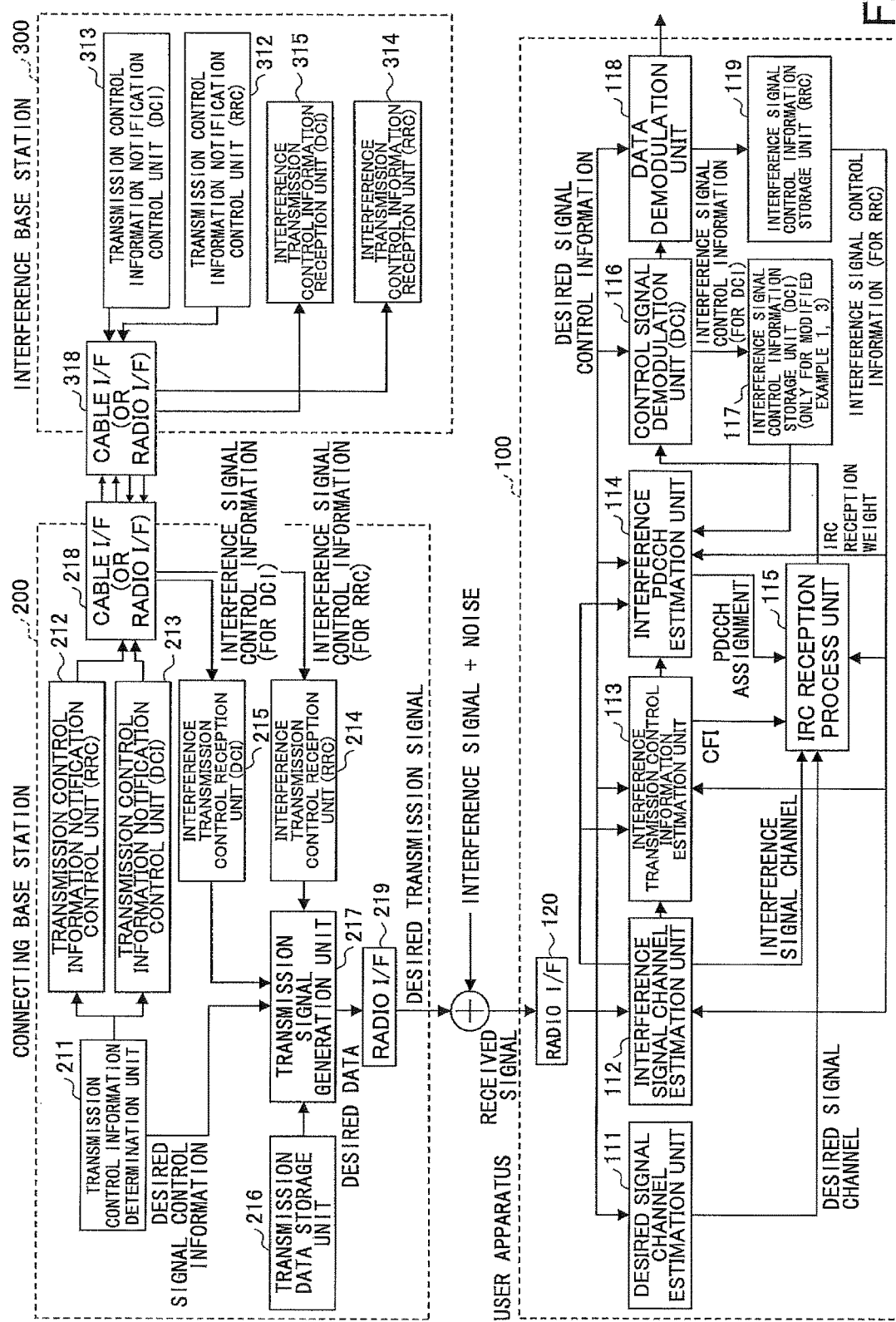
FIG. 41 is a system block diagram in a second embodiment.

FIG. 41 shows a functional block diagram showing a functional configuration of a communication system of the present embodiment. FIG. 41 shows, as components of the communication system, a connecting base station, an interference base station, and a user apparatus.

As shown in FIG. 41, the connecting base station 200 includes a transmission control information determination unit 211, a transmission control information notification control unit (RRC) 212, a transmission control information notification control unit (DCI) 213, an interference transmission control information reception unit (RRC) 214, an interference transmission control information reception unit (DCI) 215, a transmission data storage unit 216, a transmission signal generation unit 217, a cable I/F 218 (or radio I/F 218), and a radio I/F 219. Each base station has the same configuration, thus, the interference base station 300 has the same configuration as that of the connecting base station 200. However, for convenience sake, only a transmission control information notification control unit (DCI) 312, a transmission control information notification control unit (RRC) 313, an interference transmission control information reception unit (DCI) 315, an interference transmission control information reception unit (RRC) 314, and a cable I/F 318 (or radio I/F 318) are shown for the interference base station 300.

The transmission control information determination unit 211 determines transmission control information of a desired signal. The transmission control information notification control unit (RRC) 212 sends, to another base station, information to be sent by RRC in transmission control information of a desired signal necessary for IRC Type1 reception processing. The transmission control information of a desired signal necessary for IRC Type1 reception processing is IRC Type 1 necessary information described with reference to FIGS. 10, 23, 24 and the like.

The transmission control information notification control unit (DCI) 213 sends, to another base station, information to be sent by DCI in transmission control information of a desired signal necessary for IRC Type1 reception processing. When notification by DCI is not performed, the transmission control information notification unit (DCI) 213 is unnecessary.

The interference transmission control information reception unit (RRC) 214 receives transmission control information to be sent by RRC from the interference base station 300. The interference transmission control information reception unit (DCI) 215 receives transmission control information to be sent by DCI from the interference base station 300. When notification by DCI is not performed, the interference transmission control information reception unit (DCI) 215 is unnecessary.

The transmission data storage unit 216 is a memory for storing transmission data. The transmission signal generation unit 217 generates, based on the desired transmission control, a desired transmission signal including the transmission control information of the desired signal, the transmission control information of the interference signal, and desired transmission data. The cable I/F 218 (or radio I/F 218) is a functional unit for performing transmission and reception of information by a cable (or by radio) between the connecting base station 200 and another base station. The radio I/F 219 is a functional unit for performing transmission and reception of signals by radio between the connecting base station 200 and the user apparatus 100.

Next, the user apparatus 100 is described. As shown in FIG. 41, the user apparatus 100 includes a desired signal channel estimation unit 111, an interference signal channel estimation unit 112, an interference transmission control information estimation unit 113, an interference PDCCH estimation unit 114, an IRC reception process unit 115, a control signal demodulation unit (DCI) 116, an interference control information storage unit (DCI) 117, a data demodulation unit 118, an interference control information storage unit (RRC) 119, and a radio I/F 120.

The desired signal channel estimation unit 111 estimates a channel for the desired signal from the received signal. The interference signal channel estimation unit 112 estimates a channel for an interference signal based on control information of the interference signal obtained from the interference control information storage unit (RRC) 119. The interference transmission control information estimation unit 113 estimates lacking information (such as CFI) based on control information of the interference signal obtained from the interference control information storage unit (RRC) 119. It is not necessary to provide the interference transmission control information estimation unit 113 when estimation of lacking information (such as CFI) is not performed.

The interference PDCCH estimation unit 114 blindly decodes assignment of interference PDCCH based on UE-ID and common/UE-specific search space information of the interference base station 300. The IRC reception process unit 115 specifies a control channel that causes interference based on control information of an interference signal received from the interference control information storage units (RRC/DCI) 117, 119, the interference PDCCH estimation unit 114, and the interference transmission control information estimation unit 113, so as to generate an IRC reception weight.

The control signal demodulation unit (DCI) 116 demodulates transmitted control information based on the generated IRC reception weight. The interference control information storage unit (DCI) 117 is a memory for storing control information of the interference signal in the control information demodulated by the control signal demodulation unit (DCI) 116. In a case where notification of information of the interference signal by DCI is not performed, the interference control information storage unit (DCI) 117 may not be provided.

The data demodulation unit 118 demodulates a data signal based on control information demodulated by the control signal demodulation unit (DCI). The interference control information storage unit (RRC) 119 is a memory for storing control information of the interference signal transmitted by RRC.

FIG. 41 mainly shows a configuration for suppressing a signal of a control channel that causes interference.

<Operation of the Apparatus>

Figure 42:
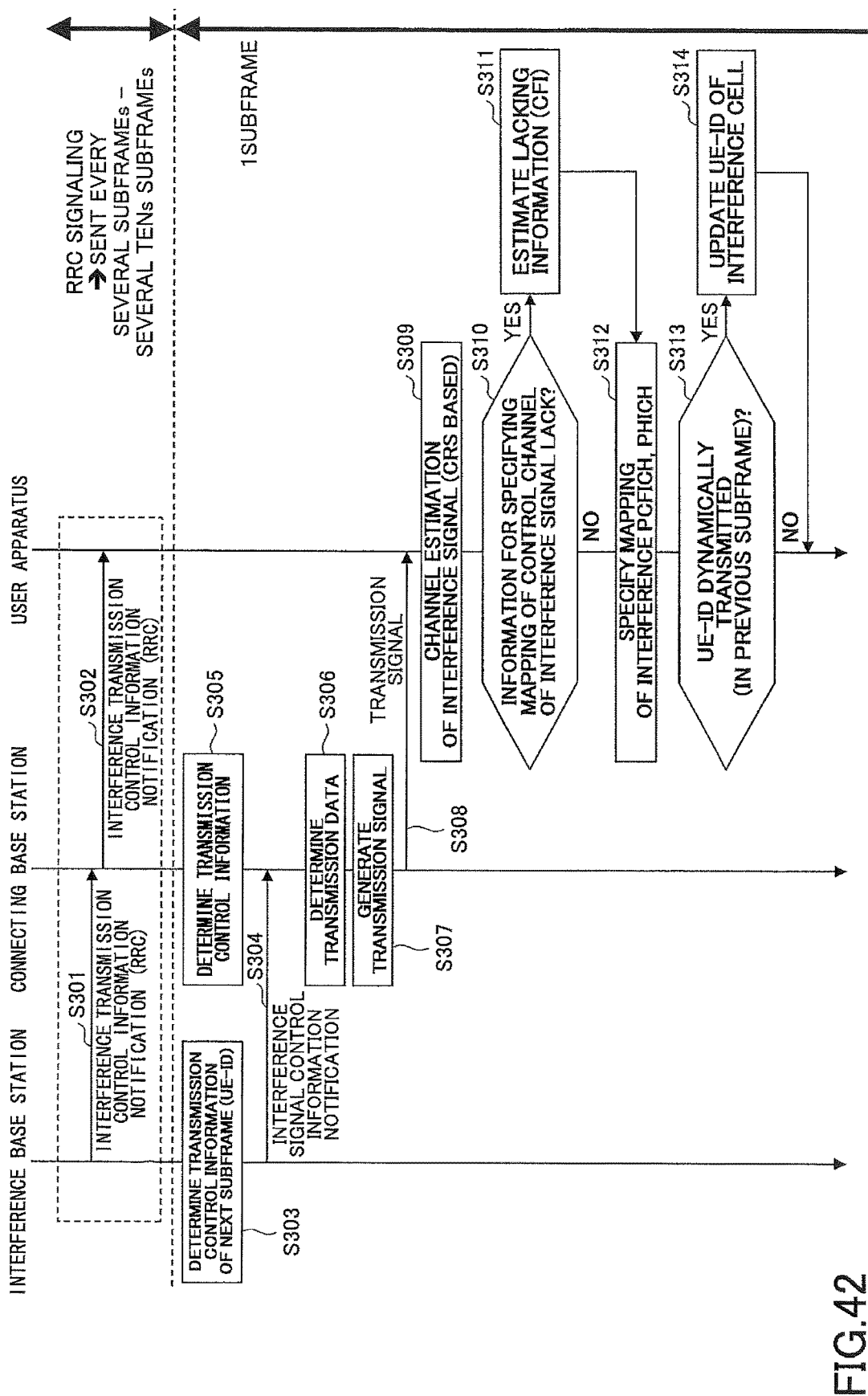
FIG. 42 is a sequence diagram for explaining operation of the system in the second embodiment.

Next, operation of the communication system having the configuration shown in FIG. 41 is described with reference to the sequence diagrams shown in FIGS. 42 and 43.

In an RRC signaling phase, the transmission control information notification control unit (RRC) 312 of the interference base station 300 sends transmission control information of a desired signal (interference signal for the user apparatus 100) to be sent by RRC to the connecting base station 200, and the interference transmission control information reception unit (RRC) 214 of the connecting base station 200 receives the transmission control information (step 301). The connecting base station 200 sends the received transmission control information of the interference signal to the user apparatus 100 by RRC signaling (step 302). Following processes are performed for each subframe.

The transmission control information determination unit of the interference base station 300 determines transmission control information (UE-ID in this example) of a desired signal (interference signal for the user apparatus 100) of a next subframe (step 303). The transmission control information notification control unit (DCI) 313 of the interference base station 300 transmits the transmission control information to the connecting base station 200 (step 304). In a case where transmission control information of the interference signal is not transmitted to the user apparatus 100 by DCI, step 304 is unnecessary.

On the other hand, in the connecting base station 200, the transmission control information determination unit 211 determines transmission control information of the desired signal at the connecting base station 200 (step 305). Also, when step 304 is performed, the interference transmission control information reception unit (DCI) 215 receives the transmission control information transmitted from the interference base station 300 as transmission control information of an interference signal to be transmitted by DCI.

The transmission signal generation unit 217 of the connecting base station 200 determines transmission data and obtains it from the transmission data storage unit 216 (step 306) to generate a transmission signal with transmission control information (step 307) and to transmit the transmission signal to the user apparatus 100 (step 308).

In the user apparatus 100 that receives the transmission signal, the interference signal channel estimation unit 112 performs channel estimation (CRS based) of the interference signal (step 309). If there is a shortage of information for specifying mapping of the control channel of the interference signal (Yes in step 310), the interference transmission control information estimation unit 113 estimates the lacking information (CFI in this example) (step 311). In step 312, the interference PDCCH estimation unit 114 and the like specifies mapping of interference PCFICH and PHICH.

Here, in a case where UE-ID has been dynamically transmitted in the previous subframe (Yes in step 313), the interference PDCCH estimation unit 114 updates UE-ID of the interference cell (step 314).

Figure 43:
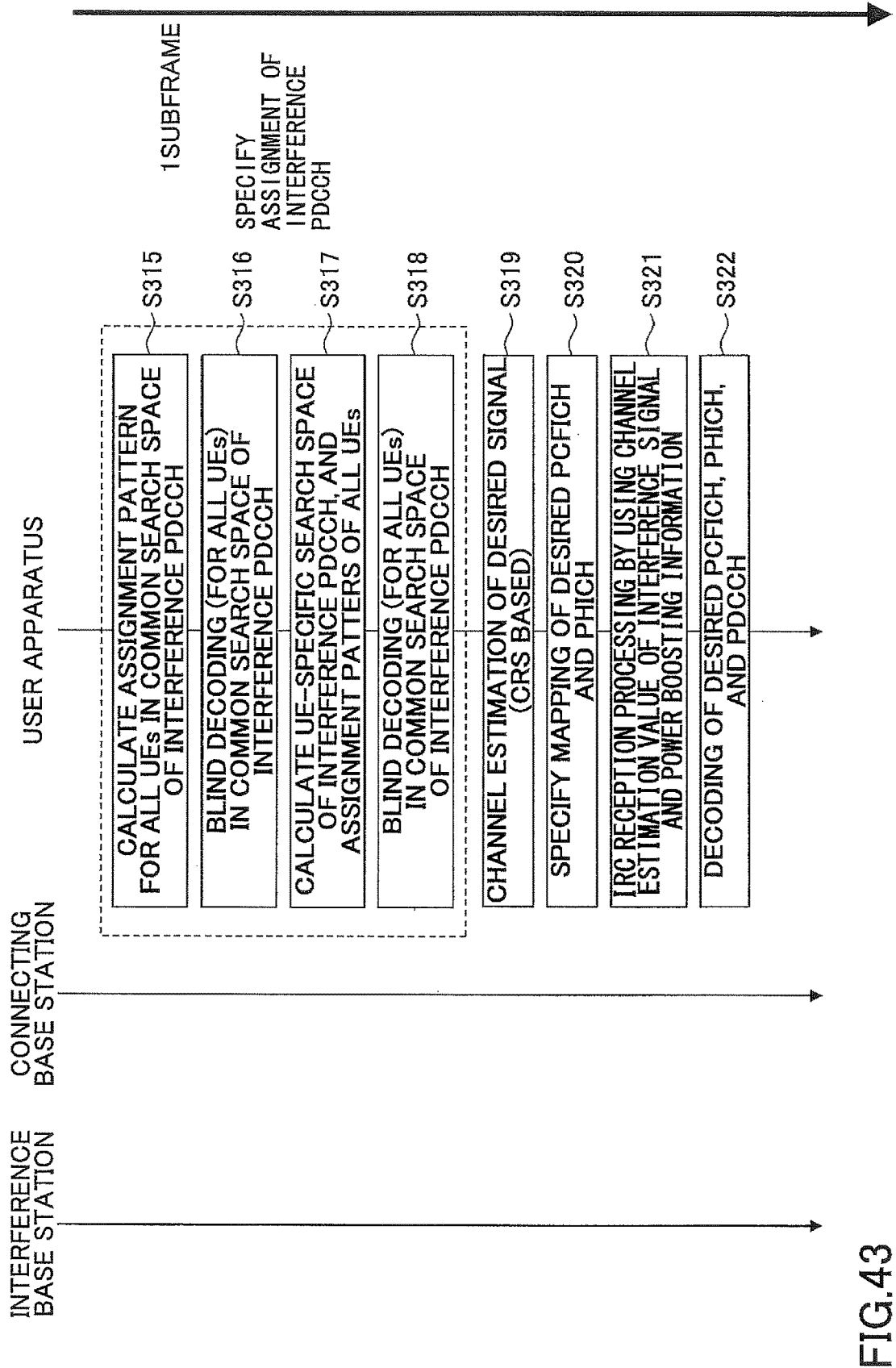
FIG. 43 is a sequence diagram for explaining operation of the system in the second embodiment.

Proceeding to FIG. 43, the interference PDCCH estimation unit 114 calculates assignment patterns of all UEs within the common search space of the interference PDCCH (step 315), and performs blind decoding (for all UEs) within the common search space of the interference PDCCH (step 316). Further, the interference PDCCH estimation unit 114 calculates UE-specific search space of the interference PDCCH, and assignment patters of all UEs (step 317), and performs blind decoding (for all UEs) within the UE-specific search space of the interference PDCCH (step 318).

On the other hand, the desired signal channel estimation unit 111 performs channel estimation (CRS based) of the desired signal (step 319), and, the control signal demodulation unit 116 and the like specifies mapping of desired PCFICH and PHICH (step 320).

Then, the IRC reception processing unit 115 performs IRC reception processing using the channel estimation value of the interference signal and power boosting information and the like (step 321). Then, the control signal demodulation unit 116 decodes desired PCFICH, PHICH, and PDCCH (step 322).

According to the technique of the second embodiment, by using RRC signaling and the like, it becomes possible that the user apparatus can perform IRC Type 1 that has high interference reduction ability, so that interference reduction ability improves in the user apparatus.

Third Embodiment

A case where the user apparatus 100 performs SIC (successive interference cancellation) is described as a third embodiment. As described before, in SIC, it is necessary to generate replica signals for all interference signals. For this purpose, first, information for channel estimation for each interference signal is necessary. This information is the same as the before-mentioned information necessary for IRC Type 1. In addition to that, as shown in FIG. 44 (similar to FIG. 24), PHICH sequence is additionally required.

In the present embodiment, the information for performing channel estimation for each interference signal is the same as the information that is sent to the user apparatus in the first embodiment and the second embodiment, so that the information is sent by a method the same as the method of the first embodiment or the second embodiment. Then, additionally, PHICH sequence is sent.

For additional notification, for example, similarly to the first embodiment, a method may be used in which additional information is dynamically transmitted by a control channel or a data channel. Also, like the second embodiment, the information may be semi-statically transmitted by using RRC signaling.

In the following, examples of apparatus configurations and operation flows for an example 3-1 and an example 3-2 are described, in which the example 3-1 corresponds to a case where necessary information for SIC is dynamically transmitted like the first embodiment, and the example 3-2 corresponds to a case where necessary information for SIC is transmitted by using RRC signaling like the second embodiment.

Example 3-1: A Case of Dynamic Notification Like First Embodiment

<Apparatus Configuration>

Figure 45:
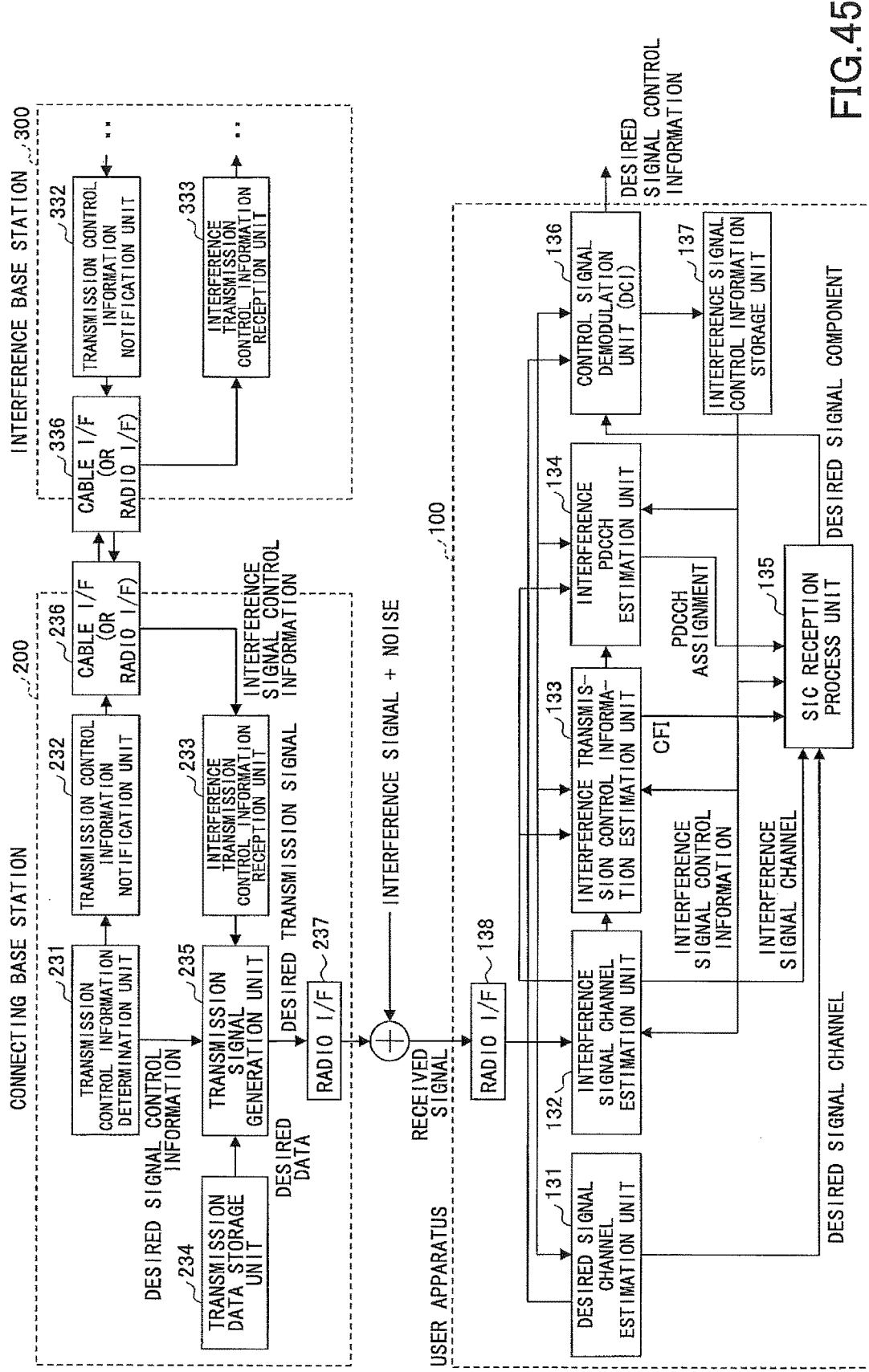
FIG. 45 is a system block diagram when Dynamic notification is performed in the third embodiment.

FIG. 45 shows a functional block diagram showing a functional configuration of a communication system of the present embodiment. FIG. 45 shows, as components of the communication system, a connecting base station 200, an interference base station 300, and a user apparatus 100. FIG. 45 is an example for cancelling PFICH, PHICH and PDCCH that cause interference.

As shown in FIG. 45, the connecting base station 200 includes a transmission control information determination unit 231, a transmission control information notification unit 232, an interference transmission control information reception unit 233, a transmission data storage unit 234, a transmission signal generation unit 235, a cable I/F 236 (or radio I/F 236), and a radio I/F 237. Each base station has the same configuration, thus, the interference base station 300 has the same configuration as that of the connecting base station 200. However, for convenience sake, only a transmission control information notification unit 332, an interference transmission control information reception unit 333 and a cable I/F 336 (or radio I/F 336) are shown for the interference base station 300.

The transmission control information determination unit 231 determines transmission control information of a desired signal. The transmission control information notification unit 232 sends, to another base station, transmission control information of a desired signal necessary for SIC reception processing. The transmission control information of a desired signal necessary for SIC reception processing is necessary information for SIC described with reference to FIGS. 10, 23 and 24 and the like.

The interference transmission control information reception unit 233 receives transmission control information of another base station necessary for SIC reception processing. The transmission control information received here becomes transmission control information of an interference signal that the connecting base station 200 sends to the user apparatus 100.

The transmission data storage unit 234 is a memory for storing transmission data. The transmission signal generation unit 235 generates, based on the transmission control information of the desired signal, a desired transmission signal including the transmission control information of the desired signal, the transmission control information of the interference signal, and desired transmission data. The cable I/F 236 (or radio I/F 236) is a functional unit for performing transmission and reception of information by a cable (or by radio) between the connecting base station 200 and another base station. The radio I/F 237 is a functional unit for performing transmission and reception of signals by radio between the connecting base station 200 and the user apparatus 100.

Next, the user apparatus 100 is described. As shown in FIG. 45, the user apparatus 100 includes a desired signal channel estimation unit 131, an interference signal channel estimation unit 132, an interference transmission control information estimation unit 133, an interference PDCCH estimation unit 134, a SIC reception process unit 135, a control signal demodulation unit (DCI) 136, an interference signal control information storage unit 137, and a radio I/F 138.

The desired signal channel estimation unit 131 estimates a channel for the desired signal from the received signal. The interference signal channel estimation unit 132 estimates a channel for an interference signal based on transmission control information of the interference signal obtained from the interference signal control information storage unit 137. The interference transmission control information estimation unit 133 estimates lacking information (such as CFI) based on control information of the interference signal received from the interference signal control information storage unit 137. The interference transmission control information estimation unit 133 may not be provided when estimation of lacking information (such as CFI) is not performed.

The interference PDCCH estimation unit 134 blindly decodes assignment of interference PDCCH based on UE-ID and common/UE-specific search space information of the interference base station 300. The SIC reception process unit 135 specifies and demodulates a control channel that causes interference based on control information of the interference signal received from the interference signal control information storage unit 137, the interference PDCCH estimation unit 134, and the interference transmission control information estimation unit 133, so as to perform SIC reception process. The control signal demodulation unit (DCI) 136 demodulates control information for the desired signal component received from the SIC reception process unit 135. The interference signal control information storage unit 137 is a memory for storing control information of the interference signal in the control information demodulated by the control signal demodulation unit (DCI) 136.

FIG. 45 mainly shows a configuration for canceling a signal of a control channel that causes interference.

<Operation of the Apparatus>

Figure 46:
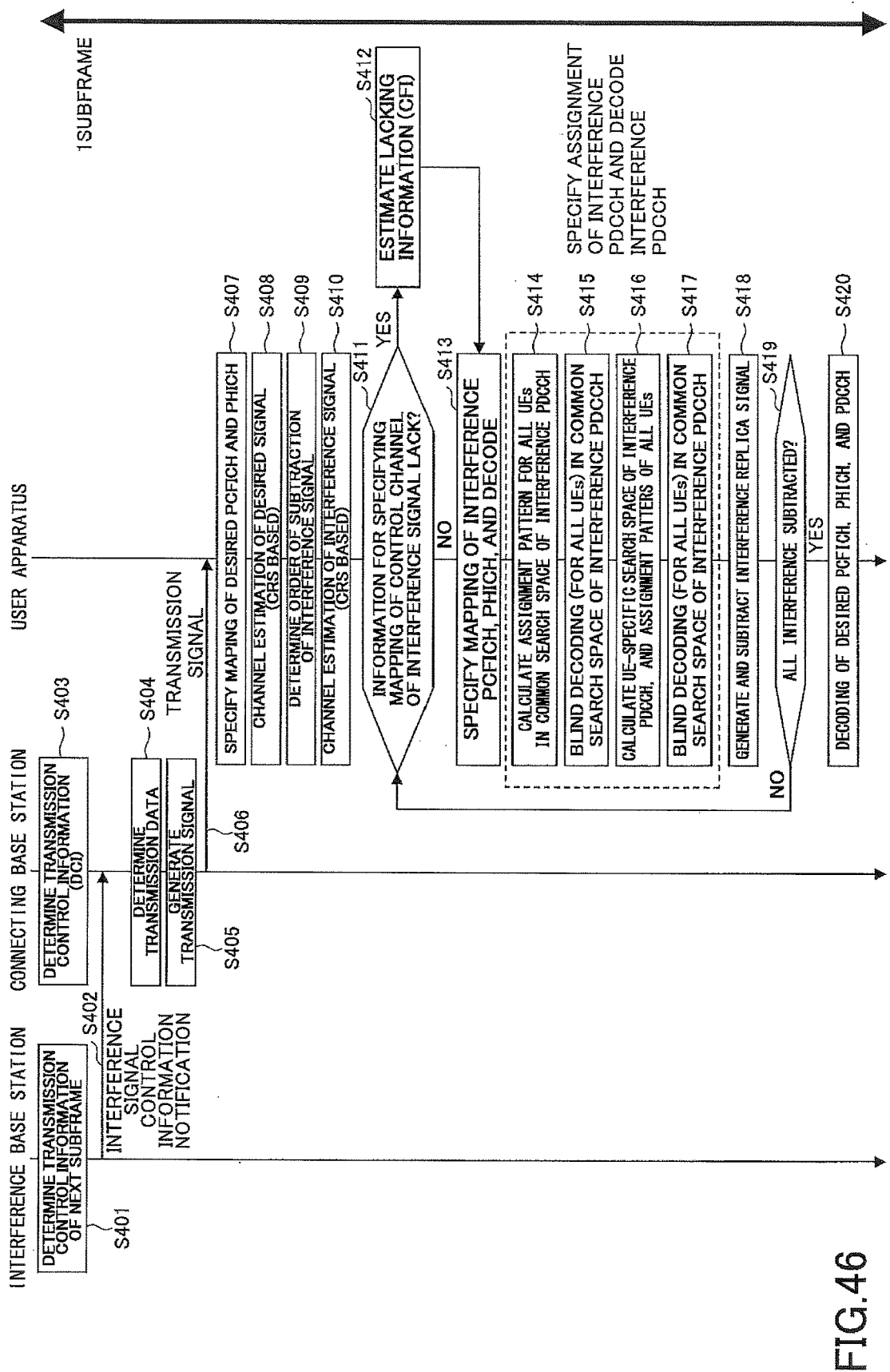
FIG. 46 is a sequence diagram when Dynamic notification is performed in the third embodiment.

Next, operation of the communication system having the configuration shown in FIG. 45 is described with reference to the sequence diagram shown in FIG. 46.

The transmission control information determination unit of the interference base station 300 determines transmission control information of a desired signal (interference signal for the user apparatus 100) in the interference base station 300 (step 401). The transmission control information determined here is transmission control information of a next subframe of a target subframe for which interference is canceled in the user apparatus explained after step 407.

The transmission control information notification unit 332 of the interference base station 300 transmits the transmission control information to the connecting base station 200 (step 402).

On the other hand, in the connecting base station 200, the transmission control information determination unit 231 determines transmission control information of the desired signal at the connecting base station 200 (step 403). Also, the interference transmission control information reception unit 233 receives the transmission control information transmitted from the interference base station 300 in step 402 as transmission control information of an interference signal.

The transmission signal generation unit 235 of the connecting base station 200 determines transmission data and obtains it from the transmission data storage unit 234 (step 404) to generate a transmission signal with transmission control information (step 405) and transmits the transmission signal to the user apparatus 100 (step 406).

In the user apparatus 100, the desired signal channel estimation unit 131 and the like specifies mapping of the desired PCFICH and PHICH (step 407), and performs channel estimation (CRS based) of the desired signal (step 408). Then, the SIC reception process unit 135 determines the order of subtraction of interference signals (step 409).

Also, the interference signal channel estimation unit 132 performs channel estimation of the interference signal by CRS (step 410). If there is a shortage of information for specifying mapping of the control channel of the interference signal (Yes in step 411), the interference signal control information estimation unit 133 estimates the lacking information (CFI in this embodiment) (step 412). For an example in which lack of information for channel estimation of the interference signal is not assumed, steps 411 and 412 are unnecessary.

The interference signal channel estimation unit 132 (it may be the interference PDCCH estimation unit 134) specifies mapping of interference PCFICH and PHICH (step 413). Then, the interference PDCCH estimation unit 134 calculates assignment patterns of all UEs within the common search space of the interference PDCCH (step 414), and performs blind decoding for all UEs within the common search space of the interference PDCCH (step 415). Further, the interference PDCCH estimation unit 134 calculates UE-specific search space of the interference PDCCH, and assignment patters of all UEs (step 416), and performs blind decoding for all UEs within the UE-specific search space of the interference PDCCH (step 417).

The SIC reception process unit 135 generates and subtracts interference replica signals (step 418). Then, if all interferences have not been subtracted (No in step 419), the process returns to step 411. If all interferences have been subtracted (Yes in step 419), the process goes to step 420, so that the control signal demodulation unit 136 decodes desired PCFICH, PHICH, and PDCCH.

Example 3-2: A Case of Semi-Static Notification Like Second Embodiment

<Configuration of Apparatus>

Figure 47:
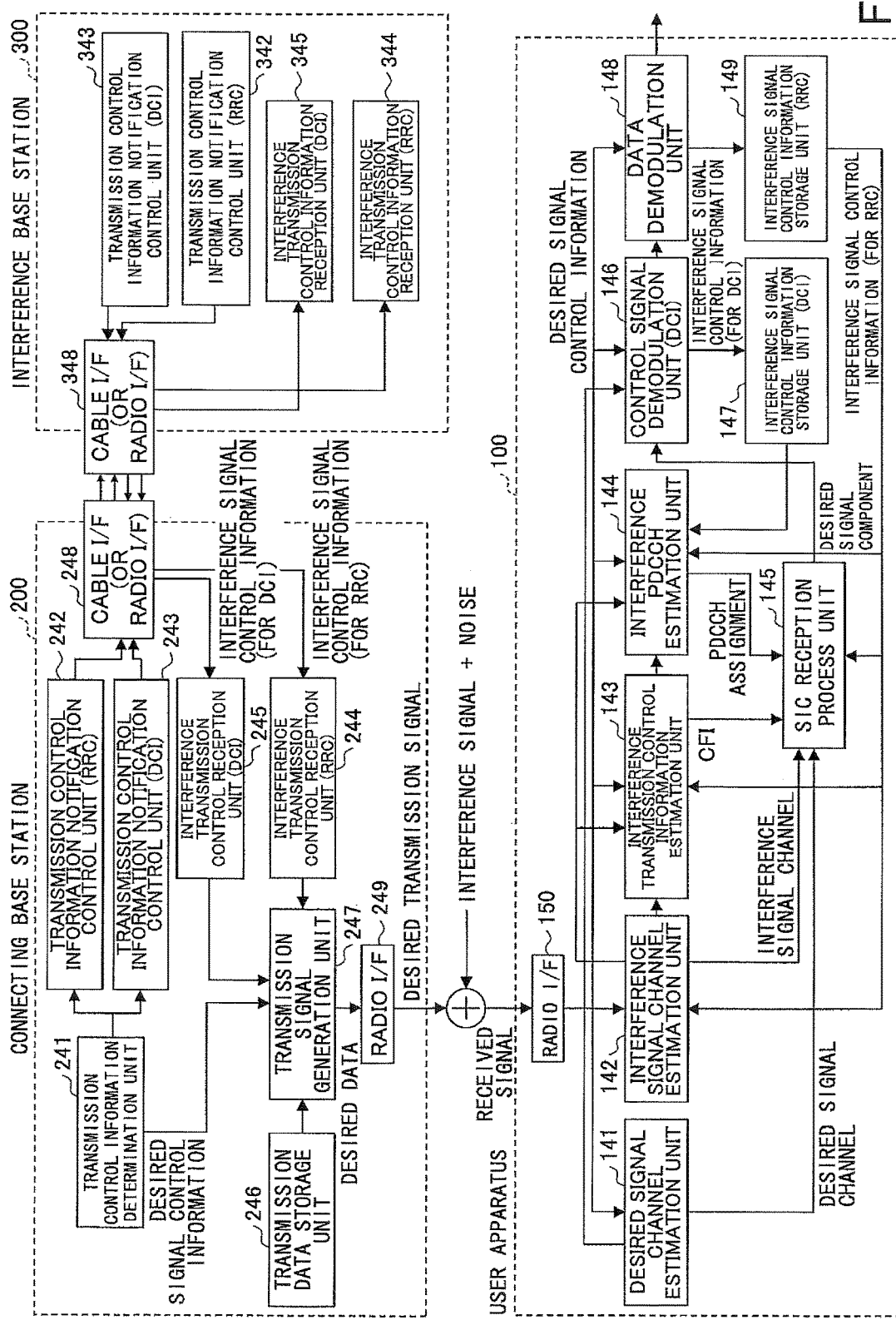
FIG. 47 is a system block diagram when semi-static notification is performed in the third embodiment.

FIG. 47 shows a functional block diagram showing a functional configuration of a communication system in the example 3-2. FIG. 47 shows, as components of the communication system, a connecting base station, an interference base station, and a user apparatus.

As shown in FIG. 47, the connecting base station 200 includes a transmission control information determination unit 241, a transmission control information notification control unit (RRC) 242, a transmission control information notification control unit (DCI) 243, an interference transmission control information reception unit (RRC) 244, an interference transmission control information reception unit (DCI) 245, a transmission data storage unit 246, a transmission signal generation unit 247, a cable I/F 248 (or radio I/F 248), and a radio I/F 249. Each base station has the same configuration, thus, the interference base station 300 has the same configuration as that of the connecting base station 200. However, for convenience sake, only a transmission control information notification control unit (DCI) 342, a transmission control information notification control unit (RRC) 343, an interference transmission control information reception unit (DCI) 345, an interference transmission control information reception unit (RRC) 344, and a cable I/F 348 (or radio I/F 348) are shown for the interference base station 300.

The transmission control information determination unit 241 determines transmission control information of a desired signal. The transmission control information notification control unit (RRC) 242 sends, to another base station, information to be sent by RRC in transmission control information of a desired signal necessary for SIC reception processing. The transmission control information of a desired signal necessary for SIC reception processing is necessary information for SIC described with reference to FIGS. 10, 23, 24 and the like.

The transmission control information notification control unit (DCI) 243 sends, to another base station, information to be sent by DCI in transmission control information of a desired signal necessary for SIC reception processing. When notification by DCI is not performed, the transmission control information notification unit (DCI) 243 is unnecessary.

The interference transmission control information reception unit (RRC) 244 receives transmission control information to be sent by RRC from the interference base station 300. The interference transmission control information reception unit (DCI) 245 receives transmission control information to be sent by DCI from the interference base station 300. When notification by DCI is not performed, the interference transmission control information reception unit (DCI) 245 is unnecessary.

The transmission data storage unit 246 is a memory for storing transmission data. The transmission signal generation unit 247 generates, based on the desired transmission control, a desired transmission signal including the transmission control information of the desired signal, the transmission control information of the interference signal, and desired transmission data. The cable I/F 248 (or radio I/F 248) is a functional unit for performing transmission and reception of information by a cable (or by radio) between the connecting base station 200 and another base station. The radio I/F 249 is a functional unit for performing transmission and reception of signals by radio between the connecting base station 200 and the user apparatus 100.

Next, the user apparatus 100 is described. As shown in FIG. 47, the user apparatus 100 includes a desired signal channel estimation unit 141, an interference signal channel estimation unit 142, an interference transmission control information estimation unit 143, an interference PDCCH estimation unit 144, an SIC reception process unit 145, a control signal demodulation unit (DCI) 146, an interference control information storage unit (DCI) 147, a data demodulation unit 148, an interference control information storage unit (RRC) 149, and a radio I/F 150.

The desired signal channel estimation unit 142 estimates a channel for the desired signal from the received signal. The interference signal channel estimation unit 142 estimates a channel for an interference signal based on control information of the interference signal obtained from the interference control information storage unit (RRC) 149. The interference transmission control information estimation unit 143 estimates lacking information (such as CFI) based on control information of the interference signal obtained from the interference control information storage unit (RRC) 149. It is not necessary to provide the interference transmission control information estimation unit 143 when estimation of lacking information (such as CFI) is not performed.

The interference PDCCH estimation unit 144 blindly decodes assignment of interference PDCCH based on UE-ID and common/UE-specific search space information of the interference base station 300. The SIC reception process unit 145 specifies and decodes a control channel that causes interference based on control information of an interference signal received from the interference control information storage units (RRC/DCI) 147, 149, the interference PDCCH estimation unit 144, and the interference transmission control information estimation unit 143, so as to perform SIC reception processing.

The control signal demodulation unit (DCI) 146 demodulates control information for the desired signal component received from the SIC reception process unit 145. The interference control information storage unit (DCI) 147 is a memory for storing information of the interference signal in the control information demodulated by the control signal demodulation unit (DCI) 146. In a case where notification of information of the interference signal by DCI is not performed, the interference control information storage unit (DCI) 147 may not be provided.

The data demodulation unit 148 demodulates a data signal based on control information demodulated by the control signal demodulation unit (DCI) 146. The interference control information storage unit (RRC) 149 is a memory for storing control information of the interference signal transmitted by RRC.

FIG. 47 mainly shows a configuration for cancelling a signal of a control channel that causes interference.

<Operation of the Apparatus>

Figure 48:
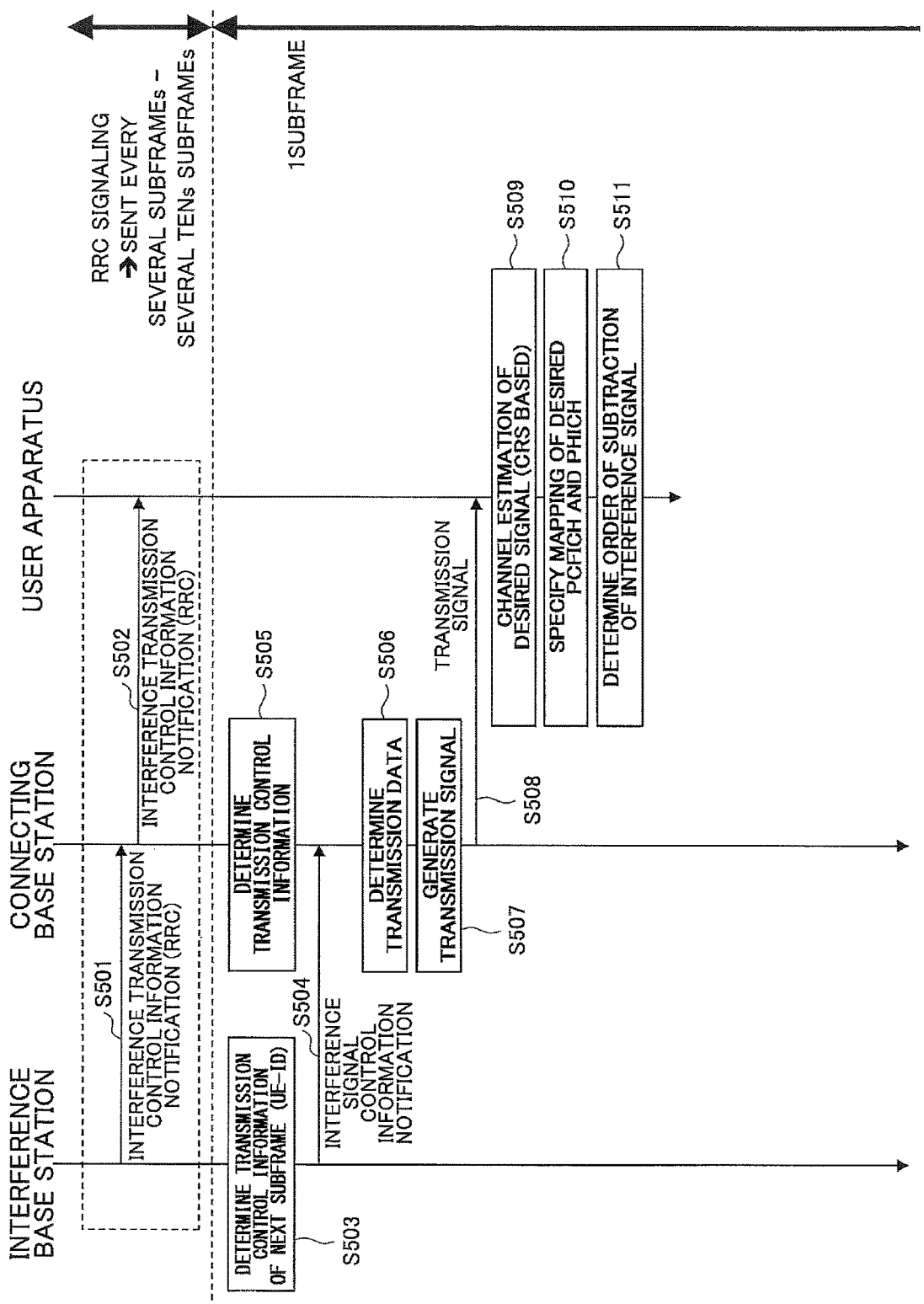
FIG. 48 is a sequence diagram when semi-static notification is performed in the third embodiment.

Next, operation of the communication system having the configuration shown in FIG. 47 is described with reference to the sequence diagrams shown in FIGS. 48 and 49.

In an RRC signaling phase, the transmission control information notification control unit (RRC) 342 of the interference base station 300 sends transmission control information of a desired signal (interference signal for the user apparatus 100) to be sent by RRC to the connecting base station 200, and the interference transmission control information reception unit (RRC) 244 of the connecting base station 200 receives the transmission control information (step 501). The connecting base station 200 sends the received transmission control information of the interference signal to the user apparatus 100 by RRC signaling (step 502). Following processes are performed for each subframe.

The transmission control information determination unit of the interference base station 300 determines transmission control information (UE-ID in this example) of a desired signal (interference signal for the user apparatus 100) of a next subframe (step 503). The transmission control information notification control unit (DCI) 343 of the interference base station 300 transmits the transmission control information to the connecting base station 200 (step 504). In a case where transmission control information of the interference signal is not transmitted to the user apparatus 100 by DCI, step 504 is unnecessary.

On the other hand, in the connecting base station 200, the transmission control information determination unit 241 determines transmission control information of the desired signal at the connecting base station 200 (step 505). Also, when step 504 is performed, the interference transmission control information reception unit (DCI) 245 receives the transmission control information transmitted from the interference base station 300 as transmission control information of an interference signal to be transmitted by DCI.

The transmission signal generation unit 247 of the connecting base station 200 determines transmission data and obtains it from the transmission data storage unit 246 (step 506) to generate a transmission signal with transmission control information (step 507) and to transmit the transmission signal to the user apparatus 100 (step 508).

In the user apparatus 100, the desired signal channel estimation unit 141 performs channel estimation (CRS based) of the desired signal (step 509), and determines mapping of the desired PCFICH and PHICH (step 510). Also, the SIC reception process unit 145 determines the order of subtraction of interference signals (step 511).

Figure 49:
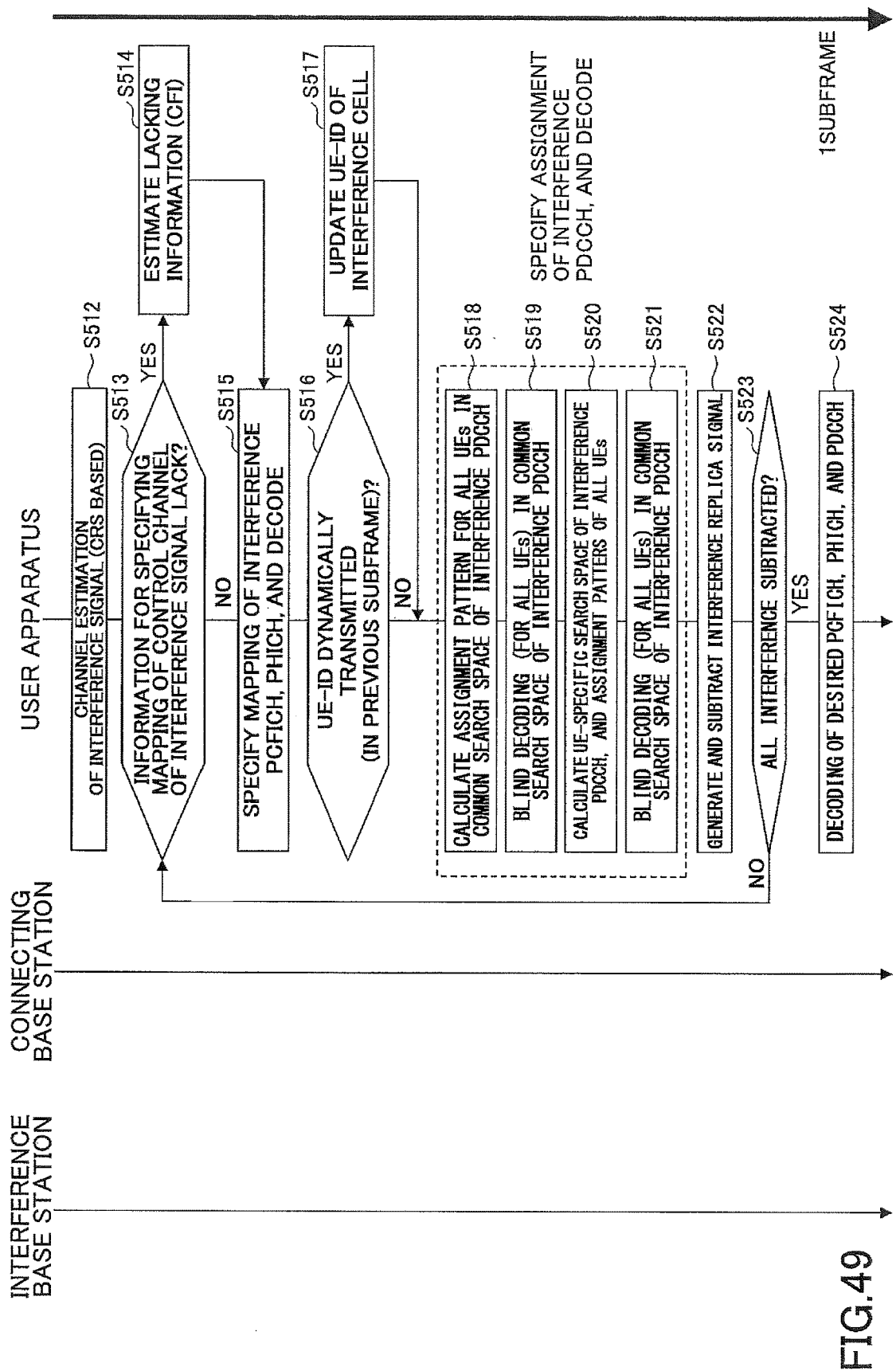
FIG. 49 is a sequence diagram when semi-static notification is performed in the third embodiment.

Proceeding to FIG. 49, the interference signal channel estimation unit 142 performs channel estimation (CRS based) of the interference signal (step 512). If there is a shortage of information for specifying mapping of the control channel of the interference signal (Yes in step 513), the interference transmission control information estimation unit 143 estimates the lacking information (CFI in this example) (step 514). In step 515, the interference PDCCH estimation unit 144 and the like specifies mapping of interference PCFICH and PHICH, and performs decoding (step 515).

Here, in a case where UE-ID has been dynamically transmitted in the previous subframe (Yes in step 516), the interference PDCCH estimation unit 144 updates UE-ID of the interference cell (step 517).

The interference PDCCH estimation unit 144 calculates assignment patterns of all UEs within the common search space of the interference PDCCH (step 518), and performs blind decoding (for all UEs) within the common search space of the interference PDCCH (step 519). Further, the interference PDCCH estimation unit 144 calculates UE-specific search space of the interference PDCCH, and assignment patters of all UEs (step 520), and performs blind decoding for all UEs within the UE-specific search space of the interference PDCCH (step 521).

The SIC reception process unit 145 generates and subtracts interference replica signals (step 522). Then, if all interferences have not been subtracted (No in step 523), the process returns to step 513. If all interferences have been subtracted (Yes in step 523), the process goes to step 524, so that the control signal demodulation unit 146 decodes desired PCFICH, PHICH, and PDCCH.

According to the technique of the third embodiment, it becomes possible that the user apparatus can perform SIC that has high interference reduction ability, so that interference reduction ability improves in the user apparatus.

(Other Apparatus Configuration Example)

Figure 50:
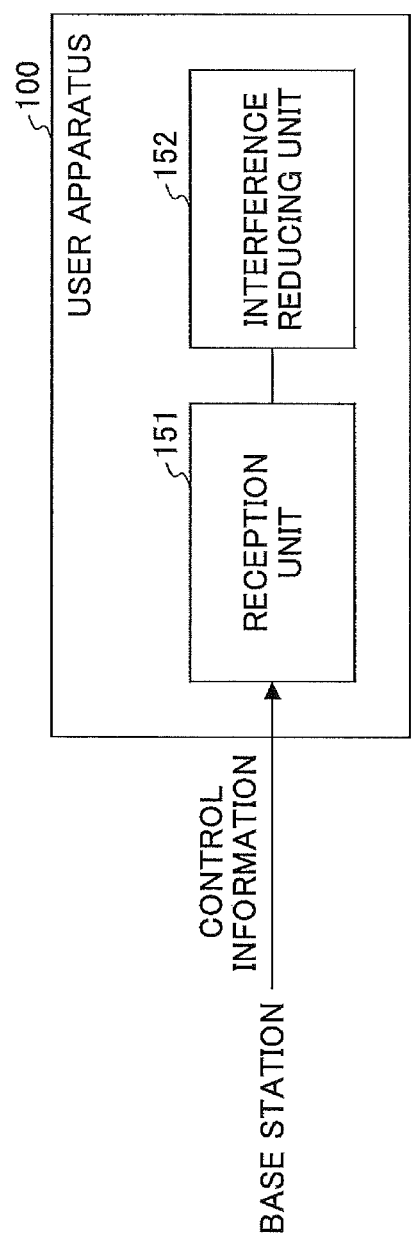
FIG. 50 is a diagram showing a configuration example of a user apparatus.

The apparatus configurations described so far are merely examples. For example, the user apparatus 100 may be configured as shown in FIG. 50. The user apparatus 100 shown in FIG. 50 is a user apparatus in a radio communication system including a plurality of base stations, including: a reception unit 151 configured to receive, from a connecting base station, control information to be used for reducing a signal of a control channel, that causes interference, sent from an interference base station for the user apparatus; and an interference reducing unit 152 configured to reduce the signal of the control channel that causes the interference by using the control information to obtain a desired signal sent from the connecting base station.

The reception unit 151 receives the control information as downlink control information that is transmitted by a downlink physical channel from the connecting base station, or, receives the control information by RRC signaling from the connecting base station.

Also, in a case where the reception unit 151 receives the control information by RRC signaling from the connecting base station, with respect to a control channel, in control channels that cause the interference, that is detected by searching resources specific for each user apparatus to perform blind-decoding, the reception unit 151 receives identification information of a user apparatus connected to the interference base station by a downlink physical channel as a part of information for reducing the signal of the control channel.

The user apparatus 100 may include an estimation unit configured to estimate a part of the control information necessary for reducing the signal of the control channel that causes the interference by using control information received from the connecting base station. The interference reducing unit 151 is a unit configured to perform interference rejection combining reception based on channel estimation of an interference signal, or, a unit configured to perform successive interference cancellation.

Figure 51:
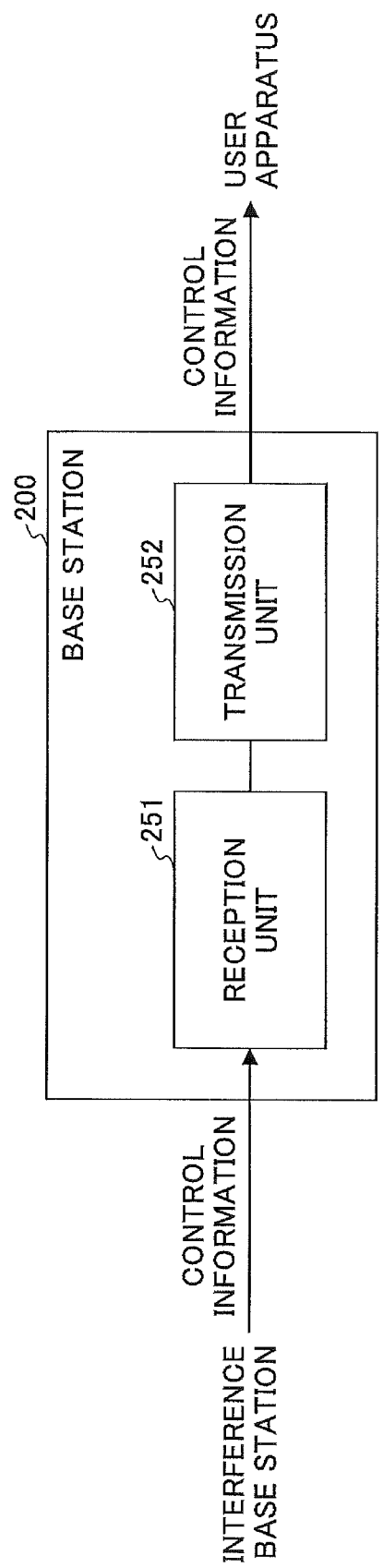
FIG. 51 is a diagram showing a configuration example of a base station.

Also, the base station 200 may be configured as shown in FIG. 51. The base station 200 shown in FIG. 51 is a base station connecting with a user apparatus in a radio communication system, including: a reception unit 251 configured to receive, from an interference base station, control information to be used by the user apparatus for reducing a signal of a control channel, that causes interference, sent from the interference base station for the user apparatus; and a transmission unit 252 configured to transmit the control information to the user apparatus as downlink control information by a downlink physical channel, or, transmit the control information to the user apparatus by RRC signaling.

In a case where the transmission unit 252 transmits the control information to the user apparatus by RRC signaling, with respect to a control channel, in control channels that cause the interference, that is detected by searching resources specific for each user apparatus to perform blind-decoding, the transmission unit 252 transmits identification information of a user apparatus connected to the interference base station by a downlink physical channel as a part of information for reducing the signal of the control channel. The control information is information to be used by the user apparatus for performing interference rejection combining reception based on channel estimation of an interference signal, or, the control information is information to be used by the user apparatus for performing successive interference cancellation.

In the above, the present invention has been explained while referring to the specific embodiments. However, these are merely exemplary. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagrams correspond to boundaries of physical components. The operations by the plural functional units may be physically performed by a single component. Alternatively, the operations by the single functional unit may be physically performed by plural components.

For convenience of explanation, the user apparatus UE and the base station eNodeB have been explained by using functional block diagrams. However, the apparatuses may be implemented in hardware, a processor and software, or a combination thereof. The software that operates according to the present invention may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-017715, filed in the JPO on Jan. 31, 2013, and the entire contents of the Japanese patent application No. 2013-017715 are incorporated herein by reference.

DESCRIPTION OF REFERENCE SIGNS 100 user apparatus
101 desired signal channel estimation unit
102 interference signal channel estimation unit
103 interference transmission control information estimation unit
104 interference PDCCH estimation unit
105 IRC reception process unit
106 control signal demodulation unit (DCI)
107 interference signal control information storage unit
108 radio I/F
111 desired signal channel estimation unit
112 interference signal channel estimation unit
113 interference transmission control information estimation unit
114 interference PDCCH estimation unit
115 IRC reception process unit
116 control signal demodulation unit (DCI)
117 interference control information storage unit (DCI)
118 data demodulation unit
119 interference control information storage unit (RRC)
120 radio I/F
131 desired signal channel estimation unit
132 interference signal channel estimation unit
133 interference transmission control information estimation unit
134 interference PDCCH estimation unit
135 SIC reception process unit
136 control signal demodulation unit (DCI)
137 interference signal control information storage unit
138 radio I/F
141 desired signal channel estimation unit
142 interference signal channel estimation unit
143 interference transmission control information estimation unit
144 interference PDCCH estimation unit
145 SIC reception process unit
146 control signal demodulation unit (DCI)
147 interference control information storage unit (DCI)
148 data demodulation unit
149 interference control information storage unit (RRC)
150 radio I/F 150.
200 connecting base station
201 transmission control information determination unit
202 transmission control information notification unit
203 interference transmission control information reception unit
204 transmission data storage unit
205 transmission signal generation unit
206 cable I/F (or radio I/F)
207 radio I/F
211 transmission control information determination unit
212 transmission control information notification control unit (RRC)
213 transmission control information notification control unit (DCI)
214 interference transmission control information reception unit (RRC)
215 interference transmission control information reception unit (DCI)
216 transmission data storage unit
217 transmission signal generation unit
218 cable I/F (or radio I/F)
219 radio I/F
231 transmission control information determination unit
232 transmission control information notification unit
233 interference transmission control information reception unit
234 transmission data storage unit
235 transmission signal generation unit
236 cable I/F (or radio I/F)
237 radio I/F
241 transmission control information determination unit
242 transmission control information notification control unit (RRC)
243 transmission control information notification control unit (DCI)
244 interference transmission control information reception unit (RRC)
245 interference transmission control information reception unit (DCI)
246 transmission data storage unit
247 transmission signal generation unit
248 cable I/F (or radio I/)
249 radio I/F
300 interference base station
302 transmission control information notification unit
303 interference transmission control information reception unit
306 cable I/F (or radio I/F)
312 transmission control information notification control unit (DCI)
313 transmission control information notification control unit (RRC)
315 interference transmission control information reception unit (DCI)
316 interference transmission control information reception unit (RRC)
318 cable I/F (or radio I/F)
332 transmission control information notification unit
333 interference transmission control information reception unit
336 cable I/F (or radio I/F)
342 transmission control information notification control unit (DCI)
343 transmission control information notification control unit (RRC)
345 interference transmission control information reception unit (DCI)
344 interference transmission control information reception unit (RRC)
348 cable I/F (or radio I/F)

The invention claimed is:

1. A user apparatus in a radio communication system including a plurality of base stations, comprising:
a receiver configured to receive, from a first base station, control information to be used for reducing a signal of a control channel, that causes interference, sent from a second base station for the user apparatus; and a processor configured to reduce the signal of the control channel that causes the interference by using the control information to obtain a desired signal sent from the first base station, wherein the control information that is used for reducing the signal of the control channel includes a cell ID and the number of antenna ports of CRS (Cell-specific Reference Signal), wherein the signal of the control channel that causes the interference is a signal mapped on OFDM symbols, from a head of a subframe, the number of which is indicated by a (CFI) Control format Indicator, wherein the control channel that causes the interference is at least one of PDCCH, PCFICH, and PHICH, and wherein the processor performs interference rejection combining reception based on channel estimation of the signal of the control channel that causes the interference, or, performs successive interference cancellation.

2. The user apparatus as claimed in claim 1, wherein the receiver receives the control information as downlink control information that is transmitted by a downlink physical channel from the first base station, or, receives the control information by RRC signaling from the first base station.

3. The user apparatus as claimed in claim 2, wherein, in a case where the receiver receives the control information by RRC signaling from the first base station, with respect to a control channel, in control channels that cause the interference, that is detected by searching resources specific for each user apparatus to perform blind-decoding, the receiver receives identification information of a user apparatus connected to the second base station by a downlink physical channel as a part of information for reducing the signal of the control channel.

4. The user apparatus as claimed in claim 1, wherein the processor is further configured to estimate a part of the control information necessary for reducing the signal of the control channel that causes the interference by using control information received from the first base station.

5. The user apparatus as claimed in claim 2, wherein the processor is further configured to estimate a part of the control information necessary for reducing the signal of the control channel that causes the interference by using control information received from the first base station.

6. The user apparatus as claimed in claim 3, wherein the processor is further configured to estimate a part of the control information necessary for reducing the signal of the control channel that causes the interference by using control information received from the first base station.

7. A base station connecting with a user apparatus in a radio communication system, comprising:

a receiver configured to receive, from another base station, control information to be used by the user apparatus for reducing a signal of a control channel, that causes interference, sent from the other base station for the user apparatus; and a transmitter configured to transmit the control information to the user apparatus as downlink control information by a downlink physical channel, or, configured to transmit the control information to the user apparatus by RRC signaling, wherein the control information that is used for reducing the signal of the control channel includes a cell ID and the number of antenna ports of CRS (Cell-specific Reference Signal), wherein the signal of the control channel that causes the interference is a signal mapped on OFDM symbols, from a head of a subframe, the number of which is indicated by a (CFI) Control format Indicator, wherein the control channel that causes the interference is at least one of PDCCH, PCFICH, and PHICH, and wherein the user apparatus performs interference rejection combining reception based on channel estimation of the signal of the control channel that causes the interference, or, performs successive interference cancellation.

8. The base station as claimed in claim 7, wherein, in a case where the transmitter transmits the control information to the user apparatus by RRC signaling, with respect to a control channel, in control channels that cause the interference, that is detected by searching resources specific for each user apparatus to perform blind-decoding, the transmitter transmits identification information of a user apparatus connected to the other base station by a downlink physical channel as a part of information for reducing the signal of the control channel.

9. An interference reducing method executed in a user apparatus in a radio communication system including a plurality of base stations, comprising:

a reception step of receiving, from a first base station, control information to be used for reducing a signal of a control channel, that causes interference, sent from a second base station for the user apparatus; and an interference reducing step of reducing the signal of the control channel that causes the interference by using the control information to obtain a desired signal sent from the first base station, wherein the control information that is used for reducing the signal of the control channel includes a cell ID and the number of antenna ports of CRS (Cell-specific Reference Signal), wherein the signal of the control channel that causes the interference is a signal mapped on OFDM symbols, from a head of a subframe, the number of which is indicated by a (CFI) Control format Indicator, wherein the control channel that causes the interference is at least one of PDCCH, PCFICH, and PHICH, and wherein reducing the signal is performed using interference rejection combining reception based on channel estimation of the signal of the control channel that causes the interference, or using successive interference cancellation.

10. An interference reducing control information notification method executed by a base station connecting with a user apparatus in a radio communication system, comprising:

a reception step of receiving, from another base station, control information to be used by the user apparatus for reducing a signal of a control channel, that causes interference, sent from the other base station for the user apparatus; and a transmission step of transmitting the control information to the user apparatus as downlink control information by a downlink physical channel, or, transmitting the control information to the user apparatus by RRC signaling, wherein the control information that is used for reducing the signal of the control channel includes a cell ID and the number of antenna ports of CRS (Cell-specific Reference Signal), wherein the signal of the control channel that causes the interference is a signal mapped on OFDM symbols, from a head of a subframe, the number of which is indicated by a (CFI) Control format Indicator, wherein the control channel that causes the interference is at least one of PDCCH, PCFICH, and PHICH, and wherein reducing the signal is performed by the user apparatus using interference rejection combining reception based on channel estimation of the signal of the control channel that causes the interference, or using successive interference cancellation.

* * * * *